(12) United States Patent
Risnoveanu et al.

(10) Patent No.: US 8,635,126 B2
(45) Date of Patent: Jan. 21, 2014

(54) CASINO OPERATIONS MANAGEMENT SYSTEM

(75) Inventors: Julian Risnoveanu, Anaheim Hills, CA (US); Mircea Draghici, Ploiesti (RO)

(73) Assignee: IT Casino Solutions LLC, Anaheim, CA (US)

( * ) Notice: Subject to any disclaimer, the term of this patent is extended or adjusted under 35 U.S.C. 154(b) by 7 days.

(21) Appl. No.: 12/948,729

(22) Filed: Nov. 17, 2010

(65) Prior Publication Data

US 2012/0123915 A1 May 17, 2012

(51) Int. Cl.
*G07B 17/00* (2006.01)
*G07F 19/00* (2006.01)
*G06Q 10/00* (2012.01)
*A63F 3/08* (2006.01)

(52) U.S. Cl.
USPC ............ 705/30; 705/1.1; 705/7.13; 705/7.14; 273/274

(58) Field of Classification Search
USPC ..................................... 705/22–28
See application file for complete search history.

(56) References Cited

U.S. PATENT DOCUMENTS

| | | |
|---|---|---|
| 3,221,150 A | 11/1965 | Goodwin |
| 3,344,408 A | 9/1967 | Singer |
| 3,351,912 A | 11/1967 | Collom |
| 3,593,008 A | 7/1971 | DeWitt |
| 4,503,499 A | 3/1985 | Mason |
| 4,926,327 A | 5/1990 | Sidley |
| 4,937,743 A | 6/1990 | Rassman |
| 4,942,527 A | 7/1990 | Schumacher |
| 5,129,652 A * | 7/1992 | Wilkinson ................... 273/139 |
| 5,289,368 A | 2/1994 | Jordan |
| 5,311,423 A | 5/1994 | Clark |
| 5,586,936 A | 12/1996 | Bennett |
| 5,634,016 A | 5/1997 | Steadham |
| 5,655,086 A | 8/1997 | Jury |
| 5,671,360 A | 9/1997 | Hambrick |
| 5,711,715 A | 1/1998 | Ringo |
| 5,759,103 A * | 6/1998 | Freels et al. .................... 463/42 |
| 5,765,140 A | 6/1998 | Knudson |

(Continued)

FOREIGN PATENT DOCUMENTS

| | | | | |
|---|---|---|---|---|
| EP | 1658580 A1 * | 5/2006 | ............. | G07F 17/32 |
| WO | WO 2004036515 A1 * | 4/2004 | ............. | G07F 17/32 |

OTHER PUBLICATIONS

Ameranth, 21$^{st}$ Century Casino, www.amaeranth.com.*

(Continued)

*Primary Examiner* — Ig T An
(74) *Attorney, Agent, or Firm* — Daphne L. Burton; David B. Dort; Dort Patent, P.C.

(57) ABSTRACT

A system, computer program and computer-based method for managing casino operations. The system provides for employee management and information storage and retrieval for a significant number of casino operations. The system includes an attendance controller that receives, stores and displays attendance information for casino personnel. Casino personnel are issued cards that uniquely identify them and monitor them in the fulfillment of their roles. Players may also receive these types of cards, which can be used to record their casino activity and reward them for playing. The system provides for managing financial transactions between the player and entity. Touch screen devices, resident at casino tables, may be used to request and manage the table.

16 Claims, 36 Drawing Sheets

(56) References Cited

U.S. PATENT DOCUMENTS

| | | | |
|---|---|---|---|
| 5,770,533 A | 6/1998 | Franchi | |
| 5,890,134 A | 3/1999 | Fox | |
| 5,902,983 A * | 5/1999 | Crevelt et al. | 235/380 |
| 5,907,829 A | 5/1999 | Kida | |
| 5,911,134 A | 6/1999 | Castonguay | |
| 5,943,652 A | 8/1999 | Sisley | |
| 5,957,776 A | 9/1999 | Hoehne | |
| 5,974,392 A | 10/1999 | Endo | |
| 6,030,288 A * | 2/2000 | Davis et al. | 463/29 |
| 6,093,100 A | 7/2000 | Singer | |
| 6,117,011 A | 9/2000 | Lvov | |
| 6,174,237 B1 | 1/2001 | Stephenson | |
| 6,192,346 B1 | 2/2001 | Green | |
| 6,240,395 B1 | 5/2001 | Kumashiro | |
| 6,267,671 B1 | 7/2001 | Hogan | |
| 6,299,534 B1 | 10/2001 | Breeding | |
| 6,308,163 B1 | 10/2001 | Du | |
| 6,382,629 B1 | 5/2002 | Hill | |
| 6,460,848 B1 | 10/2002 | Soltys | |
| 6,582,301 B2 | 6/2003 | Hill | |
| 6,587,831 B1 | 7/2003 | O'Brien | |
| 6,672,589 B1 | 1/2004 | Lemke | |
| 6,676,517 B2 | 1/2004 | Beavers | |
| 6,729,959 B1 | 5/2004 | Moore | |
| 6,767,284 B1 | 7/2004 | Koza | |
| 6,889,098 B1 | 5/2005 | Laval | |
| 6,910,965 B2 | 6/2005 | Downes | |
| 6,941,197 B1 | 9/2005 | Murakami | |
| 6,962,531 B2 | 11/2005 | Pace | |
| 6,979,199 B2 | 12/2005 | Barron | |
| 7,018,291 B1 | 3/2006 | Lemke | |
| 7,255,642 B2 | 8/2007 | Sines | |
| 7,303,475 B2 | 12/2007 | Britt et al. | |
| 7,306,516 B2 | 12/2007 | Isolevsky | |
| 7,431,650 B2 * | 10/2008 | Kessman et al. | 463/42 |
| 7,448,046 B2 | 11/2008 | Navani | |
| 7,460,863 B2 | 12/2008 | Steelberg | |
| 7,487,115 B2 | 2/2009 | Clark | |
| 7,878,909 B2 | 2/2011 | Kessman | |
| 8,210,931 B2 * | 7/2012 | Alderucci et al. | 463/25 |
| 2001/0031664 A1 * | 10/2001 | Acres | 463/42 |
| 2002/0040313 A1 | 4/2002 | Hunter | |
| 2002/0123377 A1 | 9/2002 | Shulman | |
| 2002/0153656 A1 * | 10/2002 | Maksymec et al. | 273/138.1 |
| 2003/0036425 A1 * | 2/2003 | Kaminkow et al. | 463/25 |
| 2003/0064798 A1 | 4/2003 | Grauzer | |
| 2003/0083919 A1 | 5/2003 | Hammann | |
| 2003/0087694 A1 * | 5/2003 | Storch | 463/25 |
| 2003/0139190 A1 | 7/2003 | Steelberg | |
| 2004/0087365 A1 * | 5/2004 | Akers | 463/29 |
| 2005/0181864 A1 * | 8/2005 | Britt et al. | 463/25 |
| 2005/0192086 A1 * | 9/2005 | Walker et al. | 463/20 |
| 2006/0148550 A1 * | 7/2006 | Nee et al. | 463/16 |
| 2007/0004518 A1 | 1/2007 | Friesen | |
| 2007/0117623 A1 * | 5/2007 | Nelson et al. | 463/29 |
| 2007/0265064 A1 * | 11/2007 | Kessman et al. | 463/25 |
| 2008/0281666 A1 * | 11/2008 | Kessman et al. | 705/9 |
| 2009/0024456 A1 * | 1/2009 | Risnoveanu et al. | 705/11 |
| 2009/0239650 A1 * | 9/2009 | Alderucci et al. | 463/25 |
| 2009/0287579 A1 * | 11/2009 | Walker et al. | 705/21 |

OTHER PUBLICATIONS

Bicycle Casino Dealer's Rotation Report for Staggers, Commerce Casino, Commerce, CA, USA (1990).

Ameranth, Inc.; 21st Century Casino, Sep. 15, 1999, all pages.

Ameranth, Inc.; www.ameranth.com, Aug. 30, 2000 or earlier, all pages.

Joy Cohan; "Casino Hits Jackpot with Employee Scheduling Software"; Personnel Journal, May 1993, all pages.

The Economist; "A LAN Line," Jan. 11, 2001, all pages.

Declaration under 37 CFR 1.132 by Keith McNally; U.S. Appl. No. 11/112,990.

Declaration of Pre-Filing Activity at Hustler Casino by Inventor Julian Risnoveanu.

Declaration of Pre-Filing Activity with Hollywood Park Casino by Inventor Julian Risnoveanu.

Declaration Corroborating Experimental Use (Tracy Edwards).

* cited by examiner

FIG. 7

Weekly Rules

From 01/01/2008 ⌄ to 12/31/2008 ⌄  ☐ Clear the all old schedule before applying this new one ☐ Use default

| | Color | Begin At | Duration | Sch. Type | Job | Job Code | Change |
|---|---|---|---|---|---|---|---|

| Day | Color | Begin At | Duration | Sch. Type | Job | Job Code | Change |
|---|---|---|---|---|---|---|---|
| ☑ Sunday | | 12:00AM | 8h 00m | Regular | Cage Supervisor | Cage Supervisor | Change |
| ☐ Monday | | | | | | | |
| ☑ Tuesday | | 12:00AM | 8h 00m | Regular | Cage Supervisor | Cage Supervisor | Change |
| ☐ Wednesday | | | | | | | |
| ☑ Thursday | | 12:00AM | 8h 00m | Regular | Cage Supervisor | Cage Supervisor | Change |
| ☑ Friday | | 12:00AM | 8h 00m | Regular | Cage Supervisor | Cage Supervisor | Change |
| ☑ Saturday | | 12:00AM | 8h 00m | Regular | Cage Supervisor | Cage Supervisor | Change |

Apply    Cancel

Customize Absences

[Edit] [Refresh] [Close]

| No | Name | Short Name | With Pay Options |
|---|---|---|---|
| 1 | Vacation | Va | Default Without Pay |
| 2 | Sick | Sk | Default Without Pay |
| 3 | Medical LOA | Me | Default Without Pay |
| 4 | Personal LOA | Psn | Default Without Pay |
| 5 | Maternity LOA | Ma | Default Without Pay |
| 6 | Extra Day Off | Off | Default Without Pay |
| 7 | Jury Duty | JD | Default Without Pay |
| 8 | Suspended | Su | Default Without Pay |
| 9 | Bereavement | B | Default Without Pay |
| 10 | Military Leave | Mil | Default Without Pay |
| 11 | No Call/No Show | No | Only Without Pay |
| 12 | Family | Fam | Default Without Pay |

| Cal-Games | | | Cal-Games | | | | |
|---|---|---|---|---|---|---|---|
| Badge | Off-Screen On-Screen | Next Table | Badge | Off-Screen On-Screen | Next Table | Badge | |
| 91571 | 25 | 35 | 910349 | 23 | 13 | Badge | |
| 883150 | 28 | <B> | | | | | |
| 91183 | <L> | 2 | | | | | |
| 888973 | <B> | 25 | | | | | |
| 91164 | <DB> | | | | | | |
| 96787 | 26 | <B> | | | | | |
| 90883 | 19 | 12 | | | | | |
| 91135 | <B> | 23 | | | | | |
| 888220 | <B> | 13 | | | | | |
| 88756 | 20 | 17 | | | | | |
| 81050 | 16 | <B> | | | | | |
| 91027 | 17 | <B> | | | | | |
| 91149 | 21 | 22 | | | | | |
| 820014 | 18 | <B> | | | | | |
| 98873 | <L> | 152 | | | | | |
| 90873 | 13 | 28 | | | | | |
| 90777 | 12 | 82 | | | | | |
| 883113 | 02 | 21 | | | | | |
| 91166 | 37 | 27 | | | | | |
| 91088 | <L> | 18 | | | | | |
| 91337 | 102 | 26 | | | | | |
| 90399 | 2 | 26 | | | | | |

1500, 1510, keyboard

Jackpot Configuration 2100

[Add] [Edit] [Edit Order] [Delete] [Refresh] [Close]

State: [ALL] ▼    Section: [ALL] ▼

2110

| Sort Order | Description | ShortName | Section | Seed | Factor | Drop | State |
|---|---|---|---|---|---|---|---|
| 1 | Hold'em | H'em | POKER | $20000.00 | 5.00 | $1.00 | Going |
| 2 | Black Jack | BJ | Cal-Games | $10000.00 | 1.00 | $1.00 | Not Going |

2120

Assigned Games

| No | Game |
|---|---|
| 1 | Hold'em |

Assigned Limits

| | |
|---|---|
| 1 | $2.00-$4.00 |
| 2 | $3.00-$6.00 |
| 3 | $4.00-$8.00 |
| 4 | $6.00-$12.00 |
| 5 | $15.00-$30.00 |
| 6 | $25.00-$50.00 |

CAL GAMES

| Hold'em $15-$30 | Omaha Hi-Lo $4-$8 | Hold'em $25-$50 | Mexican Poker $75-$100 | Mexican Poker $20-$40 | Mexican Poker $25-$50 |
|---|---|---|---|---|---|
| 9, 13, 16, 31, 34*, 39 | 8, 10, 30, 32, 45, 48, 50, 53, 54 | BC107, BC123, 18, 39 | 24, 61, 70, 72, 74 | 9, 29, 36, 37, 47, 49, 83 | 14, 23, 41, 42, 43, 46, 60, 65, 69, 73, 76, 77 |
| GUY | AL | GUY | | AL | GUY |
| MOM | TED | AL | | GUY | |
| VIVI | GUY | TED | | MOM | |
| AA | MOM | MOM | | VIVI | |
| LIA | VIVI | NEW | | OOO | |
| | OOO | AA | | NEW | |
| | AA | LIA | | | |
| | LIA | | | | |

FIG. 24

| | 4 min 57 seconds | | | |
|---|---|---|---|---|

Please sign-up for a game by checking the game from the lists. Thank you!

Your Points: 0

Your Waiting Lists

| No | Game | Limit | St |
|---|---|---|---|
| 1 | Hold'em | $15-$30 | G |
| 2 | Omaha Hi-Lo | $4-$8 | G |
| 3 | Hold'em | $25-$50 | T |
| | | | |
| | | | |
| | | | |

POKER    Edit

Nickname: LIA

| No Sel | Game | Limit | St |
|---|---|---|---|
| 1 ✓ | Hold'em | $15-$30 | G |
| 2 ✓ | Omaha Hi-Lo | $4-$8 | G |
| 3 ✓ | Hold'em | $25-$50 | T |
| 4 ☐ | Mexican Poker | $20-$40 | T |
| 5 ☐ | Mexican Poker | $25-$50 | T |
| 6 ☐ | Mexican Poker | $75-$100 | T |

Season 2009 – Week 9

| No | | | | | | |
|---|---|---|---|---|---|---|
| 1 | | Green Bay Packers | At | Tampa Bay Buccaneers | Tie | |
| 2 | | Houston Texans | At | Indianapolis Colts | Tie | |
| 3 | | Miami Dolphins | At | New England Patriots | Tie | |
| 4 | | Arizona Cardinals | At | Chicago Bears | Tie | |
| 5 | | Kansas City Chiefs | At | Jacksonville Jaguars | Tie | |
| 6 | | Washington Redskins | At | Atlanta Falcons | Tie | |
| 7 | | Baltimore Ravens | At | Cincinnati Bengals | Tie | |
| 8 | | Carolina Panthers | At | New Orleans Saints | Tie | |
| 9 | | Detroit Lions | At | Seattle Seahawks | Tie | |
| 10 | | Tennessee Titans | At | San Francisco 49ers | Tie | |
| 11 | | San Diego Chargers | At | New York Giants | Tie | |
| 12 | | Dallas Cowboys | At | Philadelphia Eagles | Tie | |

Monday Night Game

| 13 | | Pittsburgh Steelers | At | Denver Broncos | Tie | |

Total Score

CASINO OPERATIONS MANAGEMENT SYSTEM

CROSS-REFERENCE TO RELATED APPLICATIONS

The present application is a continuation-in-part of nonprovisional application Ser. No. 12/218,376, filed on or about Jul. 15, 2008 entitled "Casino Operations Management System," naming the same inventors as in the present application. The present application claims priority to that prior nonprovisional application. The present application also claims priority to provisional application Ser. No. 60/959,610, filed on or about Jul. 16, 2007, entitled "Casino Management," naming the same inventors as in the present application. The contents of both the nonprovisional and provisional application are incorporated by reference, the same as if fully set forth.

STATEMENT REGARDING FEDERALLY SPONSORED RESEARCH/DEVELOPMENT

N/A.

BACKGROUND OF THE INVENTION

1. Field of Invention

The present disclosure relates to casino management and, more particularly, to a computer-based system that manages various casino operations.

2. Description of Related Art

Casinos are often large operations with numerous employees as well as activities. Casino profitability and productivity can be severely and adversely affected where these numerous activities and employees are not properly managed. As such, it may be desirable to track these numerous activities and employees.

For example, tardiness by casino personnel can cause game delays. Dealer rotations between tables may occur often, e.g., every 30-45 minutes, and they must be handled so that they do not disrupt game flow, but must also allow the dealer to take breaks. The employee cage, the location where employees come to pick up money, must be managed so that the employees return and account for the money they were given at the beginning of their shift.

The count room in a casino may be the place where workers come to pick up items such as chips. Numerous chips may be checked out during the course of a day of casino operation. Because these chips are valuable, it may be desirable for casinos to properly account for those chips. The same is true for the geco room, where casino equipment, e.g., cards, dice, shoes, etc. may be checked out by staff.

Moreover, as with other businesses, customer satisfaction may be a significant factor in contributing to a casino's success. To this end, it may be desirable for casinos to create a comfortable environment for players where players may have their food and beverage needs satisfied quickly and in an orderly manner. It may also be desirable for casinos to permit players to quickly determine what games are playing and sign up for the next game. It may also be desirable for casinos to manage jackpots and quickly record players who were issued jackpots.

There is a need for a solution that manages casino operations.

BRIEF SUMMARY OF DISCLOSURE

The present disclosure addresses the needs noted above. The present disclosure describes a casino management system that provides for employee management and information storage and retrieval for various casino operations. In accordance with one embodiment of the present disclosure, the system comprises an attendance controller module configured to receive, store and display attendance information for an entity, wherein the attendance information includes start times, end times, tardiness and absences.

The system further comprises a unique personnel identification card device configured to receive, store and transmit unique identification information for individual personnel associated with the entity, and at least one card scanner device corresponding to at least one entity location, the at least one card scanner device being configured to scan the unique personnel identification card device and thereby transmit unique identification information and location information for each of said individual personnel associated with the entity. The system also comprises a dealer rotation module configured to receive, store and display scheduled rotation information for dealers; at least one touch screen device configured to receive and display information for a casino table; and a player cage module configured to manage financial transactions between the player and entity, the player cage module including a cashier interface that has information regarding all transactions performed by a cashier during a time period, the player cage module further including a player dashboard having player activity information.

In accordance with another embodiment of the present disclosure, a computer program product is provided. It comprises a computer usable medium having computer readable program code embodied therein for casino operations management. The computer program product comprises attendance controller computer readable code for causing a computer to receive, store and display attendance information for one or more entities, wherein the attendance information includes start times, end times, tardiness and absences; dealer rotation computer readable code for causing the computer to receive, store and display dealer rotation information; and player cage computer readable code for causing the computer to manage financial transactions between the player and the entity.

In accordance with yet another embodiment of the present disclosure, a method is provided for casino operations management. The method comprises receiving and storing attendance information for personnel in one or more entities, wherein the attendance information includes start times and end times.

The method further comprises receiving and storing scanned information from a unique personnel identification card device, wherein the card device includes unique identification information for each individual in a casino entity. Responsive to the step of receiving and storing scanned information, the method comprises displaying additional attendance information for the individual in an entity, including tardiness; and receiving, storing, transmitting and displaying dealer rotation information. The method still further comprises receiving, storing and displaying information for a casino table at a touch screen device; and managing financial transactions between the player and the entity.

These, as well as other objects, features and benefits will now become clear from a review of the following detailed description of illustrative embodiments and the accompanying drawings.

BRIEF DESCRIPTION OF DRAWINGS

FIG. 7 illustrates a screenshot of an employee schedule in accordance with one embodiment of the present disclosure.

FIG. 8 illustrates a weekly rules screenshot that shows how rules may be created on a weekly basis in accordance with one embodiment of the present disclosure.

FIG. 9 illustrates a schedule screenshot that shows the employees who are to be working at a specified time of day in accordance with one embodiment of the present disclosure.

FIG. 10 illustrates is an absence definition screenshot that displays potential reasons for employee absences and the pay consequences in accordance with one embodiment of the present disclosure.

FIG. 11 illustrates an employee sign-in screenshot that may be retrieved from the system in accordance with one embodiment of the present disclosure.

FIG. 12 illustrate is an incident entry screenshot that shows a user adding an employee incident in accordance with one embodiment of the present disclosure.

FIG. 13 illustrates a screenshot displaying a section view for dealer rotation 1300 in accordance with one embodiment of the present disclosure.

FIG. 14 illustrates a screenshot that shows a user entry that changes a casino table's status in accordance with one embodiment of the present disclosure.

FIG. 15 is a table rotation screenshot that shows table rotation according to a dealer's badge number, the time and table number, in accordance with one embodiment of the present disclosure.

FIG. 16 is an individual tip pool drop screenshot in accordance with one embodiment of the present disclosure.

FIG. 18 is a screenshot showing dealer activity for a specified time period in accordance with one embodiment of the present disclosure.

FIG. 20 is a collection screenshot in accordance with one embodiment of the present disclosure.

FIG. 21 is a screenshot that shows a jackpot configuration in accordance with one embodiment of the present disclosure.

FIG. 22 is a screenshot that shows a virtual revenue center in accordance with one embodiment of the present disclosure.

FIG. 23 is a geco room screenshot in accordance with one embodiment of the present disclosure.

FIG. 24 is a player's board screenshot in accordance with one embodiment of the present disclosure.

FIG. 25 is a screenshot that shows a player adding herself to a waiting list in accordance with one embodiment of the present disclosure.

FIG. 26 is a screenshot that shows game waiting lists and free seat alerts in accordance with one embodiment of the present disclosure.

FIG. 31 is a tournament registration and management module display in accordance with one embodiment of the present disclosure.

FIG. 32 is a player's graphical user interface in accordance with one embodiment of the present disclosure.

FIG. 33 is a user interface in accordance with one embodiment of the present disclosure.

FIG. 34 is a cashier dashboard or interface in accordance with one embodiment of the present disclosure.

FIG. 38 is an end of shift dashboard screenshot in accordance with one embodiment of the present disclosure.

DETAILED DESCRIPTION OF THE DISCLOSURE

The present disclosure describes a computer-based casino management system that can be used to manage a significant number of casino operations. These system provides for, but is not limited to: casino personnel attendance management; dealer rotation coordination; casino personnel cage management, including casino funds tracking and accountability; numerous report options for casino operations; count room management; jackpot management; casino floor activity monitoring, including information related to casino games, and game players or participants; accounting and revenue centers; casino equipment room (geco room) management; and alert options for notifying appropriate casino personnel when the casino is not operating according to certain specified parameters.

Using the computer-based casino management system described herein, a snapshot of the casino's current status can be taken. For example, status and location information for hundreds of employees can be displayed at any given time.

Casino Operations Management Hardware Devices.

Figure 1:
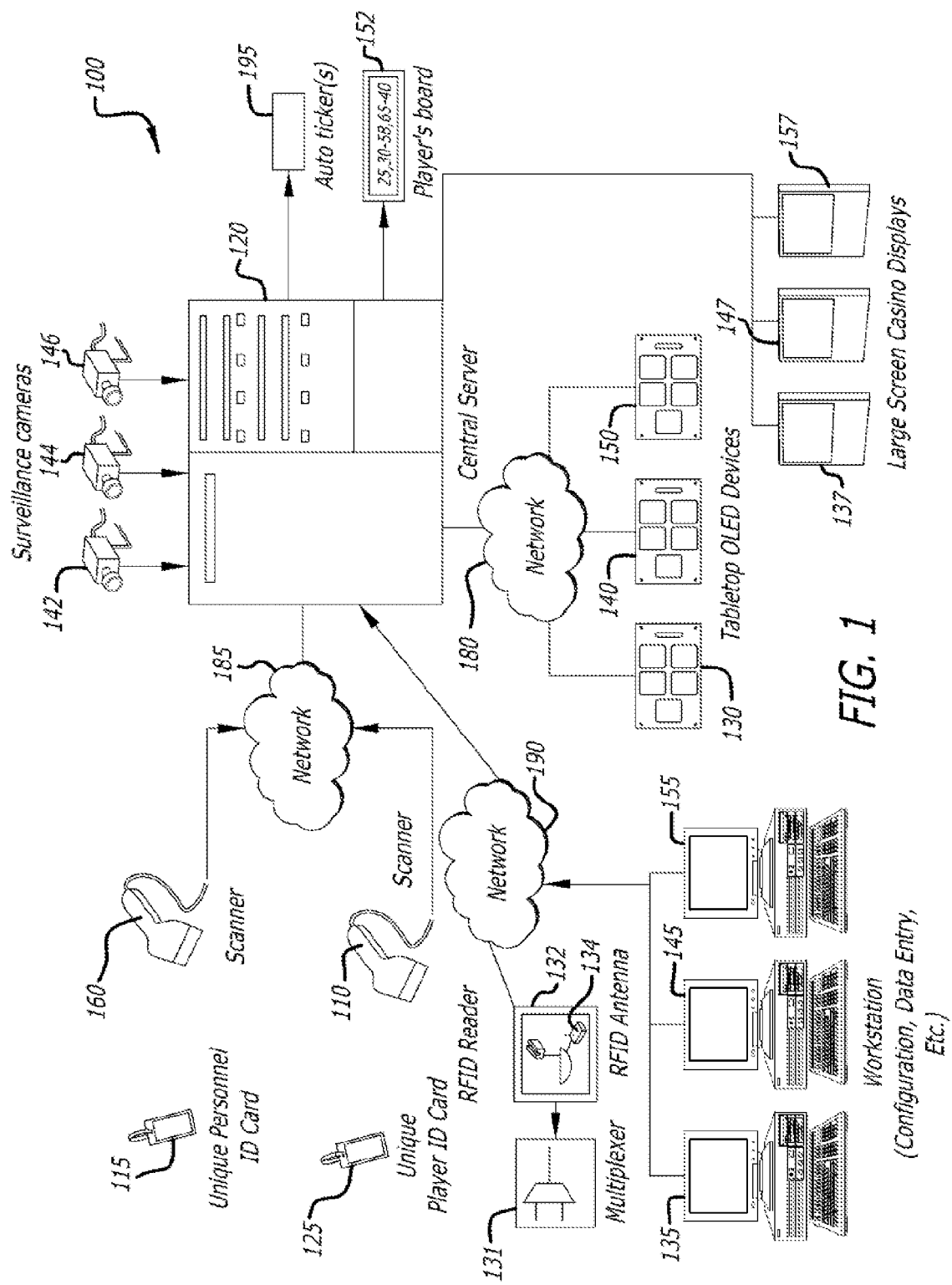
FIG. 1 illustrates a casino management system in accordance with one embodiment of the present disclosure.

Referring now to FIG. 1, illustrated is a casino management system 100 in accordance with one embodiment of the present disclosure. Computer hardware devices of the casino management system include, but are not limited to: scanners 110, 160 which may be used to scan a unique personnel identification card 110 and/or a unique player identification card 125; user workstations 135, 145, 155 which may be used for configuration, input, display and other operations of the casino operations management system; organic light emitting diode (OLED) devices 130, 140, 150 which may be used at a casino table to display table information and to call for food/service and other operations; radio frequency identification reader 132 and antenna 134 which may be physically located under each casino seat at one or casino tables such that the reader 132 and antenna 134 may automatically read a unique player identification card 125 to determine a player's location and activities when a player is seated at a particular table; large screen casino displays 137, 147, 157 which may be used to display information such as dealer rotation; a player's display 152 that may display game information including game types, game limits, game tables and waiting lists; and notifications/alerts for waiting players that free seats are available at a particular table. Each of the computer hardware devices shown may be operatively coupled to the central server 120 in order to send information to the central server and/or receive information from the central server 120.

It should be understood that connections between the various hardware devices of the system 100 may be configured in any number of ways to advance the goals of the present disclosure without departing from the inventive concept. For example, the connections between various components of system 100 may be made via local area networks (LAN's) as well as wide area networks (such as the Internet). Moreover, the connections may be, without limitation, wireless or wired.

Greater detail on these hardware devices of the casino management system 100 will now be described.

Central server 120 and/or one or more of user workstations 135, 145, 155 may be used to configure modules and/or to receive and transmit information to the casino operations management software (which will be described later). User workstations 135, 145, 155 may be conventional personal computers. Workstations 135, 145, 155 may be provided, for example, as IBM.®-compatible computers, APPLE.® MACINTOSH.® personal computers, UNIX.®-based workstations, or any other equivalent computer systems, whether laptop, desktop or otherwise. Under some circumstances, the workstations 135, 145, 155 that may be used to input and receive information from the central server 120 may be personal digital assistants (PDA's) or any other such device. The computer system used may also include e.g., a WINDOWS.® hand-held device such as a POCKET PC.® hand-held device. Some mobile phones may be used to input and receive information, where such capability is available.

Each of workstations 135, 145, 155 may include a central processing unit, a display, a mouse, and a keyboard for receiving user input into the system. While three workstations 135, 145, 155 are shown in the present illustration, it should be understood that there could be only one workstation, or a large number of workstations depending on the capacity needed for a particular implementation of the casino operations management system of the present disclosure. Input devices, e. g., a mouse and the keyboard may be coupled to the user's workstation so that the user's computer may receive information that is input by him/her, and so that information can be routed through network 190 to the central server.

The exemplary workstations 135, 145, 155 are for descriptive purposes only. Although the description may refer to terms commonly used in describing particular computer systems, the description and concepts equally apply to other processing systems, including systems having architectures dissimilar to those shown in FIG. 1.

The read only memory (ROM) for each of workstations 135, 145, 155 may operate to effect permanent storage of information. Random access memory (RAM) for each of workstations 135, 145, 155 may operate to effect temporary storage of information. Each of the aforementioned components may be coupled to a bus. Operation of workstations 135, 145, 155 may be generally controlled and coordinated by operating system software. With the casino operations management system 100 of the present disclosure, the operating system that runs on workstations 135, 145, 155 may be, but is not limited to, MICROSOFT.® WINDOWS VISTA.®, MICROSOFT.® WINDOWS XP.®, MICROSOFT.® WINDOWS 7.® or a version of MAC OS.® or UNIX.® operating system or the like.

Alternatively, the principles of the present invention can be applied to a computer system using a version of DOS (disk operating system), or other operating system programs. An operating system resident in system memory and executed by the CPUs of workstations 135, 145, 155 may coordinate the operation of the other elements of workstations 135, 145, 155.

Data and software, including the casino operations management software to be described in more detail hereinbelow, may be provided to and extracted from workstations 135, 145, 155 or central server 120 via removable storage media such as, without limitation, a CD-ROM or DVD.

Data may also be provided to workstations 135, 145, 155 via, without limitation, scanners 110, 160, OLED devices 130, 140, 150 and/or RFID reader 132 and antenna 134. The data to the RFID antennae can be fed to one location using multiplexer 131.

Workstations 135, 145, 155 may include a communications adapter which allows the workstation to be interconnected to a local area network (LAN), a wide area network (WAN) or a public network. Thus, casino operations management data and related computer program software may be transferred to and from workstations 135, 145, 155 via the adapter and network 190.

Portions of the filtering software used to achieve the purposes of the present disclosure can be resident on workstations 135, 145, 155. Alternatively, all of the filtering software may be resident on central server 120.

Scanning devices 110, 160 may be used to scan either a casino-issued unique casino personnel identification card 115 and/or a unique player identification card 125. Scanners 110, 160 may be, without limitation, magnetic/laser readers.

Casino operations management software resident at the central server 120 and/or one of user workstations 135, 145, 155 may then read, store and/or display a number of types of casino operations management information, including but not limited to personnel start times, end times, table rotations, as well as player activity.

The unique casino personnel identification card 115 may be used to track a number of activities for casino personnel, including their work start times and end times. Information regarding a personnel adherence to prescribed work schedules may be logged as a result of users swiping these unique identification cards at scanners 110, 160 upon arrival at the casino. Data regarding sign-out times may be obtained and when personnel swipe their cards at the ends of their shifts.

Each of the casino personnel will have been assigned, during a configuration process, a unique badge number that uniquely identifies the particular person to whom the badge has been assigned. The unique casino personnel identification card 115 may also be used to track personnel's physical locations throughout the casino, e.g., when personnel swipe their cards at scanners which may be used to represent particular physical casino locations. For example, dealers may swipe the cards and/or use a biometric reader when they arrive at a new table according to their rotation schedule. In the case of a biometric reader, it may recognize the dealer according to the dealer's fingerprint, palm print, iris, voice, or other physical or behavioral trait. When swiped, the unique casino personnel identification card 115 may be used as well to trigger alerts to particular casino personnel, e.g., when they have not returned casino funds. It should be noted that each employee may be assigned an employee entity, e.g., dealer, chip runner, cage room employee, etc. such that the software resident at the central server 120 performs different entity-dependent operations when the card swiped. Casino personnel may include any individual authorized to act on behalf of the casino, including but not limited to employees and independent contractors.

The scanners 110, 160 may also be used to track player activity throughout the casino. Each player may have unique player identification card 125 that uniquely identifies the individual player and also serves as a reward card. When a player swipes the unique player identification card 125 upon arrival at a table, the system may start a timer on player time at a particular table. Because the system will have information on the game at the table and the game limit, the system can record player activity at the table. When the player leaves a particular table, the player may swipe the card again at a table scanner such as scanner 110, thus stopping the timer on player activity at a table.

Each casino table may be equipped with computer workstations such as workstations 135, 145, 155, a laser/magnetic reader such as scanner 160 and a set of organic light emitting diode (OLED) buttons 137, 147, 157.

In lieu of the OLED buttons, casinos may implement a radio frequency identification device (RFID) hardware solution instead of the magnetic/laser reader. One or more RFID readers or antennae such as reader 132 and antennae 134 may be placed under the table in front of each casino seat or underneath casino seats. A multiplexer 131 may be used to share input between the antennae at a particular table. For example, where a multiplexer has ten (10) ports, nine (9) ports may be assigned to players while the tenth ($10^{th}$) port may be assigned to the dealer.

When the player places the unique player identification card 125 on a casino-designated area on the surface of the table in front of that seat, the RFID reader under that table or seat may read the card 125 and start the timer, indicating a player's arrival time so that the player's time at the table can be tracked. When the player leaves and takes his card 125, the reader 110 or may send a signal to the central computer which causes the timer to stop.

Because the casino management system may already have information about games, game limits, and dealers working at each table, the casino management system may correlate this information with a specific player. When the timer starts, the casino management system may record information such as the player's game and game limits. Subsequently, this information may be used to analyze player behavior and reward the player for the time spent on various games, e.g., through points collection.

Reward points that have been collected by a player may be redeemable throughout the casino. In this connection, the casino management system may print receipts of the value of points collected. Users having proper access permissions for the casino management system may add, delete and/or modify the reward points for individual players.

Players may use an automated process to obtain a player's card. Automatic scanners such as scanners 110, 160 may read information from a driver's license or any picture ID. The information may be stored in the casino management system's database and the player card may be printed.

The networks 180, 185, 190 in the current illustration are local area networks; however, the networks 180, 185, 190 may be any other type of wide area network, local area network, or other means by which workstations may communicate with the central server 120.

Input may be received by the casino management system via one or more of the following types of input devices implemented in hardware: optical light emitting diode (OLED) devices 130, 140, 150, radio frequency identification (RFID) devices 132, 134, PDA's, keyboard, mouse, wired and wireless, as well as other types of input devices. The hardware may be configured to communicate with software having instructions which, when executed by a processor, cause a processor to carry out the functions that will be described in more detail hereinbelow in connection with the description of the various software modules.

Figure 2:
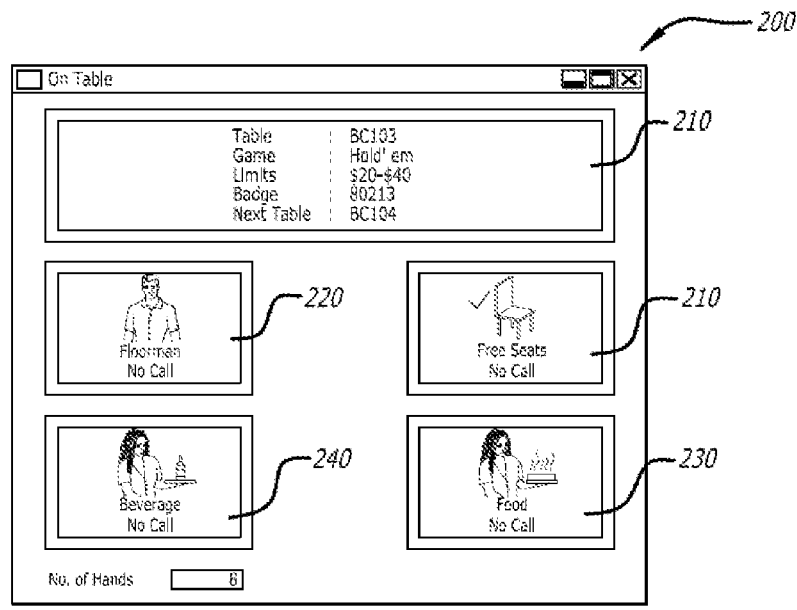
FIG. 2 illustrates a five-button OLED plate device in accordance with one embodiment of the present disclosure.

Referring now to FIG. 2, illustrated is a five-button OLED plate device 200 in accordance with one embodiment of the present disclosure. It should be noted that the OLED device can be configured with a touch screen as shown in FIG. 2 or with actual physical buttons. The OLED device may have its own circuit board which is plugged into a controlling board via a USB port.

Each table may be equipped with a set of five OLED touch screen buttons such as the one shown. The uppermost touch screen button 210 may display information about the game that is currently assigned to the table, the game's limit, the table number for the game as well as the badge number of the current dealer.

The remaining four touch screen buttons on the five-button OLED configuration may be assigned various functions based on casino preferences. These functions are described in more detail hereinbelow and may include free seat alerts, floorman calls, jackpot alerts and food/service calls. If an OLED button has not been pressed by the dealer, the button may display the words "no call". After the button has been pressed, it may display the word "call" until the button is released by casino personnel, e.g., those responding to the call.

A touch screen button having a free seat alert functionality such as button 220 may be pressed by the dealer when the dealer has a free seat at his table after a player leaves. When the free seat button 220 is pressed, it may automatically trigger an alert to be displayed to a wide viewing audience—e.g., a large screen display or auto ticker—to other casino personnel responsible for filling seats. For example, a board person may have access to this screen. The board person can then page the next standby player for the game and limit that is being played at the dealer's table.

A touch screen floorman call button 220 may be pressed by dealer when incidents occur for which the dealer needs assistance. Activation of the floor man call button may generate a screen alert for the rotation coordinator who can than inform the floor staff via casino-wide media, e.g., large screen displays, auto tickers or public address systems.

A touch screen beverage service button 240 may be pressed by the dealer when a player needs beverage service. The beverage request may be automatically displayed, for example, on one of the large screen casino displays 137, 147, 157. The beverage service calls may be ordered chronologically. A timer may be used to indicate how long ago a beverage call was placed. When a waiter has come to the table, he/she may release the beverage call button 240 thus confirming having received a player's beverage order.

A touch screen food service button 230 may be pressed by the dealer when a player needs beverage service. The beverage request may be automatically displayed, for example, on one of the large screen casino displays 137, 147, 157 or one or more auto tickers 195. Like the beverage service calls, the food service calls may be ordered chronologically. Also, like the beverage service calls, s timer may be used to indicate how long ago a beverage call was placed. When a waiter has come to the table, he/she may release the food service call button 230 thus confirming having received a player's beverage order.

Having all the information received from the OLED buttons, as well as other information stored in a central database, permits the casino operations management system to provide a number of details about the number of orders per hour, the number of employees available to service these OLED calls, average response time and delays. This information may be displayed in chart format to a user of the casino operations management system.

The OLED buttons may be configured to perform a number of functions. For example, the OLED buttons may be configured to act as a jackpot button which may be pressed by the dealer to indicate that a player has won a jackpot at the dealer's table. Activating a jackpot button may generate alerts to the rotation coordinator and other casino personnel.

The OLED buttons can be configured for any other function on the fly as needed and can be adjusted for future needs.

Figure 3:
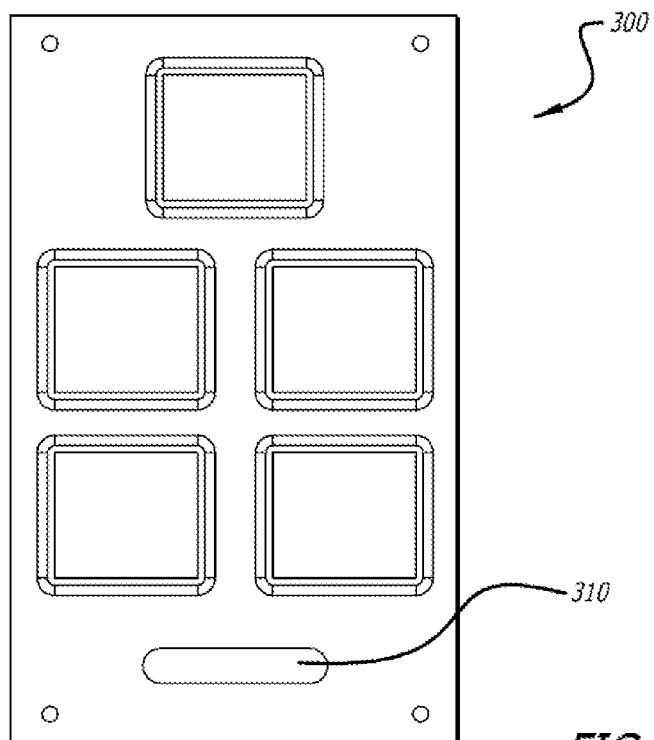
FIG. 3 illustrates an OLED button plate configuration having a slot in accordance with one embodiment of the present disclosure.

Referring now to FIG. 3, illustrated is an OLED button plate configuration 300 having a slot 310 in accordance with one embodiment of the present disclosure. This slot can be equipped with a radio frequency identification (RFID) reader for reading RFID chips that are deposited into a box that may be located underneath the OLED plate.

In this manner, chip counting may be automated and redundant with the goal of reducing or eliminating mistakes that may be made by casino personnel. It may also reduce labor costs in the count room and accounting.

In lieu of an RFID reader, the slot may be configured with an optical device that counts the dealer hands per down, meaning that if the down is thirty (30) minutes it will register how many hands that dealer dealt in that thirty-minute time period.

The OLED plate configuration may also keep track of the player's time at the table either by using a slot scanner to scan the card, incorporating a separate reader to swipe the player's card at the table.

The OLED configuration may be configured so that in tournaments, one of the buttons can be used for keeping track of re-buys.

The OLED buttons can be configured to show the table information including not only the type of game and game limit, but also the game's collection based on the number of players playing. For example it may show: 7 to 9 players $3 collection per hand; 6 players $2 per hand; 5 players or less $1 per hand.

The OLED buttons may be configured to display the dealer's name and the next table to which the dealer is to rotate in order to promote ease of rotation and to reduce or eliminate errors associated with a dealer rotating to table for which the dealer is not scheduled.

Since the OLED buttons will interface with a central server, information transmitted or received to the OLED button system may be made available to any department provided they will need to have access to this information. For example, cage employees may use the information in order to extend credit. Security may use information from the buttons to designate barred or reinstated patrons. Surveillance may use the OLED button information in conjunction with monitors throughout the casino in order to verify whether a player pictured in the monitor matches a picture from the database. This functionality may be particularly useful to surveillance where a player is being paid a jackpot or high hand.

A surveillance module may interface with cameras 142, 144, 146 located in the casino. The cameras 142, 144, 146 may be mapped in the casino operations management software to the location of a scanner suitable for swiping unique personnel identification cards. A dealer may swipe his/her unique personnel identification card to notify the system that a jackpot is occurring at his/her table. Cameras having assigned numbers may be directed to that dealers table. For example, a dealer may be located at table 3. That table may have cameras that have been designated as nos. 15, 16 and 47. When the dealer hits an OLED button that has been configured for jackpots, an alert may display to surveillance personnel who may be located in a single room. Casino personnel, e.g., the dealer or floor person may swipe the player's card at the table 3 to confirm the player's identity. Alternatively, the player himself/herself may swipe his/her card.

In the surveillance room display, the table that hit the jackpot may flush until the surveillance user opens that table. On the table, surveillance personnel may see the dealer's name, the floor person's name, the players to be paid, the players' pictures and the amount each player will be paid.

Moreover, in the surveillance view, the user may view hyperlinks associated with each of cameras 15, 16 and 47 that may play recorded information from the time the jackpot was confirmed by casino personnel. The surveillance user may confirm the validity of the jackpot when the player's picture matches the player shown by the camera. The cage may then pay the jackpot amount.

Using the surveillance module, incidents may be recorded and may be correlated with imaging information from cameras assigned to various casino locations. These recorded incidents may be later reviewed or attached to a particular player's casino information.

The OLED buttons may be used in conjunction with a marketing module in the casino operations management software to manage mailing lists, track points and track player activity.

The OLED buttons may be configured to interface with other applications such as restaurant point of sale terminals so that players may redeem the points against food orders.

Figure 4:
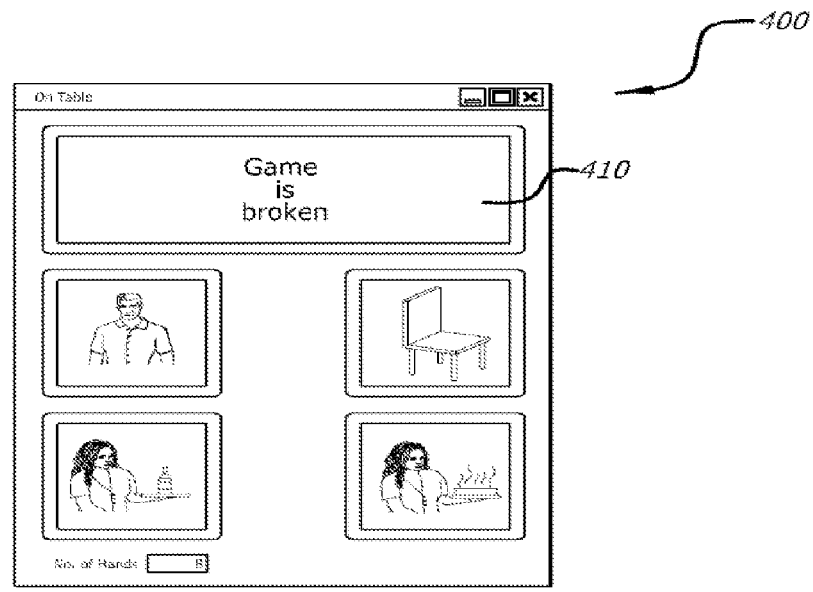
FIG. 4 illustrates another OLED button plate configuration in accordance with one embodiment of the present disclosure.

Referring now to FIG. 4, illustrated is another OLED button plate configuration 400 in accordance with one embodiment of the present disclosure. This configuration may be used when a table is not open for playing. As shown, the top button 410 shows the game is broken. The remaining buttons are shown as shadows and are not operative.

Figure 5:
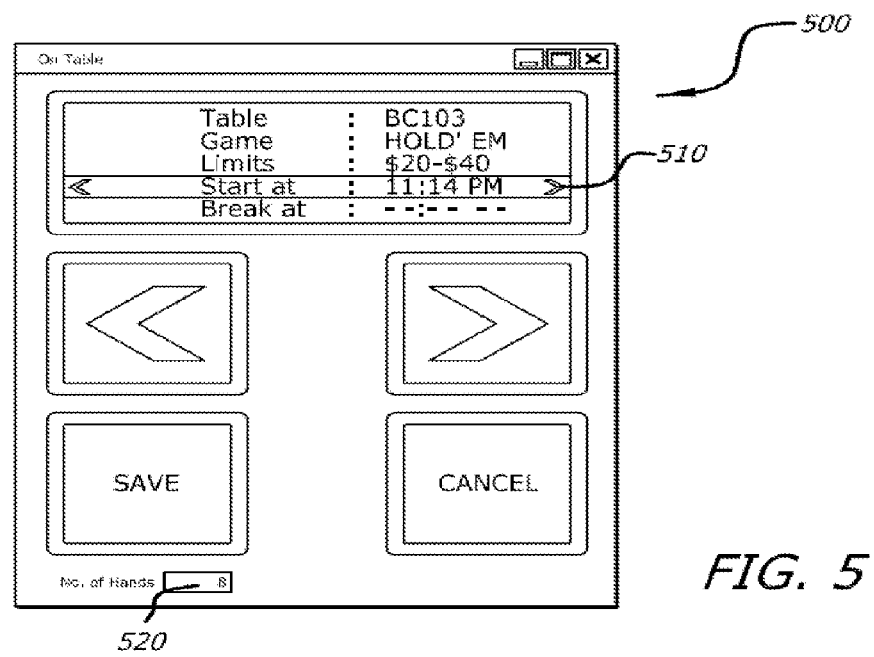
FIG. 5 illustrates yet another OLED button configuration in accordance with one embodiment of the present disclosure.

Referring now to FIG. 5, illustrated is yet another OLED button configuration 500 in accordance with one embodiment of the present disclosure. This button may be displayed by a casino rotation coordinator to indicate when the game is starting. Here, as shown at button 510, the game is starting at 11:14 am. The casino operations management system of the present invention may permit the floorman or other casino personnel at this stage to modify the game and the limit from the table if he/she notices that the posted game or game limit is inaccurate.

At the bottom of the screen at box 520, the number of hands the dealer dealt per down is shown as eight (8). Each dealer may be tracked for the number of hands dealt during the push time which can be 30 or 40 minutes, or any other time period permitted.

Casino Operations Management Software Modules.

Various software modules of the casino operations management system will now be described. The casino management system may be configured to define the employees to be managed by the casino management system. Employees may include dealers, chip runners, cashiers, cage supervisors, floor supervisors, count room employees, count room leads, count team supervisors, security, card desk employees, equipment room (geco room) employees, users and vault cashiers. The casino management system may be configured to track the activities performed by the employees. The employees may be logically expressed as entities and grouped according to their roles within the casino.

Each employee, contractor or other worker present in the casino may be deemed casino personnel. Each of these casino personnel may be managed by the casino operations management system. Each such person may be associated with a unique identification code that is stored on a unique personnel identification card. These unique personnel identification cards may be used throughout the system for operations such as signing in to work or identification at the cage when performing various operations.

The casino management system may be further configured to create and assign security roles to the users of the system. The system can control access to each individual module of this computer-based system.

The casino management system may be configured so that it is user-customized to track or monitor situations related to incident types, game limits, and section names.

The casino management system can be configured to display table rotation information in one or more casino sections. An automated application may be used to run continuously and displays information about the current table rotation in the sections.

The casino management system provides functionality for dealers to perform self sign in operations. When a dealer swipes his/her card, his/her information becomes immediately available to casino personnel—including those personnel who may be dealer coordinators—who are thereby informed that a particular dealer has come to work and is available for table assignment.

The casino management system described herein includes software that permits a section view that displays and manages casino activities according to pre-determined and/or pre-defined sections of the casino. These sections may be based on actual physical locations. Alternatively, the sections may be determined according to the type of game, e.g., all poker sections being grouped together. Still yet alternatively, employees may be sectioned according to entity. Thus, personnel such as dealer coordinators, i.e., those personnel who oversee and manage the dealers, particularly scheduling, to keep track of all tables in the rotations, the games dealers are playing and game limits. The system may permit dealer coordinators to make regular changes in dealer rotation based on a predefined time interval since it may be desirable to have dealers switch tables periodically.

Dealer coordinators may also be able to keep track of dealer breaks and dealer drops, i.e., the amount of money a dealer is to return to the casino at the end of the dealer's shift. Moreover, the system permits casino personnel to keep track of dealer schedule so they can be set free when they finish their schedule. Moreover, the system may automatically notify the dealer coordinator that certain dealers are working overtime. This functionality helps to make sure that dealers are properly paid for their work since a number of states require that overtime is paid after an employee labors for more than a specified number of hours per week.

During the course of casino operations, numerous and varied financial transactions occur. The present system includes "cage" functionalities that focus on the operations that casino employees perform at a cashier's desk. The cage may be the financial center of a casino. The cage is often tightly controlled since many financial transactions involving large sums take place here.

An example of a transaction that may occur at the cage is that cashiers can record transfers of funds amongst themselves. Using the system, when cashiers finish their shifts, they can print a shift activity report outlining all transactions for the day and the amounts received.

Also by way of example, players may go to the cage cashier to "cash out," whereby they will exchange their chips for currency. These transactions may be recorded as well using the system of the present invention.

In addition, dealers may go to the cage before the start of a shift to pick up money to be kept at their game tables. Dealers may return to the cage at the end of their shifts to return the money they kept at the game table. For every dealer, the system records the exact date and time when the individual picked up the stocked money and when it was returned.

Whenever a dealer has retrieved money to keep at his/her table, the software included within the casino management system ensures that additional monies cannot be taken out again until the first amount of stocked funds is returned. At the end of each shift, dealers may be required to pay the drop amounts approved by the dealer coordinator. The casino management system may be used also to automatically compute the amount of the dealer's drop based on the number of tables the dealer has worked in that shift. The system can also keep track of the drop payments made by each dealer without a direct relation to the table assignment. Accordingly, dealers may use an input device (such as a touch screen device described hereinbelow in connection with FIG. 30) at a dealer terminal to enter their own drop into the system. The dealer drop may be any amount required by the casino, e.g., fifteen percent (15%). The casino management system also provides for compiling and printing reports on casino operations. Based on the data collected from modules of the software, casino personnel may generate reports that may be used to analyze the activity and performance of the casino. These reports may be grouped into categories which include, but are not limited to: dealer schedule reports; dealer performance reports; dealer drop reports; casino situation reports; cage situation reports; or other reports that can be configured using this system.

The system may be configured to include casino-specific details, including the casino's contact information, logos or brand images and other general information.

The system includes an attendance controller module for tracking all casino employees. Each individual can be associated with one or more entities or employment roles in that casino. Each role may have attributes that are predetermined by those configuring the casino management system.

Information from each software module may be accessed by the casino operations management system so that such information is made available to other software modules. Thus, for example, information from the attendance controller module may be made available to the dealer rotation module.

Figure 6:
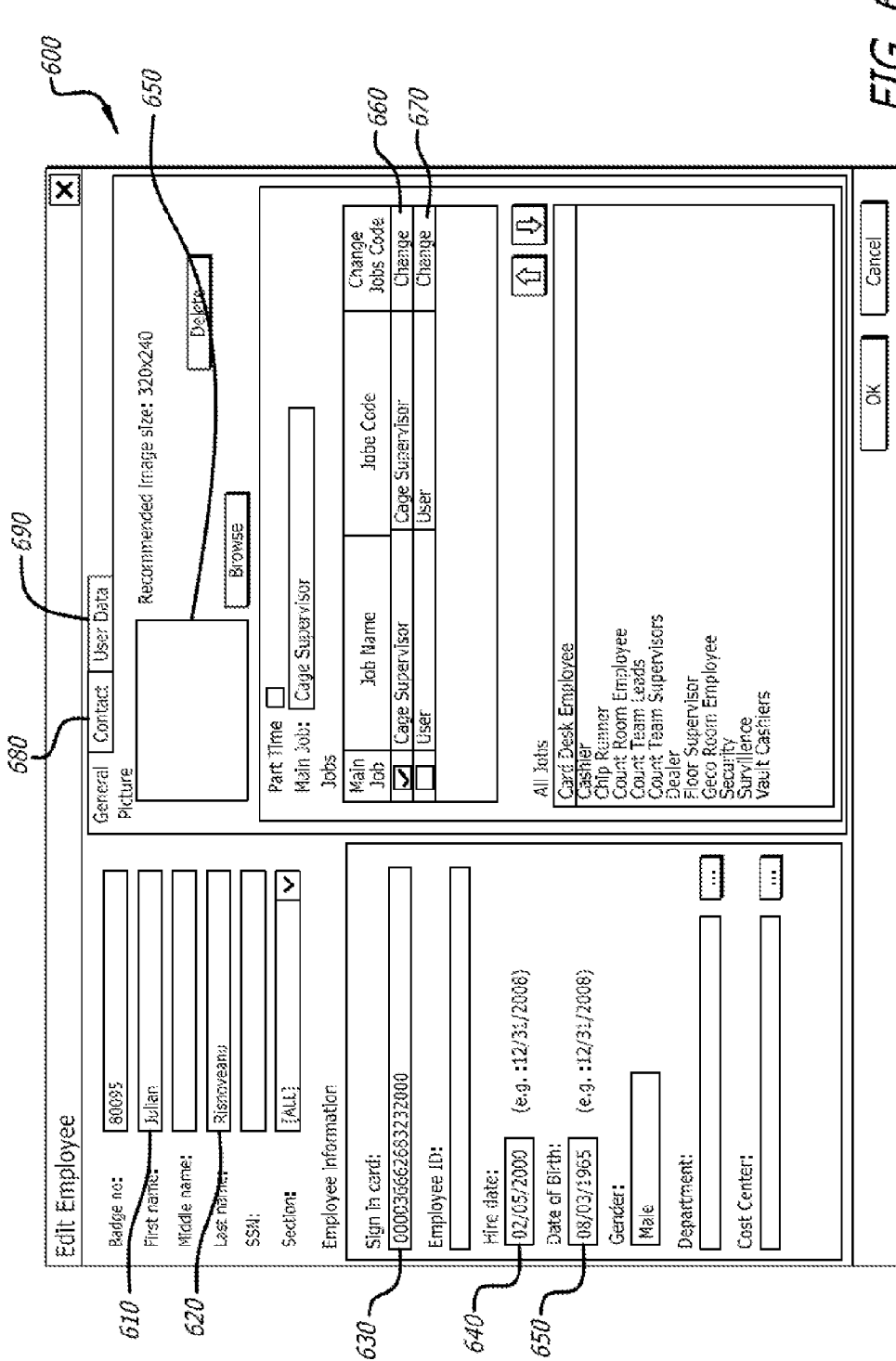
FIG. 6 illustrates an attendance controller module screenshot for user entry of employee and entity information in accordance with one embodiment of the present disclosure.

Referring now to FIG. 6, illustrated is an attendance controller module screenshot 600 for user entry of employee and entity information in accordance with one embodiment of the present disclosure. Here, the user is editing employee information for the employee whose first and last names are shown at text boxes 610, 620. The unique identification code for this employee's sign-in card is shown at text box 630. This employee's date of birth is shown as Aug. 3, 1965 at text box 640.

A photo of each employee may also be entered into the system. Here, the field for a photo is shown at box 650. However, because no photograph has been input into the system, this field is blank. An entity designation has been assigned to this employee at text box 660. Here, at text box 660 the employee's main job is shown as cage supervisor. Because the casino has determined that cage supervisors may also have access to the casino management system, the cage supervisor is also assigned the entity of "user" at text box 670. Contact details for a particular user may be viewed by selecting tab 680. User data may be reviewed by selecting tab 690.

The attendance controller module may be used to create schedules for one or more employees over a desired time, e.g., over the course of a year. As each employee reports for work, the employee's activity may be recorded in the database for each shift.

Figure 7:
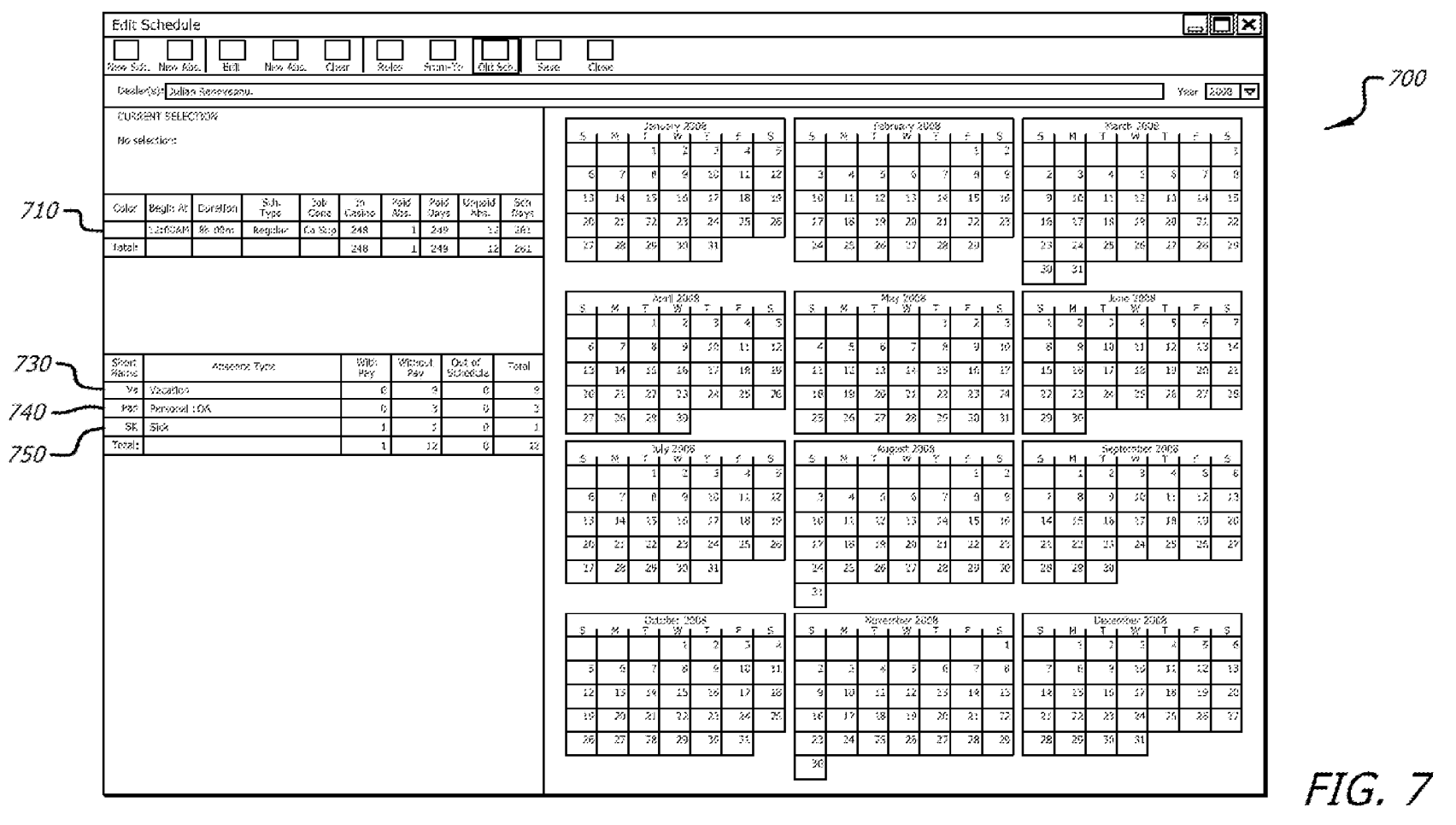

Referring now to FIG. 7, illustrated is a screenshot of an employee schedule 700 in accordance with one embodiment of the present disclosure. The schedule information includes employee start times as shown at row 710. Here, the employee begins at 12:00 am. Also as shown at row 710, the employee is scheduled to be in the casino for 248 days during the year with 1 day of paid absence and 12 days of unpaid absences. Greater detail on absences is shown at rows 730, 740, 750. As shown at row 730, the employee is scheduled for 9 days of vacation without pay. The employee is also slated for 3 days for a personal leave of absence and 1 sick day with pay as shown at rows 740, 750, respectively.

At the right portion of the employee schedule screenshot 700 is a calendar view for the year 2008, that shows the specific days during which the employee will be unavailable. For example, as shown for January 2008, the employee is slated for vacation days on January 1, 3, 4, 5, 6, 8 and 10-12. As shown for May 2008, the employee is slated for a personal leave of absence on May 8-10. Also as shown for Sep. 2, 2008, the employee is slated for 1 sick day with pay. As illustrated, in a single screenshot, authorized users of the casino operations management software may view an employee's schedule.

Employee schedules may be created using the casino operations management software. The schedule may define for an entire year the days and hours the employee is scheduled to work. This information may be used to determine if the employee is on time or not when the employee swipes his/her card and signs in to work.

The scheduler may specify the start and end times of schedule on a weekly basis, for each day of the week. Referring now to FIG. 8, illustrated is a weekly rules screenshot 800 that illustrates how rules may be created, on a weekly basis for scheduling purposes, including employee start and end times. Here, the user/scheduler is creating rules for the 2008 calendar year as shown by the dates at the upper left portion of the screen. For each day, the user is also able to specify the time interval for which an employee is slated for duty. For example, the user has input a check mark for the days of Sunday, Tuesday, Thursday, Friday and Saturday. The hours to be worked by the employee are from midnight to 8 am. The user is also able to specify the employee's job function for a particular day. Here, the user has specified the employee as a cage supervisor.

Figure 9:
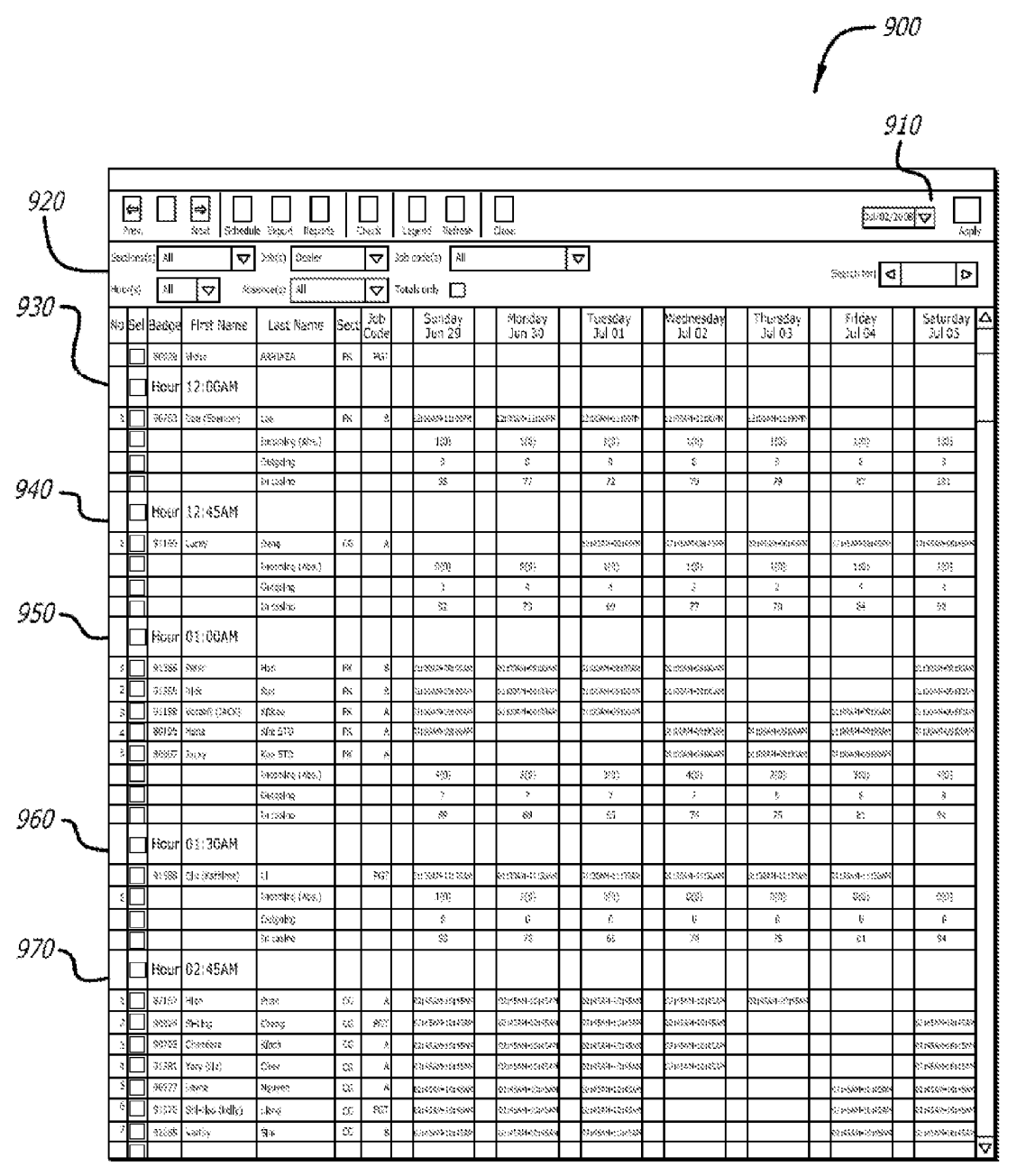

Once an employee schedule created, scheduling information may be presented under various formats. Referring now to FIG. 9, illustrated is a schedule screenshot 900 that shows the employees who are scheduled to work at a specified time of day. A schedule that has been formatted for a weekly view may not only show employee schedules for the week, it may also further drill down within the schedules, e.g., to a specific hour or minute as shown. As shown, the user has compiled a schedule for all employees with the designated entity of dealer as shown at screen area 920. The date for which the schedule has been compiled is Jul. 2, 2008 as shown at text box 910. Although the user has requested the schedule for July 2, the software provides scheduling information for the week that includes Jul. 2, 2008. Here, scheduling information is shown from Jun. 29, 2008 to Jul. 5, 2008.

As shown at rows 930, 940, 950, 960, 970, the schedule has been broken down according to the specific times of 12:00 am, 12:45 am, 1:00 am, 1:30 am and 2:45 am, respectively. The casino operations management software has broken down according to these time slots, specific dealers who are to appear for work.

Employee absences may also be recorded in the casino management system in connection with its attendance controller. The user may record the reason for the employee absence, such as reasons due to sickness, vacations, medical leave, or other reasons. The user may configure the system so that it includes other categories for absences for recording by the system. The reason for a particular absence may be displayed in the employee's calendar view or in other views. For example, in FIG. 9, the screenshot 900 shows the number of absences for employees who are scheduled to work for a particular date. The screenshot also shows how many incoming dealers are scheduled to start at a particular time. Also, the screenshot shows how many outgoing dealers are scheduled to finish their shifts at a particular time. In casino dealers/employees are shown as those that work staggered shifts or are in between main shifts.

Referring now to FIG. 10, illustrated is an absence definition screenshot 1000 that displays potential reasons for employee absences and the pay consequences, e.g., "without pay". Each of the twelve (12) categories of absences has been defined by the system. For example, at line 4, personal leave of absence is abbreviated as Psn and the default pay category is without pay. Each casino may define these absences according to their own policies. For example, if there is a limit on the days off that can be taken, and an employee exceeds those days by taking off additional days, the excess dates may be defined as without pay. This option gives the casino the ability to quickly determine whether an employee absence should be with or without pay. However, when an authorized user having proper permissions logs on to the system, they may be permitted to change the notation for a particular date or all dates to with pay.

Upon arrival at the casino, employees may swipe a unique badge or card through a reader/scanner terminal. Alternatively, employees may sign in using a password at a workstation or other type of computing device. The time of the employee's card swipe may be recorded in the casino management database, representing the time the employee arrived for work. If the employee has arrived after his/her scheduled time of the day, these late arrivals may be automatically recorded.

Figure 11:
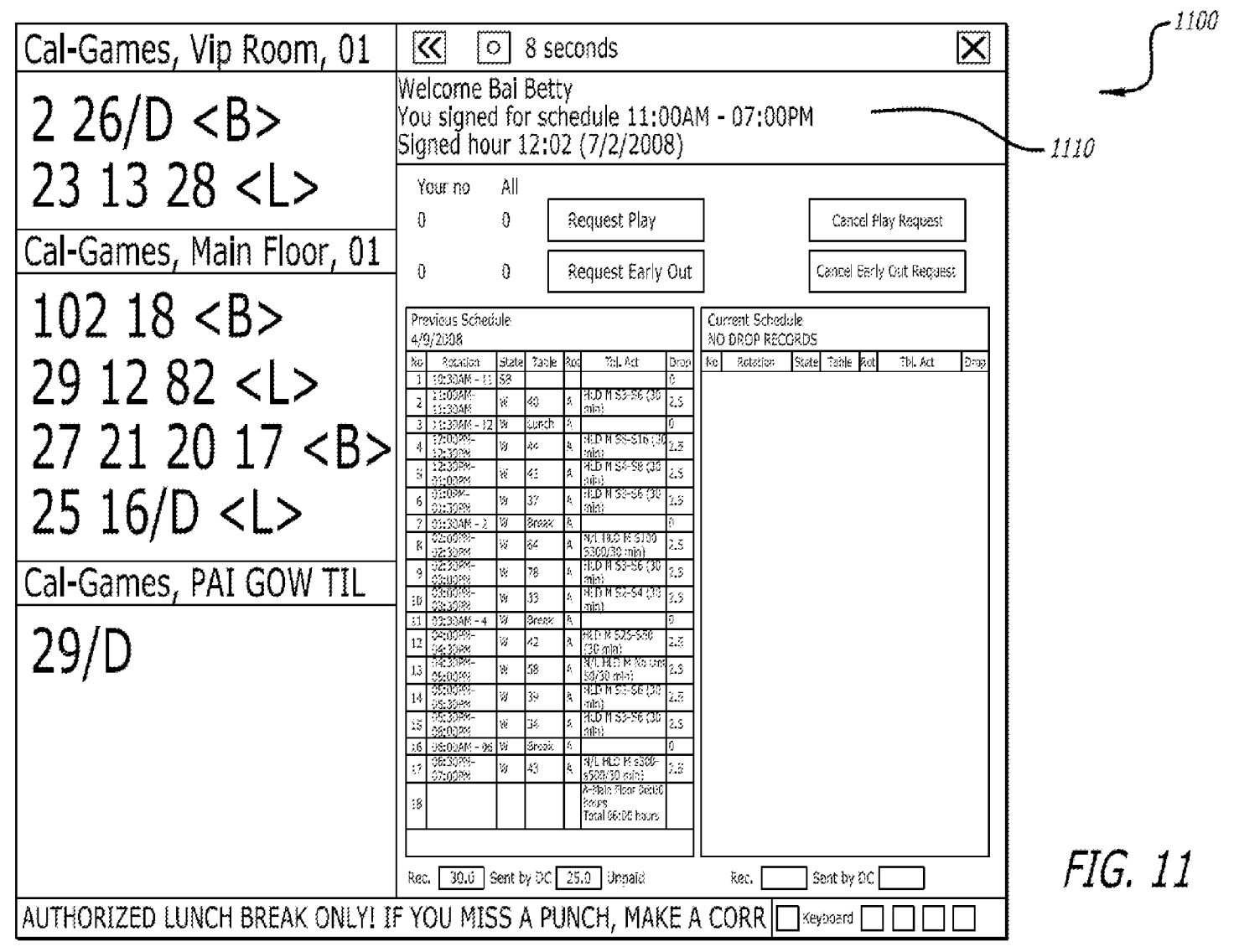

Referring now to FIG. 11, illustrated is an employee sign-in screenshot 1100 that may be retrieved from the system in accordance with one embodiment of the present disclosure. This particular screenshot 1100 shows a late arrival. Here, as shown at text box 1110, the employee arrived for work at 12:02, despite being scheduled for an 11:00 am arrival.

The system may be used to report, record and display employee incidents. When an incident occurs on the casino's premises, a user may record the incident and associate the incident with an employee's record. Casino personnel may only be permitted to add or view incidents where they have the proper user permissions.

Figure 12:
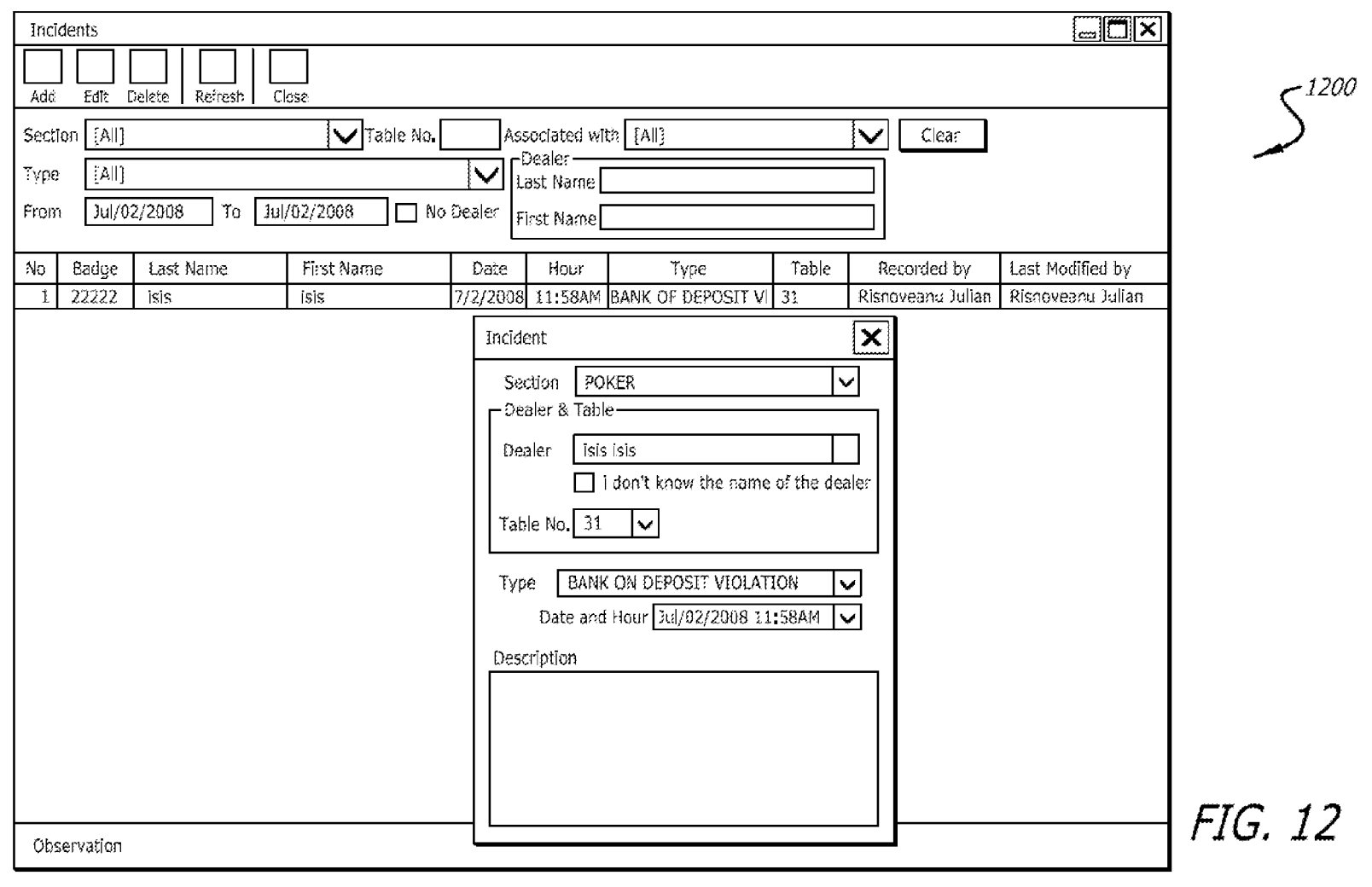

Referring now to FIG. 12, illustrated is an incident entry screenshot 1200 that shows a user adding an employee incident in accordance with one embodiment of the present disclosure. Dealer incident reports may include the location (e.g., table) where the incident occurred, the time, the type of incident and a short description.

Here, the user is making an incident entry into an employee record for "Isis Isis". The incident is being reported as having occurred in the Poker Section at Table 31 on Jul. 2, 2008 at 11:58 am. Incidents may include, among other things, an employee's failure to return his/her "bank" or the amount kept at the dealer's table. Apparently, in the present screenshot 1200, this failure to return the bank was deemed a bank on deposit violation. Here, the employee did not return her bank within the allotted time after work. This time may be set according to casino rules, e.g., 30-45 minutes after a shift. The casino operations management software may permit employee incidents to be valued on a point system. For example, where an employee reaches 30 points, there may be a referral to human resources to determine why the employee has so many points.

In the settings and configuration of the casino operations management software, the user may determine the types of incidents that the casino wishes to record. Examples of the types of incidents that may be recorded in a casino include drinking on the job, calling in sick, rotating tables after the scheduled times, and no-calls/no-shows.

Employee evaluations may be a part of the casino management system. As with personnel of many other businesses, casino personnel may be reviewed periodically to assess their work performance. The present system manages the evaluation process by automating the review scheduling, notifying the involved parties in advance and storing the results of the review. These results may be associated with an employee record in order to complete the individual profile.

Dealers may play important roles in casino operations. Dealer rotation from table to table may be desirable in order to permit dealer breaks without interfering with the games. In order to manage this rotation, casinos may hire an entity known as a dealer rotation coordinator, whose employment role may include assigning dealers to tables, managing the table rotation and the floor activity. The casino management system of the present disclosure provides a comprehensive module for these and other activities.

Fairness in dealer rotation may be an important aspect of casino operations management. Where fairness is not present, dealer morale may suffer since their incomes are affected by the tables they are assigned. A dealer may make more income where they have been assigned to tables having games with high game limits. Moreover, it has been known for dealers to give kickbacks in exchange for good table assignments. Such kickbacks may often be considered illegal. The casino operations management system of the present disclosure addresses concerns with improper kickbacks and fair dealer rotations. Using this system, casino personnel having proper permissions may limit a rotation coordinator's ability to assign dealer rotations. For example, such casino personnel may limit a rotation coordinator's ability to assign dealers to a random daily basis or a random weekly basis. A rotation coordinator's ability to assign dealers may also be limited to a first come-first served basis, or on a rotating basis according to the day of the week.

Using the random daily dealer rotation functionality, for example, during each shift a rotation coordinator may have a number of tables and dealers to assign. If the rotation coordinator has ten (10) tables, and fifteen (15) dealers, the system may be configured to randomly assign the first ten (10) dealers from the group of fifteen (15). The system may then assign numbers to each of the remaining five (5) standby dealers. The number may determine the order in which the remaining dealers will start to work tables as they become available.

Using the random weekly dealer rotation functionality, for example, the system may generate a random number to each dealer who is scheduled to work in a given week. The system may be configured such that this random number cannot be viewed by employees or the rotation coordinator until a dealer signs in for work on a particular day. The dealer with the lowest number may receive the first table in the rotation. In some casinos, the first tables in the rotation may provide a better chance for the dealer to make money.

The system may include alerts that are displayed to upper management when the rotation coordinator does not follow the assignment rules. For example, if the rotation coordinator gives table one from rotation to the dealer with the third lowest number as opposed to the dealer with the lowest number, the alert may be displayed. The alert may also display where dealer ratings or skill levels are inconsistent with the table assignment. For example, a dealer with an A rating may be considered a top level dealer. A dealer with a B rating may be considered a lower level dealer. If the B dealer is assigned to a table when an A dealer is in standby, an alert may be generated and displayed by the system. Moreover, alerts may be displayed in other situations. For example, an alert may be displayed when a rotation coordinator has dealers on standby for more than a predetermined period of time, e.g., two hours.

Using the rotating basis according to day of the week functionality, dealers who are scheduled for a particular week may be given differing rotations according to the weekday for which they are scheduled. First, dealers may be grouped according to their first day of work for a particular week. For example, some dealers may start on Monday. Other dealers may begin their work week on Tuesday or on a day that is later in the week. Dealers may be assigned a number depending on the day they start work. For example, dealers that start on Monday may be assigned a set of random starting numbers, while dealers that start on Tuesday may be assigned another set of random starting numbers. For example, each of five dealers that start on Monday may be assigned a random number of one through five. For the first week on Monday, the dealers may rotate according to the numbers consecutively, e.g., the dealer assigned the number one may go first, while the dealer who was assigned random number two will go second, and so on. However, for the second week, the Monday dealers may rotate according to their random number such that the dealer assigned number one will go last in the second week. Essentially, in the second week, this dealer will be number five. Each week thereafter, the dealers at top may rotate, thus moving to the bottom each week.

Using the first come, first served dealer rotation assignment functionality, rotation coordinators may be limited to assigning the dealers on a first come, first served basis. In essence, the dealer that signs in first may take the first available.

Figure 13:
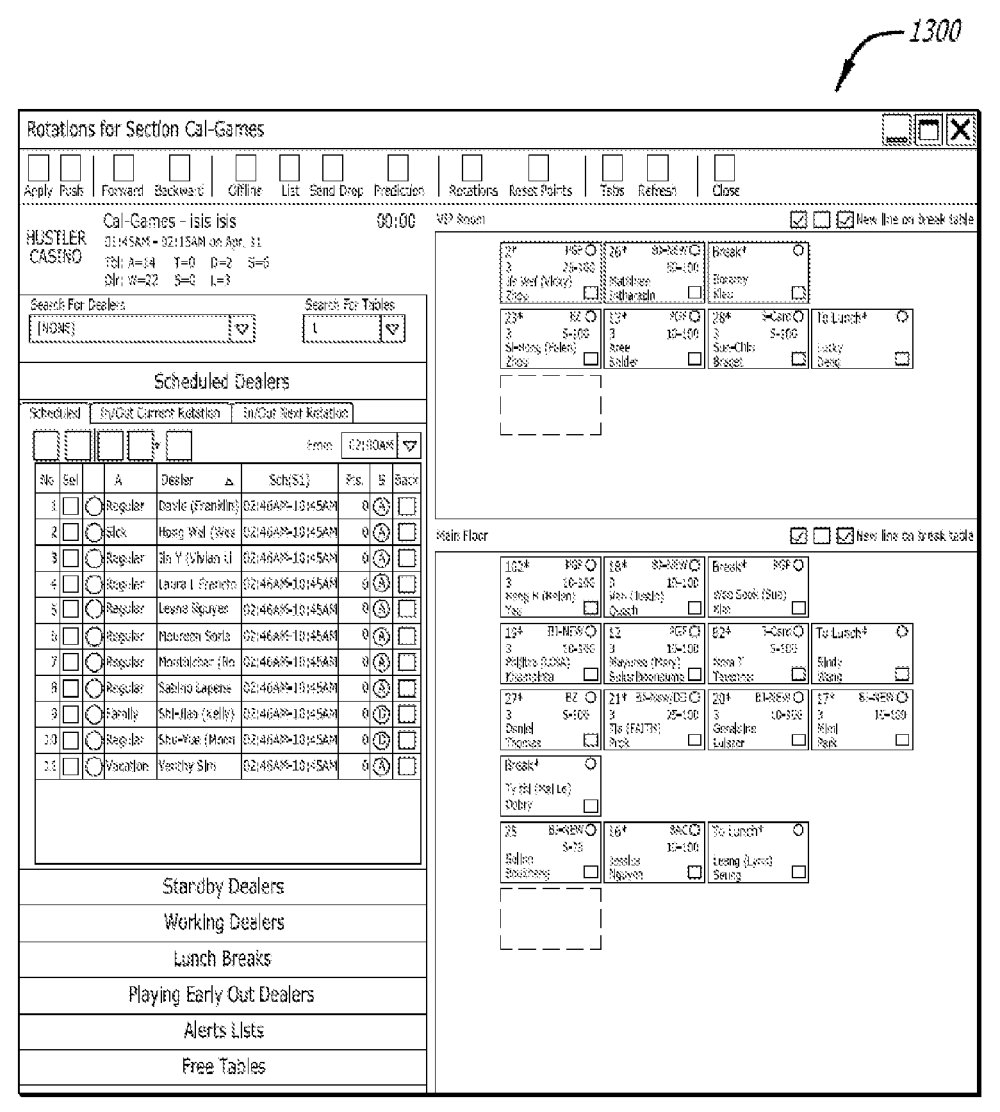

Referring now to FIG. 13, illustrated is a screenshot displaying a section view for dealer rotation 1300 in accordance with one embodiment of the present disclosure. The user has grouped the dealers scheduled to work from 1:45 am to 2:15 am.

Dealers may sign in for work by swiping their unique personnel identification card. The system may show their status as standby, indicating that these dealers are ready to work. The system may also include information as to ratings or skill levels for the dealers. For example, on the left portion of the screen next to the first name for the scheduled dealers on the list, David Franklin, "A" may be used to mean that the dealer is highly skilled so that the dealer may work in top areas of the casino, e.g., the VIP room, top qualification. "D" may be used to denote a Tile dealer. "C" may be used to denote the main floor. A square, such as that shown next to the dealer's name in line 7, could be used to denote a tournament dealer.

On the left portion of this dealer rotation screenshot 1300, the user (e.g., a rotation coordinator) has grouped all dealers according to their status as scheduled, standby, working, etc., in different view panes. Scheduled dealers may be defined by the casino management system as all the dealers that are scheduled to work for the current date. The dealers working that day have been grouped according to the hour they are coming in. Here, the standby dealers have been defined as those individuals that have signed up for work and are awaiting table assignments. The working dealers view shows all the dealers that are currently working at the table. The lunch breaks view may be used to keep track of all dealers and their breaks for the day.

The playing and early out view may be configured to show dealers who have been approved to leave their shifts earlier than scheduled. Dealers may sign up on waiting lists requesting that either they leave early or play on the casino floor. The rotation coordinator may be required to approve these requests before the dealers are released from the scheduled obligations. Using lists such as those shown on the left portion of the screenshot, the rotation coordinator may quickly determine the status of dealers.

On the alerts view, the rotation coordinator or other personnel may be notified when dealers have not returned their banks to the employee cage at the end of their work shift. Alerts may also be triggered when dealers have not paid their drop, showed up late or work overtime.

Still referring to FIG. 13, the right side of the dealer rotation screenshot 1300 shows the current position of table rotation. In each casino section, a number of rotations that may be predefined. Each rotation may represent an ordered grouping of tables. Rotations are shown for both the VIP room and the main floor in this illustration.

The casino management system of the present disclosure may provide for two methods for creating rotations. One such method may be a free float. Using the free float mode, the rotation coordinator may drag and drop a free table to the desired position in the rotation. The result may be that the tables are automatically arranged so that the free table is rotated in the desired position. A second method for creating a rotation may be by using a template. Using the template method, it may be desirable that only authorized managerial users (other than the rotation coordinator) have permission to define or modify the order of tables, allowing the rotation coordinator only to activate or inactive the tables.

When a new game begins, a table may be activated. A table may be positioned in the rotation and assigned a game as well as a limit. Furthermore, a dealer may be associated from the list of all standby dealers. For every table assignment, the rotation coordinator may decide to charge the dealer a certain amount (a drop). For example, if the dealer dealt for 30 minutes at a table, according to industry standards, the dealer may make about $100, so up to 15% of $100 would be $15 which may go to a tip pool.

Using the casino operations management software of the present disclosure, casino tables may be given various statuses. The table's status may include working, deadspread, tournament, break, or other statuses can be predefined by the system.

Working status may be used to define a table as currently running a game with seated players. A deadspread status may be used to indicate that the table has a dealer assigned to it, but there are no players seated. A tournament status may be used to indicate that the table is part of a tournament. The rotation coordinator may still be responsible for assigning dealers but the dealers cannot be charged drop. Dealers can't be charged when not making money.

A break status may be used to define a "virtual" table that is used as an exit and entry point for dealers in the rotation. When a dealer is rotated or "pushed" to a break table it means that the dealer can go to break for the time period of the next table rotation. After the dealer's break he/she may return to the rotation at the table after the virtual break table. Using the break status functionality, dealers may be given regular breaks without losing their turns at dealing the tables.

The casino management system may automatically notify the rotation coordinator when to "push" or change the rotation. Using the casino management system, each casino may define the time interval for changing rotation in each section. When the rotation coordinator changes the rotation, the system may save a snapshot of the existing situation in the casino. In this connection, the casino management system may record and store to its database information, e.g., the order of tables in the rotation and details for each table, e.g., the table's status, dealer and game limit. Dealer status may also be shown, e.g., scheduled, standby, working, lunch etc. This status information may be later reviewed on a snapshot-by-snapshot basis or in a user-specified date and time search. When the rotation is changed, the system may automatically rotate all dealers to the next table in order.

Figure 14:
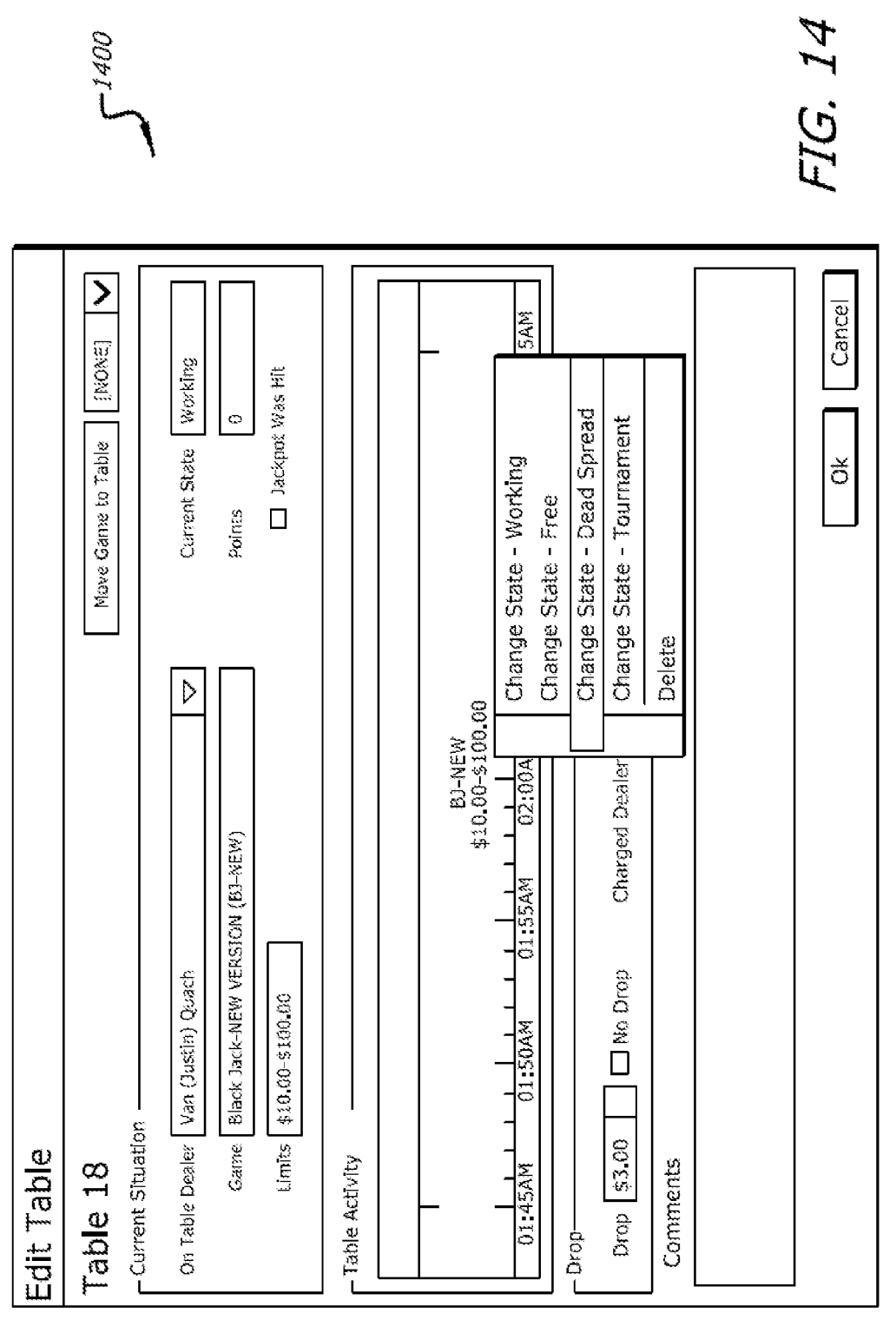

Referring now to FIG. 14 illustrated is a screenshot 1400 that shows a user entry that changes a casino table's status in accordance with one embodiment of the present disclosure. Here, the status of table 18 is being changed from working to deadspread. This table status change indicates that, although this dealer showed up for work, his table has no players. It may be desirable to change a table's status for a number of reasons, including for the reason that a dealer would otherwise be required to contribute to the tip pool if games had been played at this table. Since no one showed up to play, the status has been changed to deadspread. Accordingly, the system will determine that no contribution is required for the dealer working this table.

Referring now to FIG. 15, a table rotation screenshot 1500 is illustrated that shows table rotation according to a dealer's badge number, the time and table in accordance with one embodiment of the present disclosure. For example, in text box 1510, the dealer having the badge number 91571 will be at table 16 from 1:45 am to 2:15 am. For the convenience of casino floor personnel—including dealers—the order of table rotation may be displayed throughout the casino on large screens or led displays. With the information readily available on the screen, dealers can follow their respective positions in the rotation.

The employee cage may be used to receive dealer drops at the end of the day, e.g., at the end of all dealer rotations. When a dealer's workday ends, the sum of all table drops may be computed, validated by the rotation coordinator and thereafter sent to the employee cage where the dealer must pay it.

Figure 16:
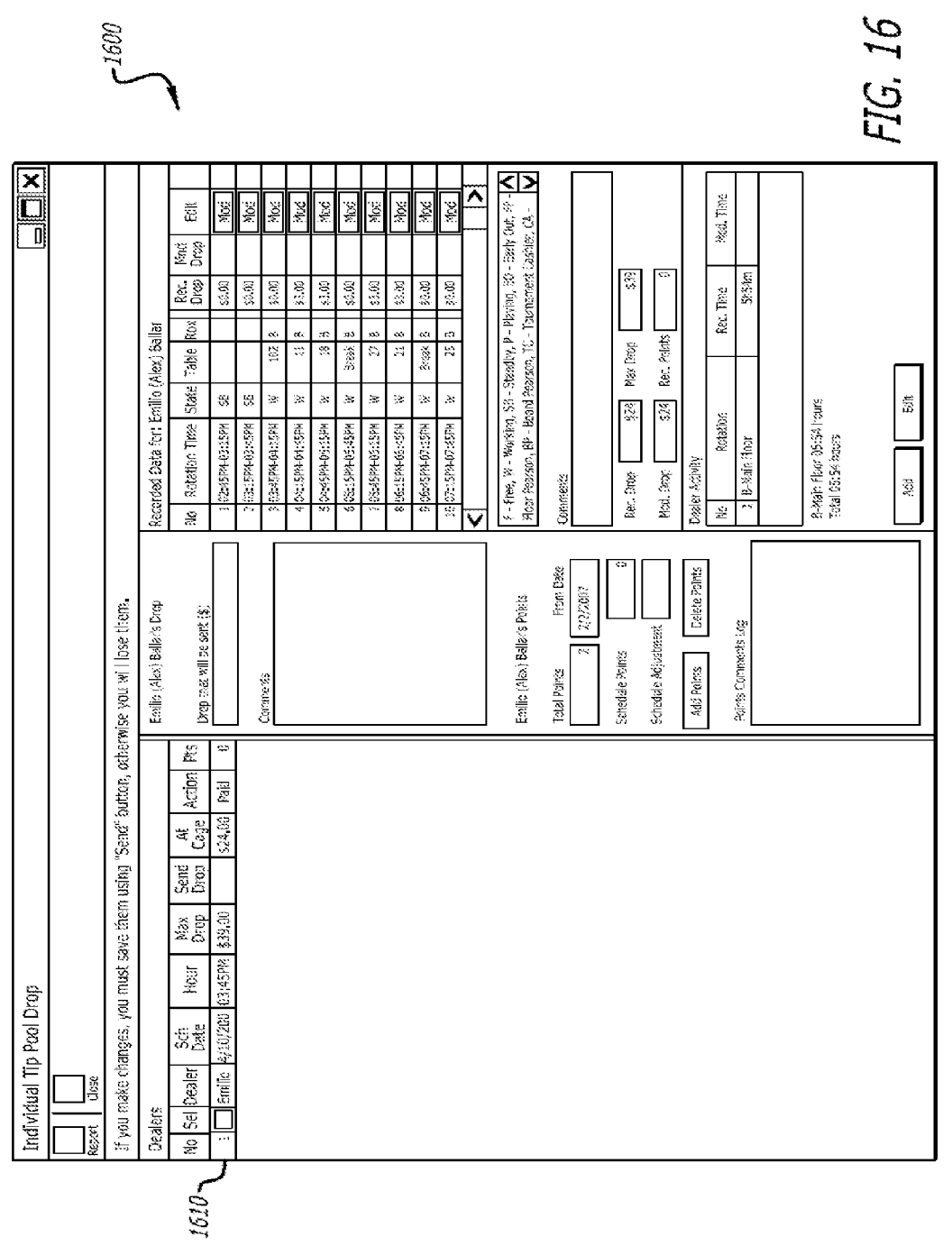

Referring now to FIG. 16, illustrated is an individual tip pool drop screenshot 1600 in accordance with one embodiment of the present disclosure. Using the individual tip pool drop functionality, a user may free a dealer from a current schedule and send the dealer's drop to the cage. In the illustrated individual tip pool screenshot 1600, the employee on line 8 has been selected by the user. It should be understood however, that in the left portion of screenshot 1600, global operations could be configured to be changed, while on the right side of the screenshot 1600, individual records could be configured to be changed by a user having the proper permissions.

Tips due from a dealer for a tip pool may be represented in terms of points. Here, in screenshot 1600, the dealer has two (2) points, and has paid $24 in tips. The tip amount to be contributed by each dealer may be determined based on historical data or industry custom. For example, a $3 average per table may be the amount displayed by the system as due from dealers.

At the right side of screenshot 1600, recorded data for the current selected dealer is shown. Also shown are the rotations and the drop for every table. At the end of this list, the user can find the sum for the entire drop and if necessary the modified drop value. A dealer's drop may be modified by first selecting the dealer in the dealers list section. As shown at row 1610, the particular dealer for which the tip drop is to be made has been selected. After selecting the dealer's name, the recorded data may be updated by the system. Rotation drops may also be modified using this screen.

A rotation drop may also be modified by selecting an Edit Rotation Drop window (not shown). The user may then enter the new value for the selected rotation and a comment describing the motive and click the OK button. The system will then find the amount of drop that will be sent to cage and the current dealer's points.

Figure 17:
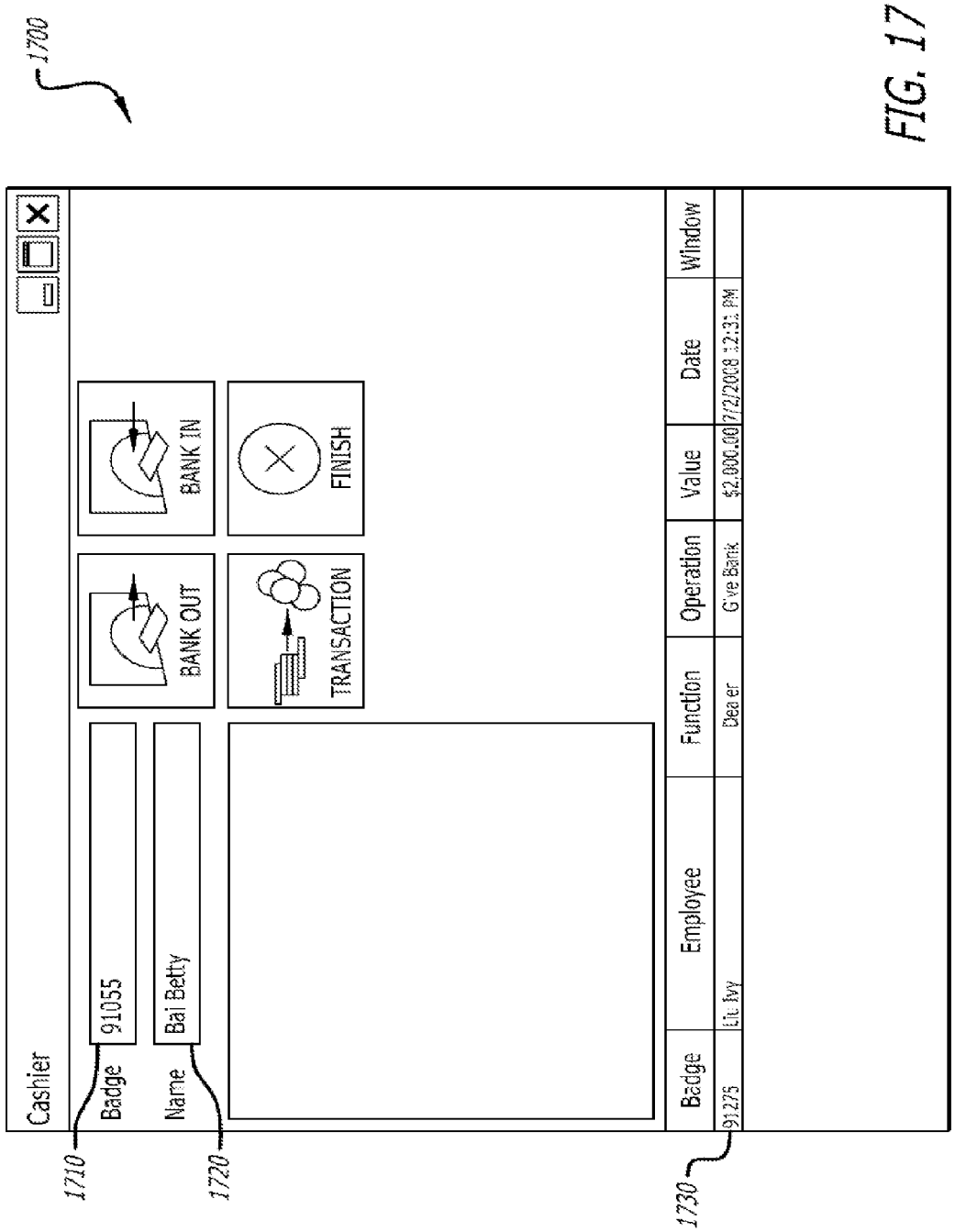
FIG. 17 is a screenshot that may be used to input a cashier transaction in accordance with one embodiment of the present disclosure.

Cashiers play an important role in casino operations in that a significant number of financial transactions as well as a significant amount of money may be handled by these casino entities. Referring now to FIG. 17, illustrated is a screenshot 1700 that may be used to input a cashier transaction in accordance with one embodiment of the present disclosure.

At the cage, the employee must swipe his badge and the system may automatically identify the individual. Two main functions may be performed at the cage. The employee may get or return the employee's "bank". If a dealer is arriving at work, generally the dealer will go to the cage to pick up the "bank" to be stocked at the dealer's table. Here, in FIG. 17, the cashier whose badge number and name are shown at text boxes 1710 and 1720 respectively, is giving money or "bank" to the employee whose name is shown at row 1730. Also shown at row 1730 are the badge number, function (or entity) for the dealer for whom the transaction is made, the value of $2,000, as well as the date and time of the transaction. The window information is also being recorded, although not shown on the figure.

When this dealer swipes the card a second time, if she has not returned the "bank", the system will automatically know that there is money checked out by this dealer shown at row 1730. The system may present returning the bank or money as the dealer's only option to be performed at the cage. This get/return (or issue/return) bank function may also provision for outstanding situations such as late banks, partial banks, etc. Moreover, an alert may be issued through the casino operations management system where a casino entity, e.g., a dealer, has not returned the bank within a predefined time after the end of her shift.

A second function that may be performed at the cage is a pay drop function. While at the cage, the dealer may be required also to pay the drop for the day that was computed by the application based on dealer activity at the tables. This information may have been verified in advance by the rotation coordinator.

The casino management system may provide for preparing reports of information in its database. Data that has been collected and stored by the application throughout its various modules may be presented in comprehensive reports that may provide valuable insights into casino activity.

In addition to the two functions denoted as get/return bank and pay drop, the system may also provide functions for outstanding situations such as late drop payments or disputed charges.

Figure 18:
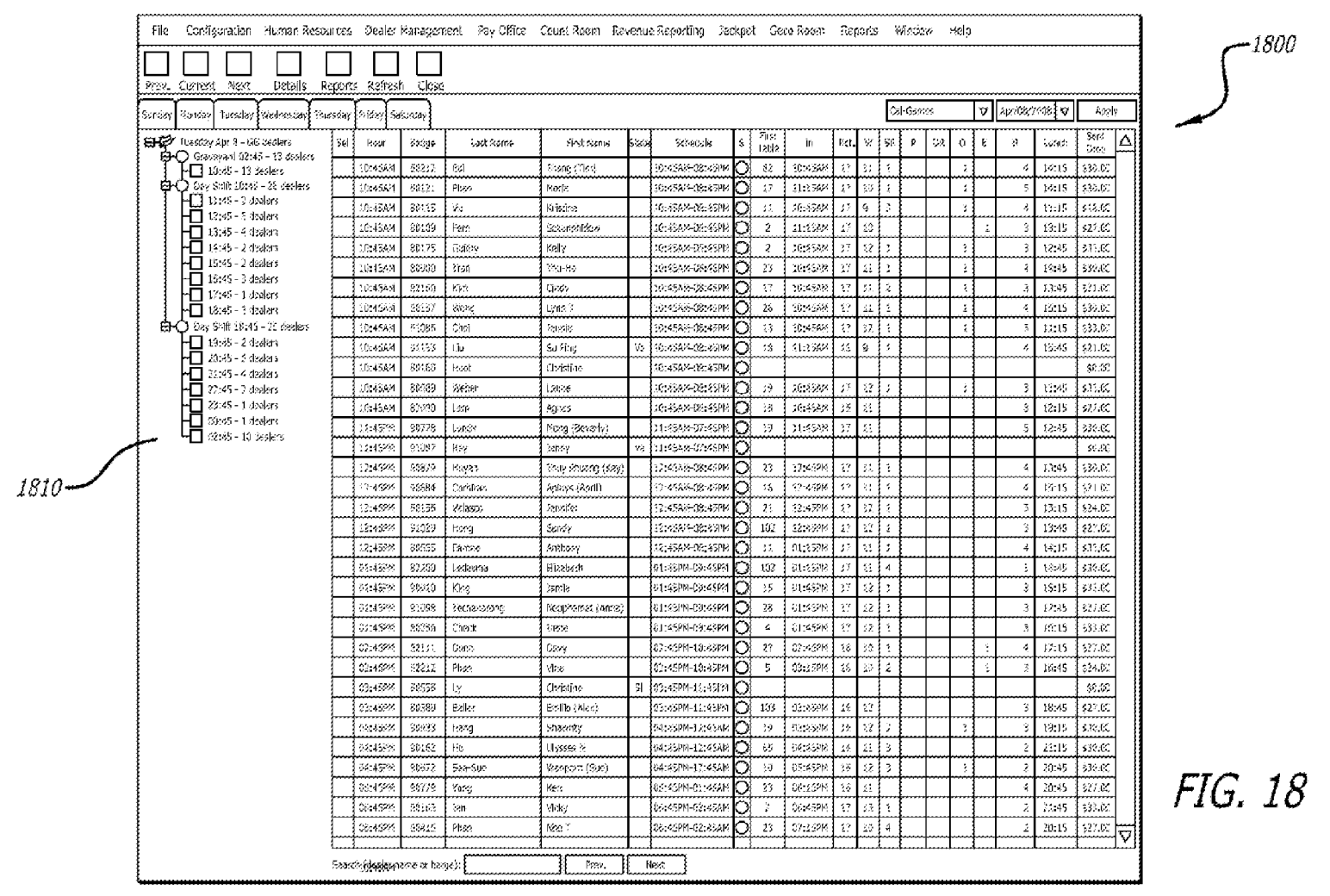

Dealer activity for a particular week may be illustrated as grouped by day, shift, and hour. Referring now to FIG. 18, illustrated is a screenshot 1800 showing dealer activity from 10:45 am to 6:45 pm. Column 1810 shows summary information for the dealers. The number of dealers for April 8 is shown as 66, and the dealer numbers are broken down by shift. Details on the dealers for the time specified are shown at the right portion of screenshot 1800. For each dealer, the system may display the amount of time spent in each state, e.g., "W" for working and "SB" for standby as shown on the right side of the screenshot 1800. The system may also as well as the drop sent.

Figure 19:
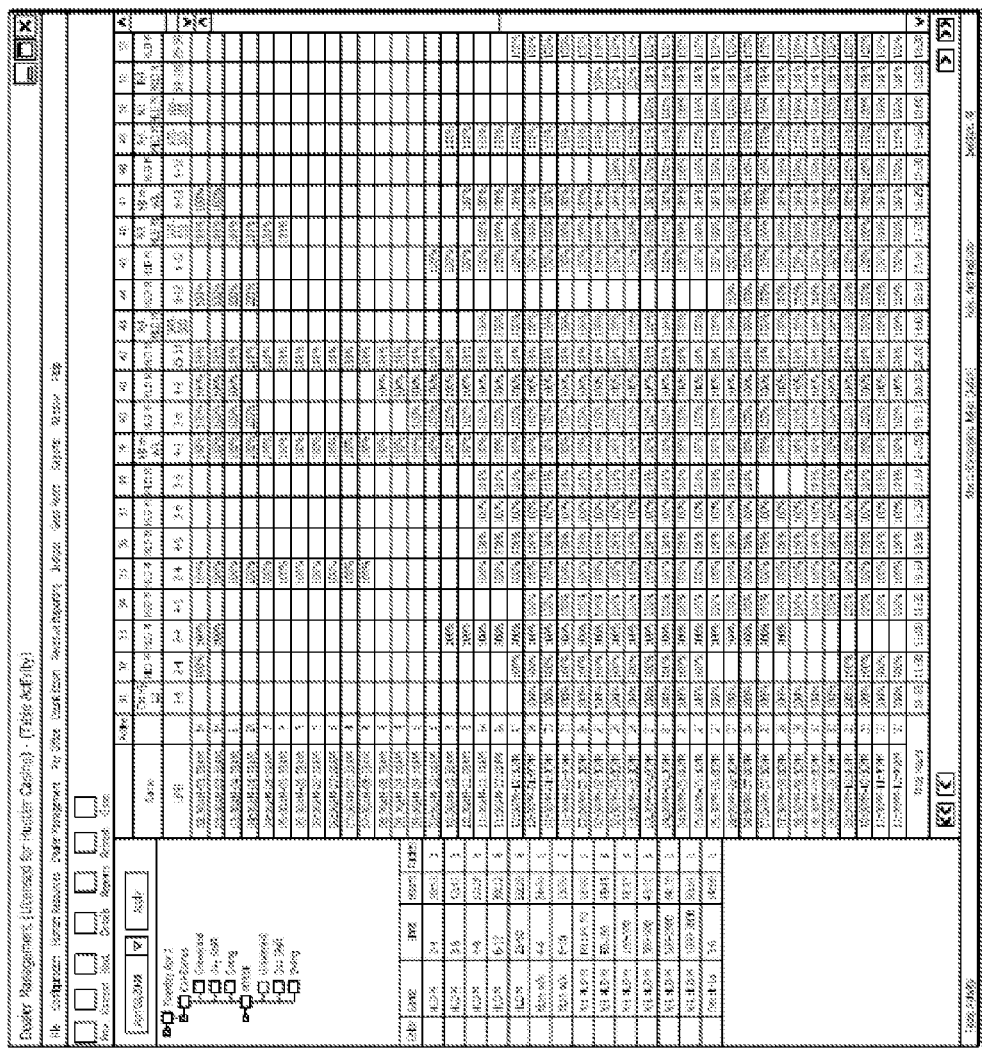
FIG. 19 is a screenshot 1900 showing table activity for an entire day of casino operation in accordance with one embodiment of the present disclosure.

Referring now to FIG. 19, illustrated is a screenshot 1900 showing table activity for an entire day of casino operation in accordance with one embodiment of the present disclosure. The report illustrates for each saved rotation the status of the table and all its attributes. For example, table 33 has only had early activity from 2:30 am to 3:30 am and 3:30 am to 4:00 am. Later, activity is not shown until 10:00 am to 10:30 am. The amount of activity is shown as 100% unless the dealer started late or did not have activity during the entire time period. In this case, the amount of activity may be shown as a percentage of the 30-minute periods listed in this screenshot 1900.

Many types of reports may be compiled by an end user based on the information collected by the casino management system. Report categories may include categories for dealers' drop, dealers' performance, casino and cage situation and revenue reports.

A casino may have a number of chip collection boxes, which may be used to collect player drops as well as jackpots. Periodically, as determined by the casino, the chip collection boxes at each table may be collected and replaced by empty chip collection boxes. The collected chip collection boxes then may be taken to the count room where they may be individually counted. The amount collected in these boxes may be recorded and tracked by the casino management system.

Figure 20:
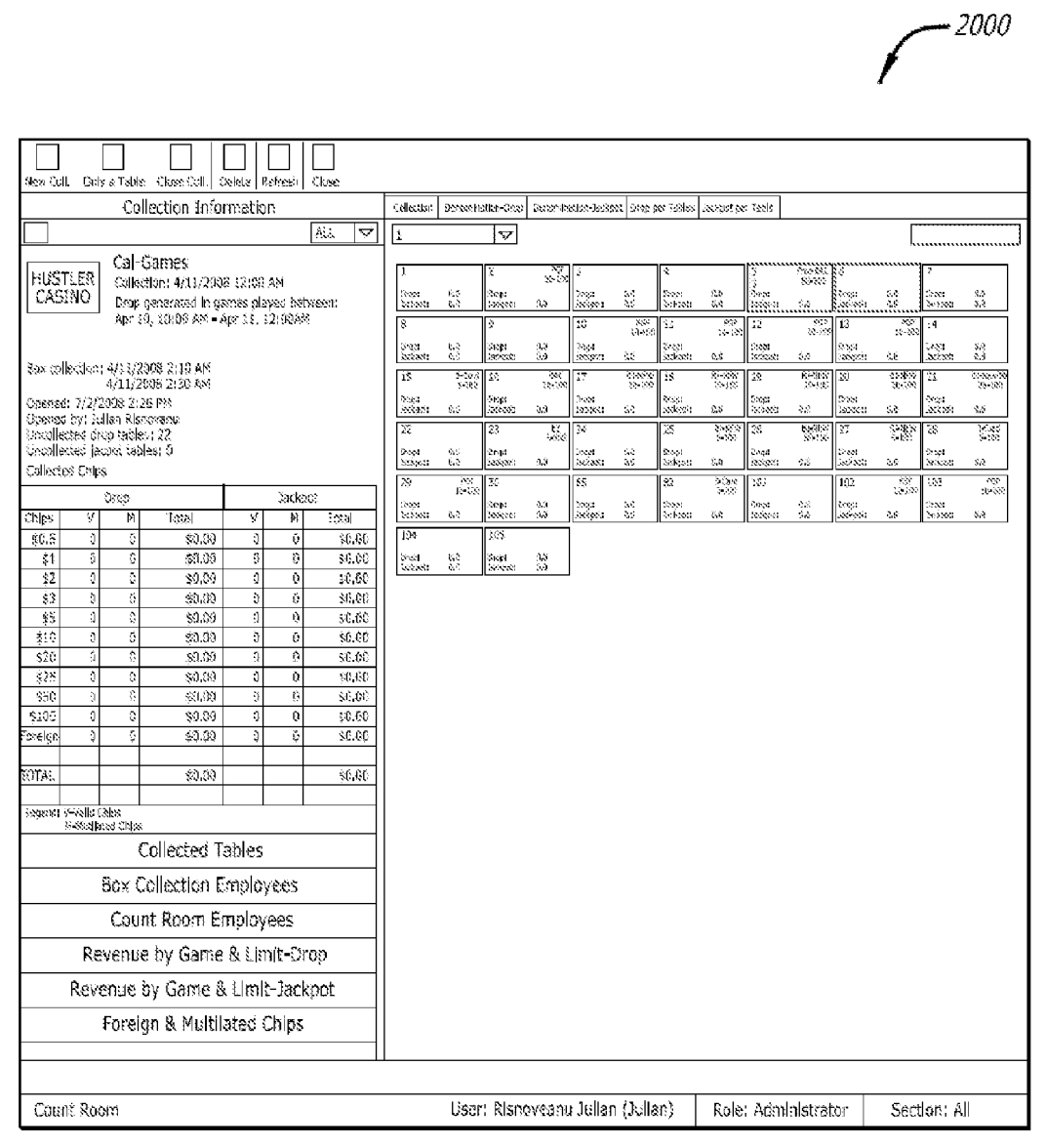

Count room personnel responsible for recording data on the chip collection boxes may do by entering this information into a screen that shows all the tables on the section. Referring now to FIG. 20, illustrated is a collection screenshot 2000 in accordance with one embodiment of the present disclosure. As the chips from the boxes are counted, the data for each casino table may be entered into the system at the left portion of the screen.

The casino may have predetermined that the chips be counted according to different plans; two methods of doing so may be according to either the number of chips or the currency value of chips. The system may be configured to automatically compute the total. As shown at the right portion of screenshot 2000, the collection information can be further drilled down according to drop denominations, jackpot denominations, drop per table and jackpot per table.

While computing the amount collected from each chip collection box, the system may automatically correlate these earnings with the games that were played on the corresponding table since the time of the last chip box collection. Referring to the right portion of screenshot 2000, each table is shown with a value of "None". The screenshot 2000 also shows the game that is being played, e.g., 3-card stud. If a chip collection had taken place at the table, the time of the last collection would show. This information may be valuable to the rotation coordinator since he/she is often responsible for specifying the time, a game is started, the type of game as well as the game's limit.

When a game begins, the floor man responsible for the table at which the game is being played will manually record the information on a piece of paper and add the information to the chip collection box. Once this sheet of paper arrives at the count room, count room personnel may correct the chip collection data provided by the system based on the slip-sheets that are found in the boxes. In this manner, the count room module may also check errors for the rotation coordinator. An RFID chip reader or other type of chip reader may also be used as a redundant measure to check for errors.

Jackpot values may be automatically computed by the casino management system based on various algorithms. This process may be facilitated with information on how much time a game is running and when the jackpot is hit. Casino administrators may define a jackpot by associating particular games and limits to particular jackpots. Once these settings are defined the system, the values may be increased at specified intervals in order to generate additional interest in a particular game.

Referring now to FIG. 21 illustrated is a screenshot 2100 that shows a jackpot configuration in accordance with one embodiment of the present disclosure. At row 2110, information on the jackpot configuration is shown for Hold 'Em. At row 2120, information on the jackpot configuration is shown for blackjack. The seed or minimum jackpot amount is displayed. The factor which could be used to incrementally increase the jackpot for each game to generate player interest is also shown. The system may automatically calculate the amount of a jackpot. The system may also automatically increase the value of a jackpot according to the factor. Where a jackpot promotion is currently being offered, the state may be shown as "going" as shown on row 2110. Once a jackpot is hit, the person responsible may reset the jackpot value and may restart the jackpot. The value of the jackpot may be automatically displayed throughout the casino on large displays. A jackpot display application may run on casino machine. The application may automatically connect to the central database and provides up-to-date information at all locations. For multiple property casinos, the jackpots between locations can be displayed and updated via the Internet.

Information regarding the games and game limits may be important for monitoring revenue generation. Accounting and revenue are often important aspects of the casino business. The accounting module can perform a number of basic functions, but some functions may be found largely only with casinos. For example, the accounting module of the present casino operations management software may be used to calculate and subtract administrative fees for jackpots, e.g., royalties to be paid.

Figure 22:
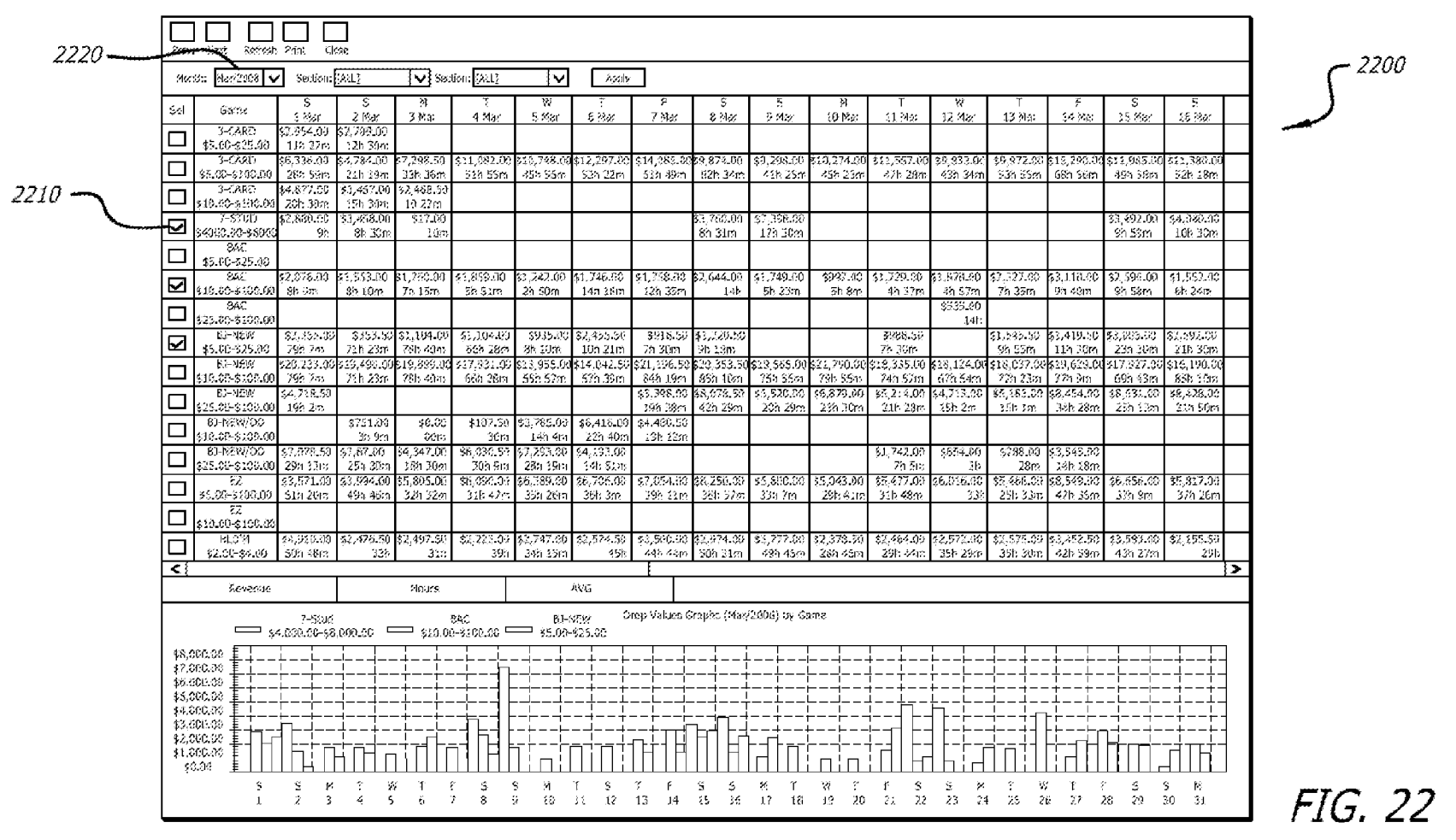

Using the casino management system of the present disclosure, the software may be used may group together games and limits under a virtual revenue center. Referring now to FIG. 22, illustrated is a screenshot 2200 that shows a virtual revenue center in accordance with one embodiment of the present disclosure. As shown at row 2210, the game seven-card stud with game limits of $4000 to $8000 is illustrated. As shown at row 2210, this game generated $2,880 on Saturday March 1.

Also as shown, the information can be configured to measure casino performance. Here in FIG. 22, the performance of these revenue centers is shown for the month of March 2008 as shown at text box 2220, thus indicating a monthly view. However, it should be understood that other parameters may be used, including but not limited to performance-based information on a daily, weekly or yearly basis. The information could also be displayed in terms of revenue per game and royalties due.

As shown at the bottom of the screen graphs are shown that illustrate drop values by game. This information may be used for comparison to future or past time periods at a later date.

The casino management system of the present disclosure may include a geco room module that keeps track of all the equipment that is used on the casino floor. This casino equipment tracked by the system may include card decks, dice and the like. When a new game starts, or for a number of other reasons, it may be desirable to change the equipment at each table. Other reasons for equipment changes may include player requests or tournaments.

The system may be used to track the entire process from the moment the casino equipment is verified to the time the equipment was delivered to the table and until the equipment is returned to the geco room. For example, by swiping their employee badges at the areas designated for the geco room location, casino personnel may verify the equipment and enter it into the casino's inventory. When casino personnel pick up the equipment from the geco room, they may be required to swipe their badges and declare destinations for casino equipment. This functionality allows the system to keep track not only of the location of the equipment, but who handled the equipment. When the equipment is returned to the geco room, it may be sealed for re-use.

The casino management system may also be capable of measuring the number of times the equipment was used so that the system may create aging reports. In the case of damaged equipment, it may be desirable to discard such equipment.

Figure 23:
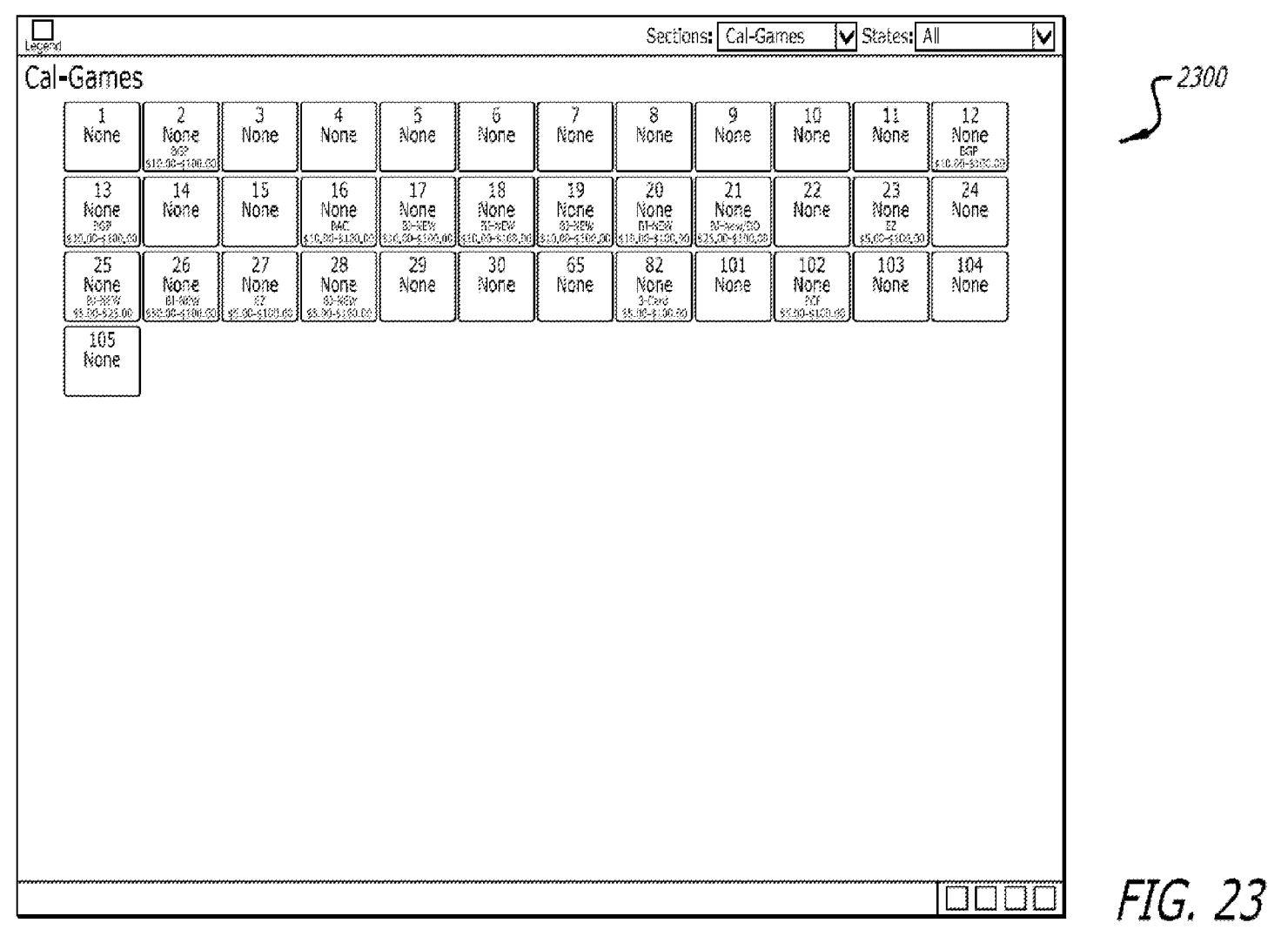

Referring now to FIG. 23, illustrated is a geco room screenshot 2300 in accordance with one embodiment of the present disclosure. As illustrated by the title, this geco room display shows geco room information for the "Cal-Games" section. The numbers at the top of each icon represent casino tables. The designation "none" denotes that no card change was made for geco room purposes. If, for example on table 2, if cards had been changed, the "none" would be replaced by a time that represents the last time the cards were changed.

A countdown clock may be provided at each casino table to determine when cards should be changed. The cards would be changed when the countdown clock showed at or around 0 seconds. On each table, the time for card changes may occur every hour, every two hours or any other time period set. If necessary, the cards could be changed before the expiration of the predetermined time interval. For example, where a player accidentally disfigures the cards, the cards may be changed before expiration of the predetermined time period.

When players arrive at the casino, there may be a number of games at play. It may be desirable for a player to be able to quickly determine the games that are being played, game limits, the tables at which the games are being played, and the number of players waiting to play those games. The casino management system may be configured to display live information regarding the games. Referring now to FIG. 24, illustrated is a player's board screenshot 2400 that shows the games that are running, their limits, the tables where these games are played as well as the list of players waiting for each game. As shown in column 2410, the game Hold 'Em has limits of $15 to $30. The game is being played at tables 4, 13, 16, 31, 34 and 39. The players are listed as Guy, Mom, Vivi, AA, and Lia. This game is being played as indicated by the notation "going".

Player's board displays for wait-listed games may include the notation "taking requests" as indicated by the game listed at column 2410. In order to be placed on a waiting list for a particular game, a player may swipe his/her casino-issued unique e player identification card at one of the casino's card terminals. Alternatively, a player can simply use his/her initials or other moniker. The player's swiping action may trigger a display of all games currently running in each casino section. The player may then select the lists of games for which he/she would like to be added to the standby list.

Referring now to FIG. 25, illustrated is a screenshot 2500 that shows a player adding herself to a waiting list in accordance with one embodiment of the present disclosure. As shown at text box 2510, the player identifies herself as Lia. As shown at rows 2520, 2530, 2540, Lia has placed herself on the waiting lists for Hold 'Em with a $15-$30 limit, Omaha Hi-Lo with a $4-$8 limit as well as Hold 'Em with a $25-$50 limit. As shown by tab 2550, Lia is signing up for poker.

Figure 26:
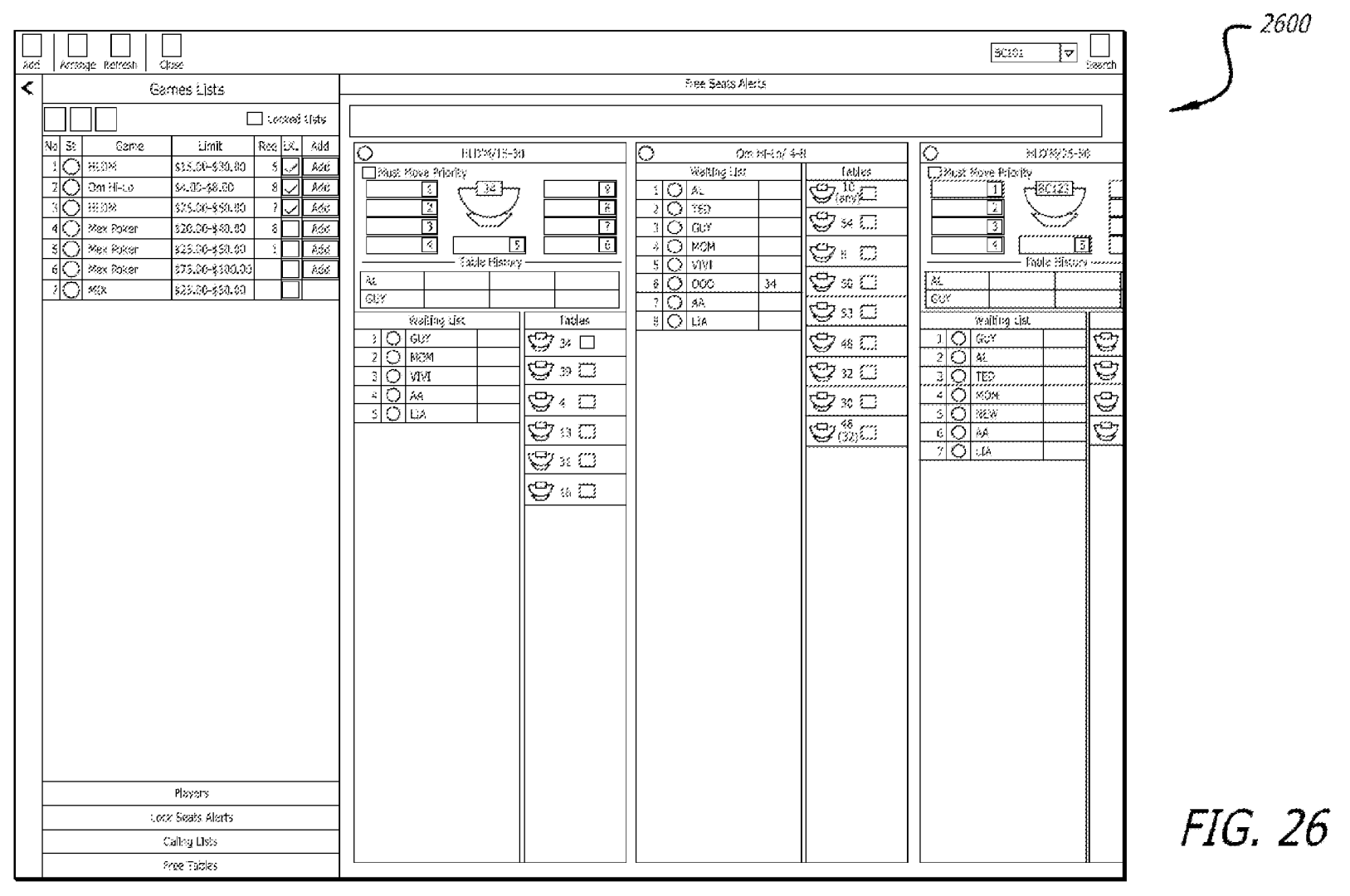

Casino personnel, e.g., a board person, may be mainly responsible for seating players at the tables as soon as a seat becomes available. The board person may call and or page the first player on the waiting lists when a seat becomes available. Where a player has provided a cell phone number, casino personnel may use SMS or text messages to notify the player of available seats. Referring now to FIG. 26, illustrated is a screenshot 2600 that shows game waiting lists and free seat alerts in accordance with one embodiment of the present disclosure. This screen can be used by the board person to control waiting list activity. As shown at the left portion of the screen, the games' lists column, the status of seven (7) games is shown. Lines 1 and 2 show two games that are currently being played as indicated by the green icon under the status ("st") column. Lines 3-6 show a yellow icon under the status column, indicating that the games are not yet going. Line 7 shows a red icon under the status column, indicating that the game is not available for wait-listing. Because the game is unavailable, the user will not be able to place a check in the box to select the game.

As shown at the three columns in the right portion of the screen, free seat alerts are displayed for the games Hold 'Em with a $15-$30 limit, Omaha Hi-Lo with a $4-$8 limit as well as Hold 'Em with a $25-$50 limit. When a seat becomes available, the board person or other authorized casino personnel may use an input device to drag and drop the name of the player over the icon for the free seat. This action may trigger the system to display a casino-wide alert that free seats are available for the next person on the waiting list. Other functions include management of change of seat requests, locking out seats for a period of time or alerts that seats must be changed.

Figure 27:
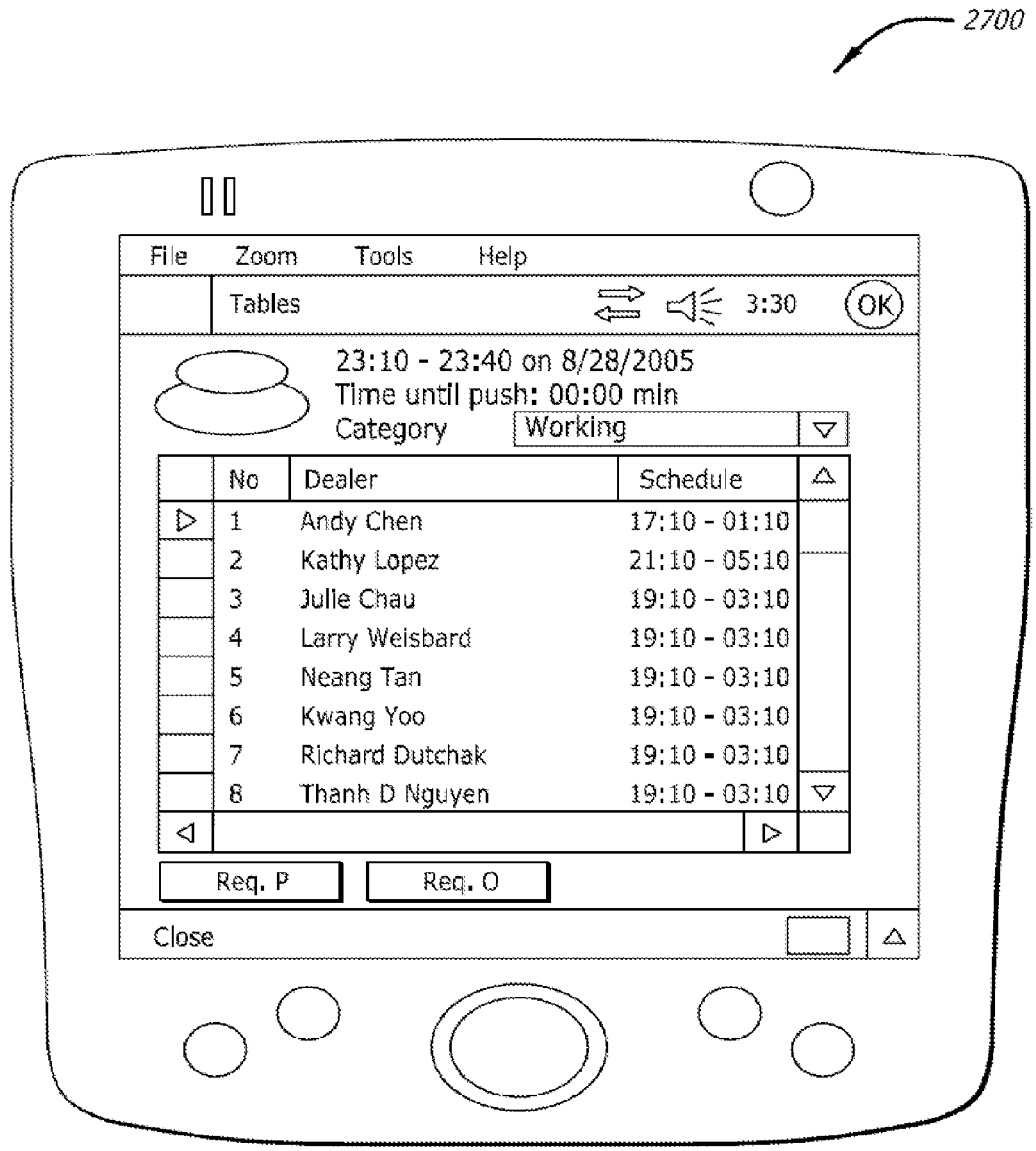
FIG. 27 is a screenshot of a personal digital assistant (PDA) that incorporates a display created by the casino operations management software in accordance with one embodiment of the present disclosure.

The various software modules described herein can be viewed on user workstations, large screen displays and/or auto tickers located throughout the casino. Referring now to FIG. 27, illustrated is a screenshot of a personal digital assistant (PDA) that incorporates a display caused by the casino operations management software in accordance with one embodiment of the present disclosure.

The software may be used to provide information to PDA users who may be connected to the system using a wireless network. In the screenshot 2700, dealers are being managed. The user may manage dealer requests in a similar manner to the section view module that may be viewed at user workstations. In this screenshot 2700, the software groups dealers by status (e.g., working, standby, scheduled) as well as their start and end times. Dealers may be added to the "request playing" or 'request early out" list using the PDA.

Figure 28:
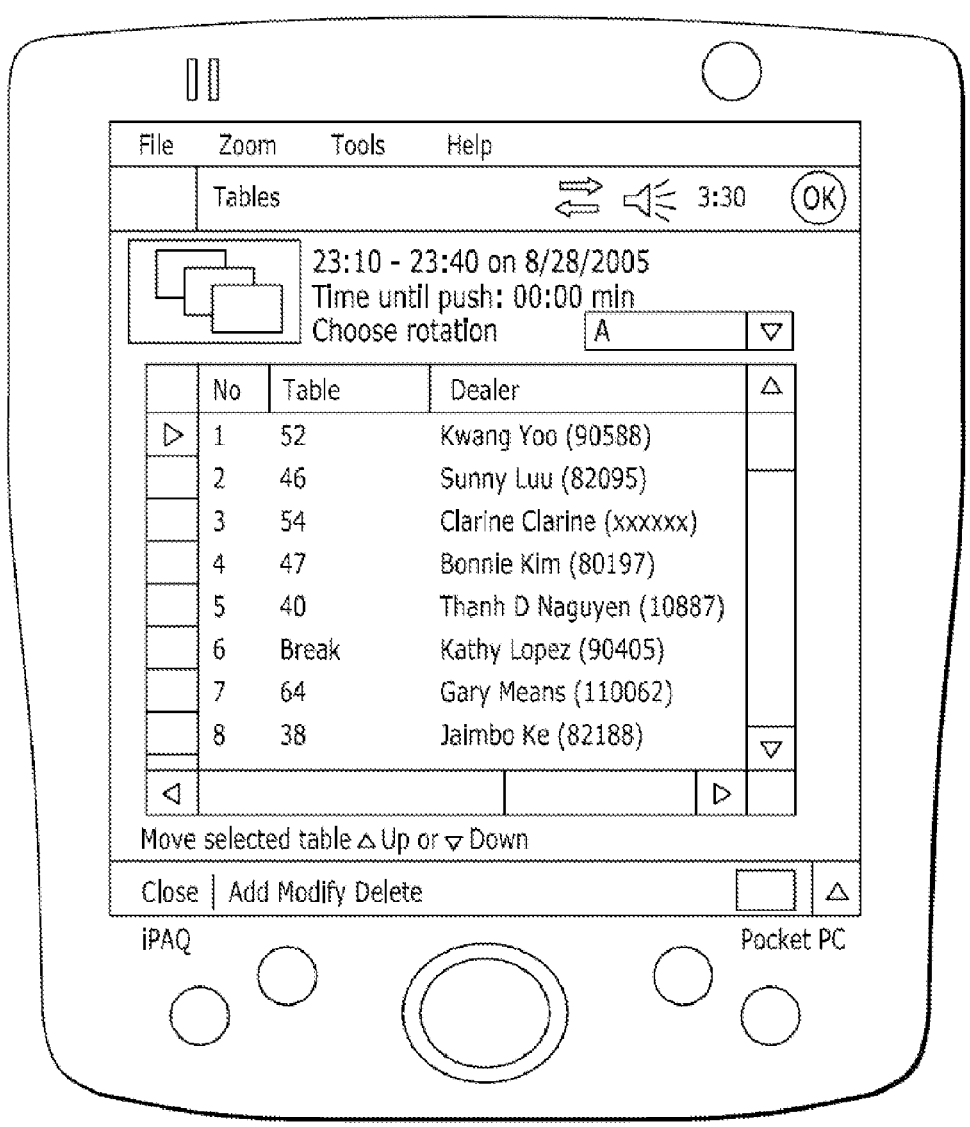
FIG. 28 is a PDA screenshot that shows the software's ability to manage tables in accordance with one embodiment of the present disclosure.

Referring now to FIG. 28, illustrated is a PDA screenshot 2800 that shows the software's ability to manage tables in accordance with one embodiment of the present disclosure. Using this module, the user may view a section that is filtered by rotation. The tables may be listed in a particular order, e.g., consecutively. However, the table order may also be changed using the PDA device. Additional modifications to table details may be performed from the PDA. For example, changes to the assigned dealer, drop values, start and end times of games as well as game types and limits may be performed from the PDA. These changes may be automatically uploaded to a central server.

Figure 29:
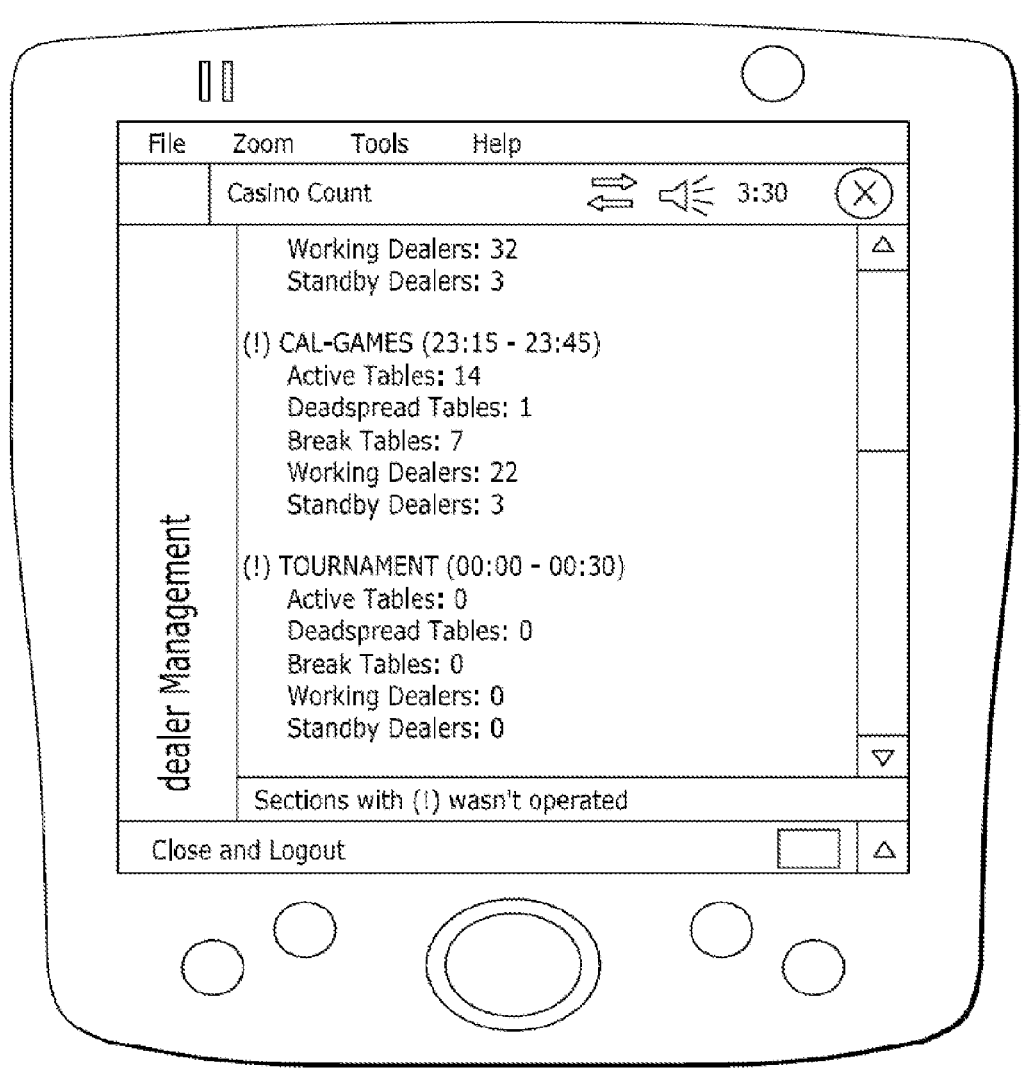
FIG. 29 is a PDA screenshot of a display of casino totals in accordance with one embodiment of the present disclosure.

Referring now to FIG. 29, illustrated is a PDA screenshot 2900 of a display caused by the casino operations management software in accordance with one embodiment of the present disclosure. As illustrated, totals from casino activity may be displayed. The data may be grouped according to section. This screenshot displays information regarding the number of dealers, each dealer's status, as well as the number of tables per dealers and the status of the tables.

Using a PDA, an end user may be able to perform a number of different functions wirelessly while walking the casino floor or even when they're away from the casino, e.g., on business travel or on call. A PDA may be used, for example, to log incidents, view player details or view the current value of jackpots approved by managers.

Figure 30:
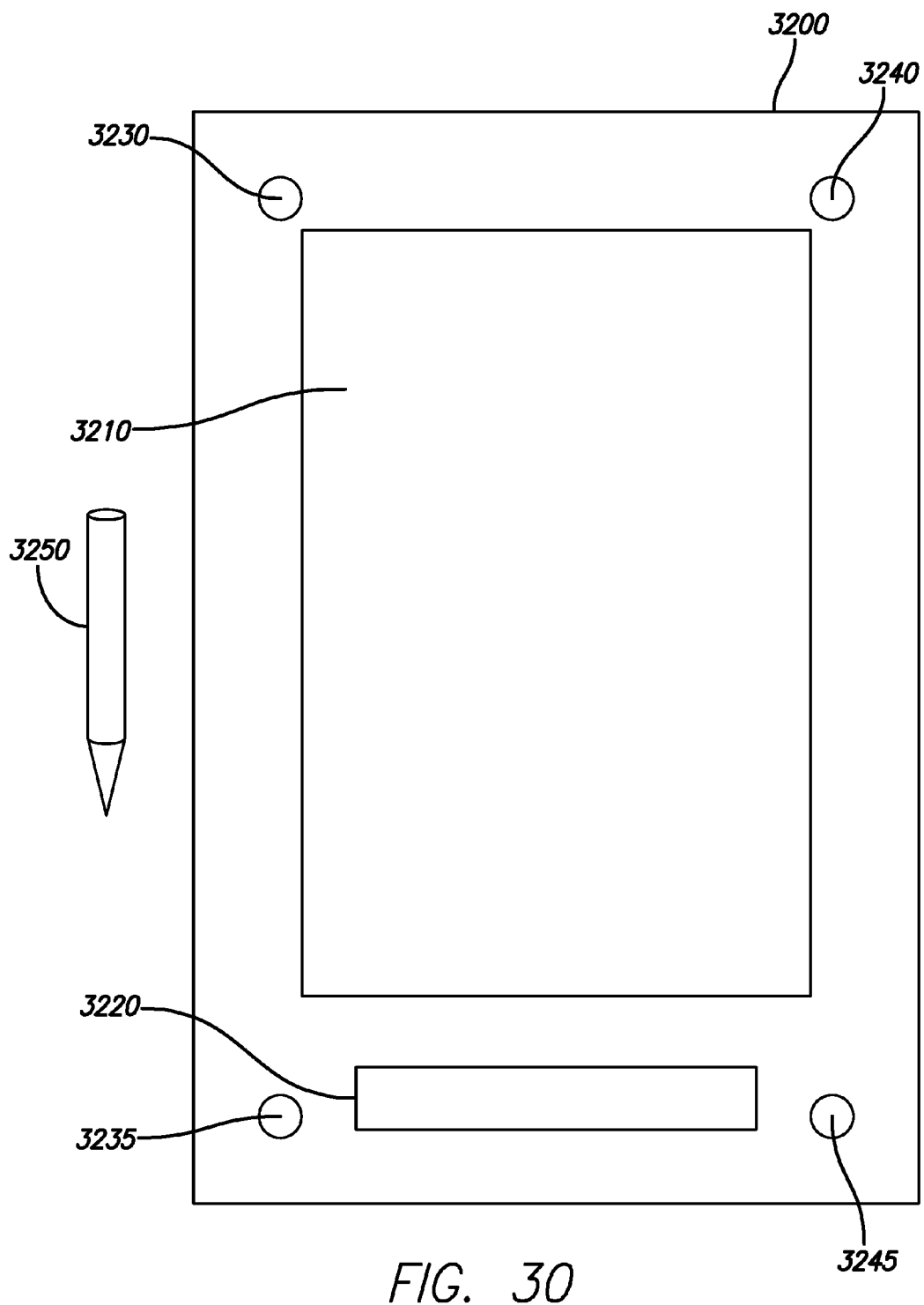
FIG. 30 is a touch screen device in accordance with one embodiment of the present disclosure.

Referring now to FIG. 30, illustrated is a touch screen device 3200 in accordance with one embodiment of the present disclosure. The touch screen device may include a touch screen display 3210 which may be activated by a stylus 3250 or other screen activation device. Optical counter slot 3220 may be disposed in the lower section of the touch screen device 3230. Similarly to the optical counting device described in connection with FIG. 3, the optical counter slot may be used to count chips or other entity currency as they are slid through slot 3220. Entity currency may be anything recognized by the casino as having value, including chips. The value may be counted as legal currency, e.g., American dollars and cents. Alternatively, the value may be counted in points or other units. Mounting holes 3230, 3235, 3240, 3245 may be used to mount the touch screen device onto a wall or other supporting structure. Wires and circuitry (not shown) may be discreetly enclosed in the back of touch screen device, out of view.

A tournament registration and management module may permit the casino to register participants in a particular competition hosted by the casino, e.g., a tournament, and manage the tournament through this program.

The tournament registration and management module may use certain data from the player tracking module that rewarded players based on casino activity. A reward may be anything of value, including reward points that may be redeemed at a later date, cash rewards, and non-cash rewards such as chips or checks. Players may be registered using player cards issued by the casino using the player tracking module.

The tournament registration and management module may assign players randomly to a table when they sign up for the competition or tournament. The random table assignment algorithm may take the total number of tables and sell individual seats on a random basis to each table. If the casino uses ten (10) tables, the application may sell one seat randomly from each table. Then, the tournament registration and management module may sell all remaining seats on a random basis until all seats are filled.

The system may permit a ticket to be printed every time the user sells a seat. The system may have a tournament registration cashier that manages buy-ins. The system may allow the user to configure the structure of the pay off. For example, the system may pay the top ten (10) players; each player according to the seed may receive a percentage of the prize pool.

The final pay off structure may be posted in the cage queue in the player cage module where the cashier may pay according to the amounts listed in the tournament or competition's pay-off structure.

The tournament registration and management module may include an application for a tournament clock display. This application may have two segments. A first segment may provide for a tournament clock that runs on a display on a system disposed within a casino table. This in-table system may be a part of the casino operations management system. The in-table system may include an input device such as the touch screen device of FIG. 30, which may be placed to the right or left of the dealer so that it is easily accessible to the dealer. The tournament clock may be displayed at the in-table system as well as on the large screens throughout the casino. The table version of the tournament clock may be smaller than the full screen displays shown throughout the casino and may display less information, e.g., the number of tournament players, the number of buy-ins, the total prize and the current tournament round. A second segment of the tournament registration and management module may be capable of posting the information on one or two monitors from the same computer. The information posted may include the time, tournament level, price pool, share per seed, etc. One of the screens may display tournament information and another screen may display a promotional slide.

The competition or tournament can be a free roll tournament, meaning the players may qualify for this tournament based on the number of scans accumulated through the player tracking module playing live games. Alternatively, the competition or tournament may be a prize tournament, meaning the player may buy in for the tournament in order to play.

The tournament registration and management module may have, e.g., three (3) menus which can be accessed from a dealer management screen. The menus may include tournaments, tournament registration and tournament registration reports.

One or more configuration modules for the tournament registration and management module may permit a user to configure the following: the start date and time of the tournament, the closing date and time of the tournament, and a description of the tournament. The configuration module(s) may also provide for a prize value guaranteed by the casino. This module may provide location information, e.g., the section to which the tournament belongs.

The tournament configuration module may assist in managing a tournament by setting the length of time the dealer will be at the table (dealer down or push). This module may work with a dealer coordination module to manage dealers in two separate locations, one for live games and one for tournaments. Communication between the two section views help the dealer coordinator to know which dealer is available in each section when tables are breaking or when they start a new game.

The user can use an older configuration template because every tournament configuration will create a new template that can be reused.

The tournament configuration module may also provide identifying information for the game that will be used for the tournament and tables to be used in the tournament, and the number of seats at a table for each game e.g., 8, 9, or 10. The configuration module may provide for the ability to lock the seats which means locked seats may not be sold unless the user sells them manually. Certain seats may be locked for reasons, e.g., reserved for the disabled or where there are not enough players to fill the seats.

The configuration module may provide for the ability to sell alternate seats which means the casino may have sold all the seats but if the casino still allows buy-ins then the players can put their name on the alternate list. As the players are leaving they can fill the empty seats with players that are on alternate list.

The configuration module may also assist in managing a tournament by permitting the display of and tally of information regarding tournament fees. For example, it may include the type and number of buy-ins e.g., a regular buy-in, re-buys, bonus buys and add-on buys. It may also provide for charging the tournament fee just for the first buy-in.

When each tournament is finished, it may be closed in order to create a history of the tournament activity. After the tournament is closed, the system may no longer allow buy-ins, re-buys, bonus buys or add-on buys.

Figure 31:
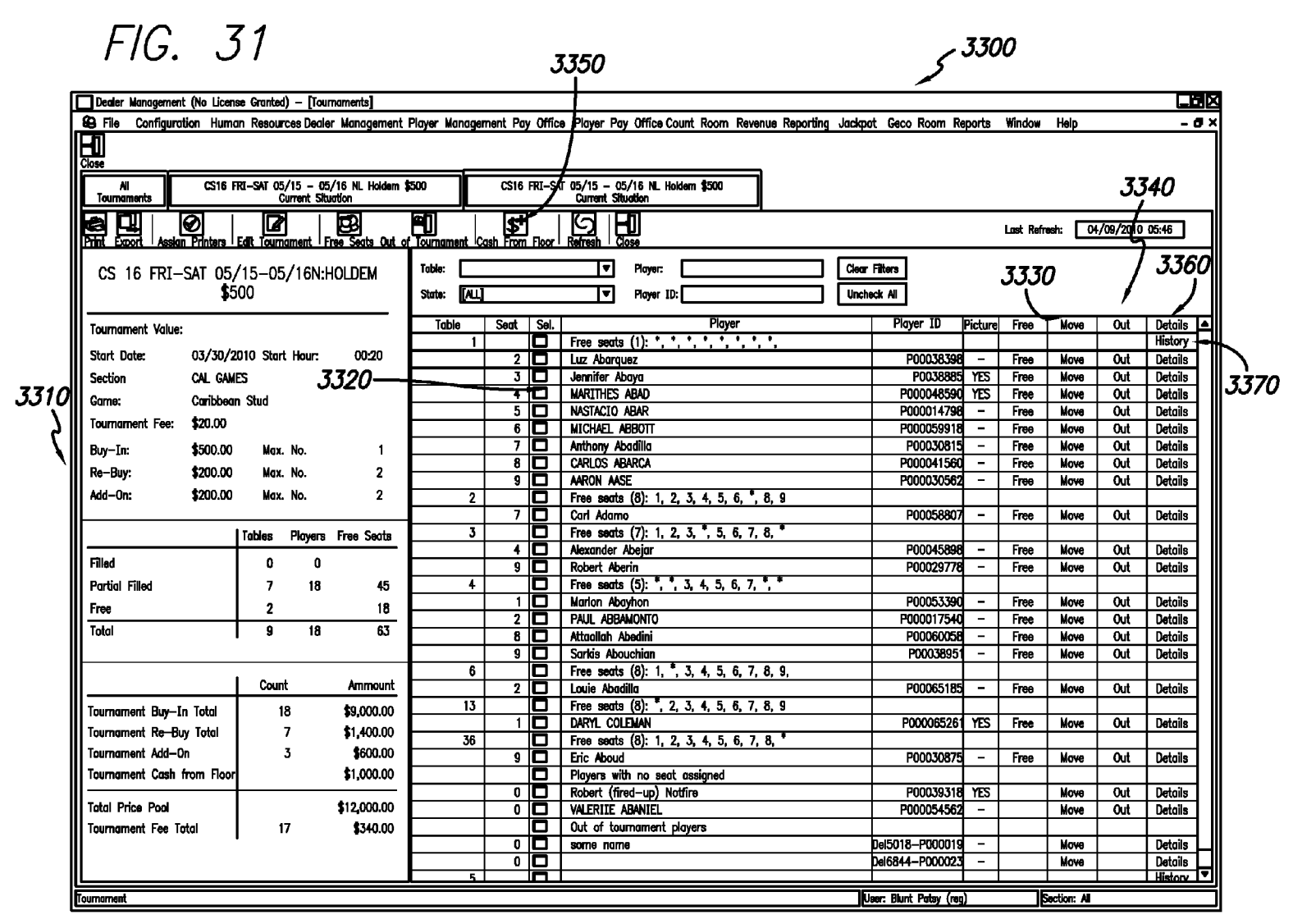

Referring now to FIG. 31, illustrated is a tournament registration and management module display in accordance with one embodiment of the present disclosure. The left side of screenshot 3300 at section 3310 may include general identifying information about the tournament or competition, e.g., the date, time and type of tournament. For example, as shown in section 3310, the casino operations management system of the present disclosure may permit the user to see the tournament activities like the number of players in a tournament or player investment in a tournament, e.g., buy-ins, re-buys, add-ons, etc. from any computer associated with the casino operations management system.

The system may include a window that shows the current status of the tournament at the moment the module is opened or when the screen is refreshed. The right side of screenshot 3300 may display more individualized information about the tournament or competition so that the tournament may be managed. For example, it may show the seating position (table and seat) for individual players, their names and player identification numbers, whether or not they have a photo on file, as well as other more detailed information.

The tournament registration and management module may have accompanying functionality for tournament management including opening a tournament cashier shift for a particular tournament. A player's transaction tab display may be capable of searching all the players in the player tracking module database or permit the scanning of a player card and open the buy-in screen. The cashier-friendly functionality may also show the locked and free seats for a tournament as well as the players on the current seats. The cashier-friendly functionality may also provide the number of tables allocated for a particular tournament and the total number of seats for a tournament. If a player has multiple buy-ins, then the cashier may be alerted by the audible or visible alert. The system may also post on the screen the number of buy-ins and the tables and seats of the buy-ins.

The tournament current situation tab (in this case, designated as "CS16 FRI-SAT 05/15-05/16 NL HOLDEM $500") may give the cashier the tournament break-down in detail. The other tournament current situation tab may be used by managers or the surveillance people to check the number of buy-ins, re-buys, etc.

A tournament template functionality, accessible from the tournament registration and management module may allow the cashier to add tables to the tournament when the venue or casino entity runs out of tables. The system may also permit a cashier to drag and drop a table into a tournament template which may be posted into the section view module of the tournament dealer rotation.

A player's transactions functionality accessible from the tournament registration and management module, may allow buy-ins, re-buys or add-ons. When the player swipes the unique identifying card, a buy-in window may open. It may allow the player's buy-in information to be displayed, including the cashier working the table where the buy-in is to be applied, the tournament value, start and end dates, as well as the tournament fee required and/or paid. If the player requests a locked seat, including for reasons of disability, the cashier may assign a seat manually from the locked seat for handicap players by using a "register manually" button: Otherwise the table and the seat may be assigned automatically based on a balanced random algorithm.

By selecting tournament current situation functionality, accessible from the tournament registration and management module, the user can see the tournament current status, including tournament structure, total ticket sales; and the identities of players who are participating in the tournament. The tournament current situation interface may also provide for additional functionalities. For example, an export button may export the tournament current situation report to a .csv format file. An assign printers functionality may allow users to designate the printer where the print job will be sent. An edit tournament function may allow the cashier or other person to lock seats as needed.

A free seats functionality, accessible from the tournament registration and management module, may be used to free seats at the tables and manage other table seating activity. The release of the seats may be done in a number of ways. For example, the cashier may select a free button for the seat from that row to be freed. Referring back to FIG. 31, if the cashier selected box 3320, the seat for the participant listed on that row of screenshot 3300 could be freed. The user could also open a free seats tool functionality and designate tables and seats as being available. Casino rules may require that before the release of the seats, all the seats at the table must have empty check boxes.

The players that were removed from seats as shown in FIG. 31 may be able to make another buy-in if the tournament structure allows it. Those players may be moved to a category indicating they are players with no seat assigned. From there, a player can be moved to another table or removed from the tournament. The "move" button at column 3330 may allow the user to move the player to another table/seat. The "out" button at column 3340 may permit removal of one or more players from the tournament.

The "cash from floor" button 3350 may be used for re-buys, add-ons, etc. and may be sold at the tables by runners or floor persons, thus providing for management of same. During a tournament, the players may make the re-buys at the table. The function can be done a number of ways, including the two ways that follow. First, a floor person/runner may bring the money from the sales on the floor and the cashier records the sales. Alternatively, a PDA may allow the user to select the table and the seat and scan the player card for the player who intends to make the buy in whatever form. Based on the structure of the tournament the scanner may control the number of buy-ins or add-ons allowed by the casino, and the scanner may restrict the player from making more buy-ins than are allowed. The PDA may refresh the data continuously with the server.

The "details" button at column 3360 may allow the cashier to make buy-ins, re-buys, and add-ons. Plus, the cashier can view the details of the player for that tournament. The "history" button 3370 may provide the player history for that tournament.

The tournament registration and management module can run multiple tournaments in the same time and all the tournaments will feed the tables from the pool of tables available for the tournaments.

If a user wants to add a table to his/her tournament he/she may select the tournament template tab. Under this tab the cashier can add or remove tables from the tournament. A tables functionality may be opened from an interface such as section view. If another user wants to see the latest changes on that template, they may need to select a button for a refresh functionality. If the template is currently opened the user may receive a message relaying this fact.

If the table template is not used, then the application may make it available for other users after a period of time, e.g., two minutes. A tournament registration report may show all the transactions from that tournament.

A sports module, e.g., a football module, may be a part of the casino operations management software. The football module may permit a casino to assign rewards as well as organize promotions and rewards for players who successfully predict the winners of various matches. Promotions may include those designed to get players to participate in events related to the sports module. The casino staff may create a season with all the matches that are to be played for that season.

The sports module may focus on one season at a time, with all the events that are to be played for that season. Periodically, e.g., weekly, players may have the option to select the entity the player predicts will win each game. Referring now to FIG. 32, illustrated is a player's graphical user interface in accordance with one embodiment of the present disclosure.

One or more games/events may be designated for which the player may be required to enter a number that he/she believes will be the sum of the scores of the game as opposed to simply choosing the winner. This game/event may be referred to hereinafter as the sum game. However, it should be understood that any type of game/event may appear here and it need not be a requirement that the user sum the scores.

The player may enter the data through an interface located in—or connected with—the casino entity. Once the winners and scores of the sporting events are known, this data may be uploaded into the system, and the software may automatically compute the ranking for each player according to the highest score (the most accurate guess for all the matches). The ranking may have two components: the number of correct picks and the deviation from the score for correct picks. If there is a tie between 2, 3 or more players then, the winner of the sum game may also be designated top in rank and determined to be the overall winner.

The sports module may be organized in two segments. An administrative section may permit the casino staff to perform general management operations. On the player section or player kiosk, the player can enter data and view results.

The administrative section of the module may permit casino staff to define the start and end date for a season as well as the time interval when user picks are allowed. The administrative section may also permit the casino staff or other authorized personnel to specify the teams that have games within a particular defined season. To expedite this function, teams may be imported by the casino staff from a previous defined season. Moreover, the sports module may permit the casino staff to set displays related to the sports module. More particularly, it may permit the casino staff to show the casino-accessible terminals/kiosks on which the sports module is enabled. The data shown may include the PC name on which the module is enabled, the person who enabled views on a particular terminal/kiosk.

Moving to the player functionality in the second segment of the sports module, we look at what the user may do with the sports module. After a season was created, a user may modify the general settings for a particular week. For example, the user may invoke a function that allows him/her to change the settings, including font and colors.

Referring now to FIG. 32, illustrated is a user interface for the sports module in accordance with one embodiment of the present disclosure. The user may view the games for a particular week, as well as display the results and scores for a particular week. The grid on the left contains all the weeks of the season. Once a row is selected, the right panel displays all the games in that week and the sum game.

The left grid 3010 shows weekly intervals for which a user may select a winner. Here, the user has selected week 9 of season 2009 in grid 3010. The left grid 3010 may also indicate whether a particular week is currently shown on the casino kiosks at column 3030 and whether the results are entered at column 3040. Here, since no boxes are checked, it appears that none of the weeks or results are shown at the kiosks.

Here, the user would like to show week 9 of season 2009 at the kiosk. The user selects the at kiosk button 3020 to have that week shown at the kiosk. As a result, the row that represents the time range for that week may be highlighted and a checkbox may be added to the at kiosk column 3030. The end user may add all the games that are being played within a particular week.

If an end user selects the week's players tab 3050, the end user may also view players that participated in a certain week's casino activities. "Week's Players" is a display that may show all the players that have entered picks for a certain week. An end user may obtain details on a particular player under the week's players by selecting a details button. This button may show the last picks that the player has made and the ones that were considered. A print log option may print all the variations that a player has made before a final choice.

By selecting the set results tab, various functions may be performed that pertain to the result of one or more sporting events. Once all the games in a week are played, the staff can enter the results in the system and compute the rankings. Results may be entered either in detail (including at least the score) or the winning team may simply be announced.

A winner's list may show the players that have won in a particular week and the details for their choice. If two or more players have the same highest score they may all be considered winners.

Figure 33:
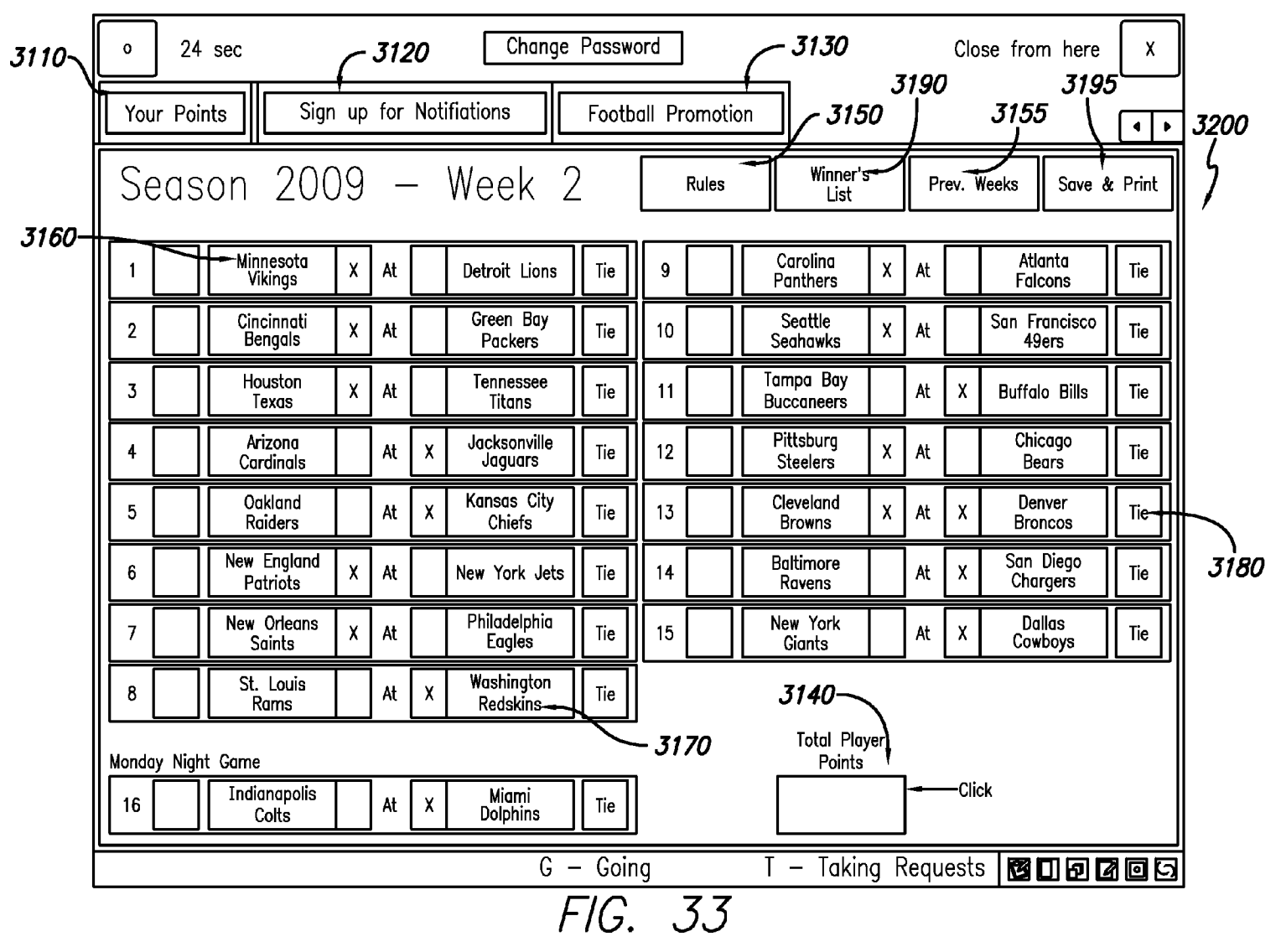

The player may make picks and view rules regarding the sports module. Referring now to FIG. 33, illustrated is a sports module user interface 3100 in accordance with one embodiment of the present disclosure. A player may enter selections via this interface. On this screen, listed are fifteen (15) games and a special Monday night game on which the user may wager. In order to make a selection, the player may press/click on the name of the team he chooses to win and a visual indication of the selection, e.g., a change in background color, may occur to indicate that a selection has been made. Here, for example, the player has chosen box 3160, indicating that he wagers that the Minnesota Vikings football team will win over the Detroit Lions. At box 3170, the player has chosen the Washington Redskins to win over the St. Louis Rams. Also by way of example, at box 3180, the user has chosen a tie between the Cleveland Browns and Denver Broncos.

By selecting buttons 3110, 3120, 3130 respectively, the user may view his/her reward points, sign up for notifications, or view football promotions.

To enter the score for a designated sum game, i.e., a game for which the sum of the scores is used as the wager criteria, the player may click in the total player points box 3140 and a virtual numeric keyboard (not shown) may appear on the screen. Here, the designated sum game is the Monday night football game. From this screen 3200, the user may also view rules by selecting the rules box 3150. The user may also view history of results by selecting box 3155. After user selection of box 3155, the display may show a checkmark next to game if the pick was correct and an X if incorrect. The user may view the winner's list by selecting box 3190. Once a player has made or changed his picks, a ticket may be printed as proof of his/her selections. The user may save and print a ticket by selecting box 3195.

The receipt can be printed on a forty (40) column format at the kiosk as well as on a full page format, e.g., A4.

The casino operations management system may also include a drawing/raffle module. In a raffle, the casino may provide a number or other code to each player. Thereafter, the casino may select one of the numbers and declare a winner the player that was provided that number and can prove same. The associated drawing/raffle module may include a first module for configuration of the drawing/raffle and for the raffle itself. A second module may be included for display of the results of the drawing/raffle.

The first module for configuration and drawings may permit the user to configure the computers that are used for the display of the raffle. The user, e.g., casino staff may enlist computers that are used for other type of displays e.g.; dealer rotation, player's list, kiosk displays and promotional displays. When a drawing/raffle occurs, the drawing module may post the drawing/raffle display. After the drawing is completed, the display may revert to its original screen, e.g., dealer rotation, player list, kiosk displays or promotional displays.

Using the drawing/raffle module, the user may configure the computer(s) that will display the drawing/raffle information. Configuration may occur using the computer name, a description of the computer and the section in the casino where the computer is located. The drawing/raffle module may include a preloaded flush file that may post the text entered by the user into a flash file. During configuration, the user may control the background color of the display, the format of the fonts and the color of the fonts. Also the user may configure a picture background and the clock settings for the drawing/raffle module.

Since the casino or other entity could do the drawings in multiple sections, the user may configure on which computer they will display drawing/raffle information and the section in which the computer belongs. After that, the user may configure the workstation for the location. Using the drawing/raffle module, the casino/entity may remove a barred player or employee from the player participation list.

The drawing/raffle module may pull the information for the number of scans, the type of the game, and the limit of the game from the dealer management and player tracking module. With this module, the user can configure the promotion type for the drawing/raffle as well as the games participating in the promotion and the limits participating in the promotion. Some promotions may involve the casino giving the winner a cash or other prize. Some other promotions may permit the player to receive another raffle ticket from the draw or spin a wheel. In addition, the casino/entity personnel may configure the minimum number of scans for the game that will qualify the player for this promotion, the number of times a single player can win the promotion over a certain time period, the date of the drawing/raffle. The application will look for the scans from let's say Sep. 1, 2010 to Sep. 30, 2010. The raffle/drawing may permit a player to win based on scans of his/her player card. The more often a player card is scanned, the more chances a player has to win. The module may also set the number of minutes the winner's name will be posted on the display until the prize is claimed.

The drawing/raffle module can also be configured to draw a winner from the players qualified by the number of scans, a table (all the players at the table), a seat from the table (a seated player at the winning table), etc.

The casino/entity personnel may be able to enter the text for the name of the promotion, the name of the drawing/raffle, whether the winning player claimed the prize or not, and whether the prize amount may be allocated to the next drawing if no player won the current drawing/raffle.

The drawing/raffle module may also permit the user to configure flash color format to use when a winner is announced. The winner's display for the drawing/raffle module may include the name of the drawing/raffle, the time allowed to claim the prize, the player's photo and the player's name.

A player cage module may serve to keep track of all transactions that occur between clients and a casino. The module may keep track of the time of the transaction, the type and the amount in order to provide complete traceability and accountability. Based on the raw information, complete reports may be generated about the exact amounts and transfers that occur.

Every window at the player cage may have a cashier who may be authenticated into the module. The authentication process may give a user certain rights based on predefined roles. For example, a cashier may be given an employee role. This may allow the cashier to operate at the window. The system may also designate the workstation from a particular window to work with a particular window. The system may keep track of the amount with which each cashier has started his/her shift. This amount may be referred to as the "initial bank".

Throughout a shift, the cashier may have incoming transactions or operations (where money may be given to the casino) and outgoing operations (where the casino pays out winnings). At the end of the shift, the system may compute the initial amount plus (+) incoming operations, minus (−) outgoing operations in order to determine an end balance for that cashier at that shift. Other operations may include a transfer to vault operation as well as a transfer from vault operation, both of which may be designed to maintain adequate levels of cash at the player cage windows.

The clients for the player cage may be grouped into three categories. A first category may comprise known players. These may be regular players whose data is already entered into the database. A second category may comprise employees, e.g., individuals that work in the casino and perform operations at the player cage. A third category may comprise unknown players, who are individuals that do not reveal their identity at the time of the transaction.

Figure 34:
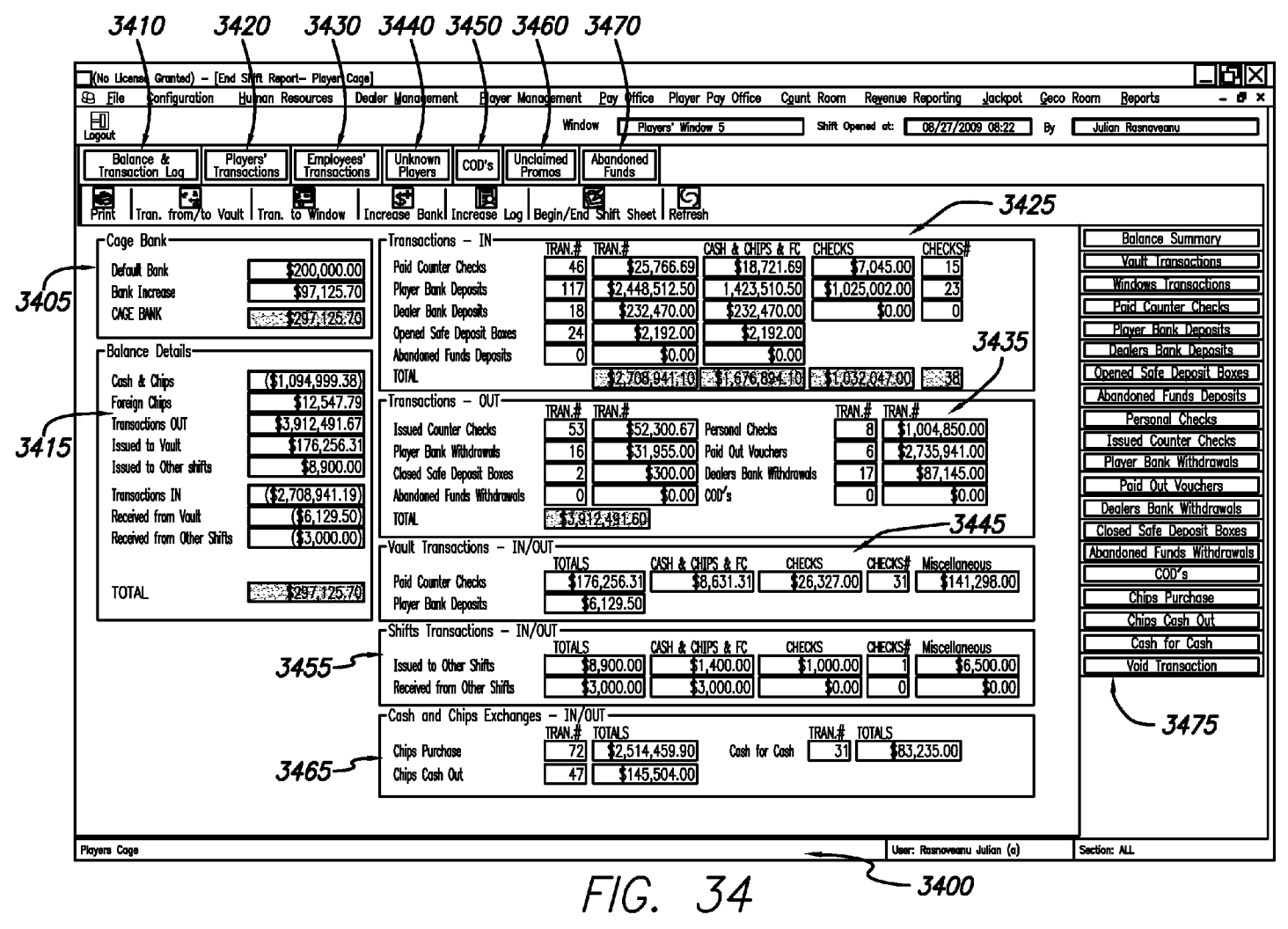

The module may be organized into five main parts, including but not limited to: (1) cashier operations; (2) supervisor operations; (3) multiple transactions log operations; (4) promotions pay off; and (5) vault operations. In a balance and transactions' log sub-module for cashier operations, the user may be given an overview of the entire activity and the ability to view transactions grouped by type. A cashier dashboard centralizes information about all operations performed by the cashier during a shift. Referring now to FIG. 34, illustrated is a cashier dashboard or interface screenshot which may display cashier operations in accordance with one embodiment of the present disclosure. As shown in FIG. 34, using the cashier dashboard 3400, the cashier may access functionality related to the dashboard. For example, here "balance summary" is selected, and in this embodiment it is on uppermost line of section 3475. To the right, in order to provide details on the balance summary, the fields display the cage bank balance 3405, balance details 3415, incoming transactions 3425, outgoing transactions 3435, incoming and outgoing vault transactions 3445, incoming and outgoing shift transactions 3455, as well as incoming and outgoing cash and chip exchanges 3465.

In section 3475 are buttons that can be used to obtain details about the fields (sums) displayed on the dashboard. Vault transactions may show orders placed by the cashier to refill the window with cash and chips by selling entity-recognized currency, e.g., checks, counter checks or vouchers to the vault. An icon/button may be selected that indicates the date of receipt of the vault. The vault may be seen as the heart of the casino, and all money and chips may be deposited or paid from here. The vault may be in charge of all things of value in the casino, including cash. When money comes from the casino floor, including from widows or cash/chips, the vault may be used to process the money. The vault may be balanced because the vault may serve as a bank, with the cashiers selling the paper (e.g., personal checks, counter checks and automated teller machine (ATM) checks, vouchers, etc. The window may always start and end with the same amount, but the vault may start and end with different amounts due to pay-offs or deposits. The vault may be stocked with sufficient cash to cover all the chips from the floor.

By selecting the windows transactions button in section 3475, with respect to window transactions, which may be seen in the cashier dashboard where the summary of all transactions are listed. On the right side of the screen are icons/buttons for each transaction type allowed in the cage. If the user clicks on an icon, the user may receive details on the type of transactions that were performed during a particular shift. The cashier may see the summary of all transaction types and then view the details for each type by selecting the appropriate icon With respect to window transactions, the receipt date and time, window, cashier and total may be displayed on a single screen.

By selecting the paid counter checks button in section 3475, just below the button for window transactions, the cashier may review transactions performed during that shift, including a document number showing an image or representation of a check as well as the recipient, customer ID, customer name and sign in amount may be shown.

By selecting player bank deposits from section 3475, the cashier may review transactions performed during that shift, including a document number, a receipt date, recipient customer identification, name, sign-in card number, and amount of bank deposit.

By selecting dealer's bank deposits, the cashier may view transactions performed during that shift, including a document number, receipt date, recipient, recipient badge number, depositor, sign in card number and amount.

By selecting opened safe deposit boxes, a cashier may view transactions performed during that shift, including a document number, a receipt date, recipient customer identification, name, sign-in card number, and amount in a safe deposit box.

By selecting abandoned funds deposits, a cashier may view a document number, a receipt date, recipient customer identification, name, sign-in card number, and amount in abandoned funds.

By selecting issued personal checks deposits, a user cashier may view a document number, a receipt date, recipient customer identification, name, sign-in card number, transaction type, and amount in personal checks deposits.

By selecting issued counter checks deposits, a cashier may view a document number, a receipt date, recipient customer identification, name, sign-in card number, and amount in issued counter checks deposits.

The player cage module may have the built in feature to process check cashing on many type of checks e.g., personal checks, cashier check, traveler's check, payroll check, money order, automated teller machine (ATM) where the check may be issued by vendors, wire transfer. In the settings the user may be permitted to set the following rules: allowing the check to be deposited into the casino account, paying counter checks, purchasing chips or other casino products, cash checks by the casino or other vendors, set an approved limit for the max amount the check can be cashed, or set the number of days the check clears from the bank.

The checks that are being check marked may be displayed in the cashier dash board such as that shown in FIG. 34. The cashier dashboard of the player cage module may also display the number of days from the last payroll check cashed; the amount of the last payroll check cashed; the history of all the payroll checks cashed; the available credit with the casino (if the player has credit established with the casino); the number of hold days approved for the player by the casino; the type of checks approved for cashing by the casino; the special hold check and the employee who guaranteed the special hold check; [the maximum permissible time for holding the special hold check; comments for the special hold check or for any other type of checks; and the ability to enter the bank information manually or to import it from the cage application. The special hold check may be a check from a player without check cashing status with the casino but, a casino supervisor may guarantee that check. For example, the player may receive a credit for certain amount, sign a personal check, and receive a certain amount of time to pay the money back. If within that period of time the player does not pay the money back, then the casino may deposit the check to the bank and if the customer doesn't have enough money to cover that check then the employee who guaranteed the credit will have to pay the casino money back.

Referring back to box 3475 of FIG. 34, by selecting player bank withdrawals, a user may view a document number, a receipt date, recipient, customer identification number, customer name, sign-in card number, transaction type, and amount in a player bank withdrawal.

Also in box 3475 is a "paid out vouchers" button. By selecting this button, a user may view a document number, a receipt date, recipient, customer identification number, customer name, sign-in card number, and amount in paid out vouchers.

By selecting another button in box 3475, the dealer's bank withdrawals button, a user may view a document number, a receipt date, recipient, customer identification number, customer name, sign-in card number, and amount in dealer's bank withdrawal.

By selecting the closed safe deposit boxes button in box 3475, a user may view a document number, a receipt date, recipient, customer identification number, customer, sign-in card number and amounts in individual closed safe deposit boxes.

By selecting the chips purchase button in box 3475, a user may view a document number, a receipt date, recipient, customer identification number, customer, sign-in card number and amounts of individual purchases of chips.

By selecting the chips cash out button in box 3475, a user may view a document number, a receipt date, recipient, customer identification number, customer, sign-in card number and amounts of chips cashed out by individuals.

By selecting the cash for cash button in box 3475, a user may view a document number, a receipt date, recipient, customer identification number, customer, sign-in card number and amounts of chips cashed in for cash by individuals.

By selecting the void transactions button in box 3475, a user may view a document number, a receipt date, recipient, customer identification number, customer, sign-in card number, transaction type and amounts of individual void transactions.

The player cage module may keep track of all transactions and activity of players in the casino. Players may be registered into the database with complete information about their personal details. Data may be automatically gathered using scanners for driver's licenses or passports.

The player cage module may permit the casino to create a mailing list with player's approval where the casino has sent promotional letters to the registered players. This mailing list may include any feature of a general mailing list, including how notifications should be sent, e.g., by phone, text, email or regular mail. This module can also store other information about the player including a copy of the driver's license or passport and the player's customer identification number.

Going to the top row of icons/buttons on FIG. 34, the players' transaction icon/button 3420 may permit the cashier to register transactions for known players. The main module may display a list with all registered players. The employees' transaction button 3430 may permit the cashier to register transactions for employees. The unknown players button 3440 may permit the cashier to register transactions for unknown players. The CODs button 3450 may permit the cahier to register transactions related to CODs. The unclaimed promos button 3460 may permit the cashier to access information regarding unclaimed promotions. The abandoned funds button 3470 may permit the cashier to access or register transactions regarding abandoned funds. The main module may display a list with all registered players. At the top of the screen, the filtering area may allow the user to easily identify one player for which the transaction is to be performed.

Once a player has been found in the database, the cashier can perform one a number of operations from the cashier dashboard by selecting the players' transaction icon/button.

Figure 35:
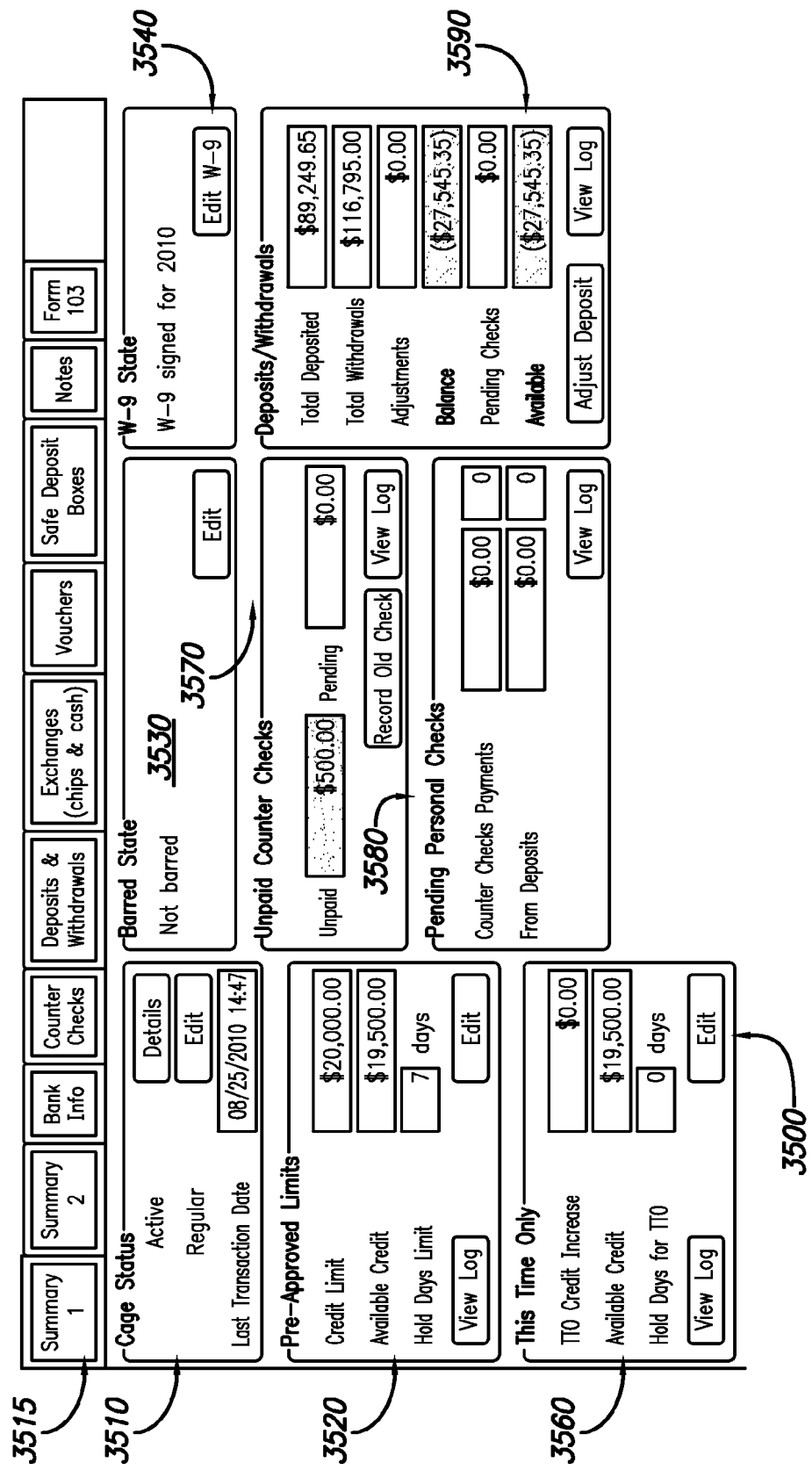
FIG. 35 is a player dashboard or interface in accordance with one embodiment of the present disclosure.

An associated player dashboard or interface may show aggregate information about the player activity. Referring now to FIG. 35, illustrated is a player dashboard in accordance with one embodiment of the present disclosure. The dashboard 3500 may include a player cage status at box 3510 that shows if the player was approved for credit, check cashing, or payroll check cashing. The player activity information may also include a player's casino status at box 3530, showing if the player is currently barred, whether by the casino or otherwise. The player activity information may further include a player's employment eligibility status at box 3540 (including but not limited to, a W-9 status, showing whether the player has the appropriate paperwork indicating employment eligibility).

The player activity information from the database may also include a player's pre-approved credit limit at box 3520, showing the credit amount for which the player was approved by the casino. The player activity information may also show a one-time credit limit at box 3560, which may be a one-time approval to increase player credit as a special request. Information regarding a player's unpaid or outstanding counter checks at box 3570 and pending personal checks at box 3580 (pending personal checks deposited but not cleared) may also be shown. The player information may also include deposits, withdrawals and balances at box 3590.

Other information regarding a player's activity may also be shown. This information may include voucher information that shows any winnings awarded to the player, including winnings in the form of a jackpot, high hand or tournament. This player activity information may also include exchange information that shows any cash or chips transactions that were recorded.

At the cashier dashboard, the cashier is able to perform certain operations. For example, the cashier may view information regarding issued counter checks. Before performing any operations, a cashier may be required to acknowledge that the cashier has read notifications regarding the player. Once the cashier has made the proper acknowledgements, the player cage module may print multiple copies of the issued counter check, e.g., one copy for the cashier, one for the vault and one for the accounting department. The casino operations management system may record a debt from the player in the amount of the outstanding check.

The player may view unpaid counter checks at box 3570 of FIG. 35. A player may make partial payments for the outstanding amounts.

At box 3590, the deposits and withdrawals tab, amounts that are deposited by players can be monitored. Using this module, bank deposits from a player may be added and withdrawn from the player account. The status of an account may also be indicated. Player status examples include cash, check cashing and regular. For a player having cash status, the player can only perform cash transactions within the cage. Check cashing or regular status may be used to denote the player's ability to cash personal checks and/or receive credit.

Still referring to FIG. 35, at row 3515, a "voucher" icon may permit access to functionality regarding pay out vouchers. The voucher can represent anything of value, including but not limited to, a jackpot, a high hand or a bill from a vendor.

In the case of a jackpot or high hand, the process may include a number of steps. For example, casino management may set a jackpot or high hand promotion in the jackpot module discussed hereinabove. The jackpot module may be linked to a particular game and limit. All promotions may be configured in the jackpot module and may be applied to the games.

Figure 36:
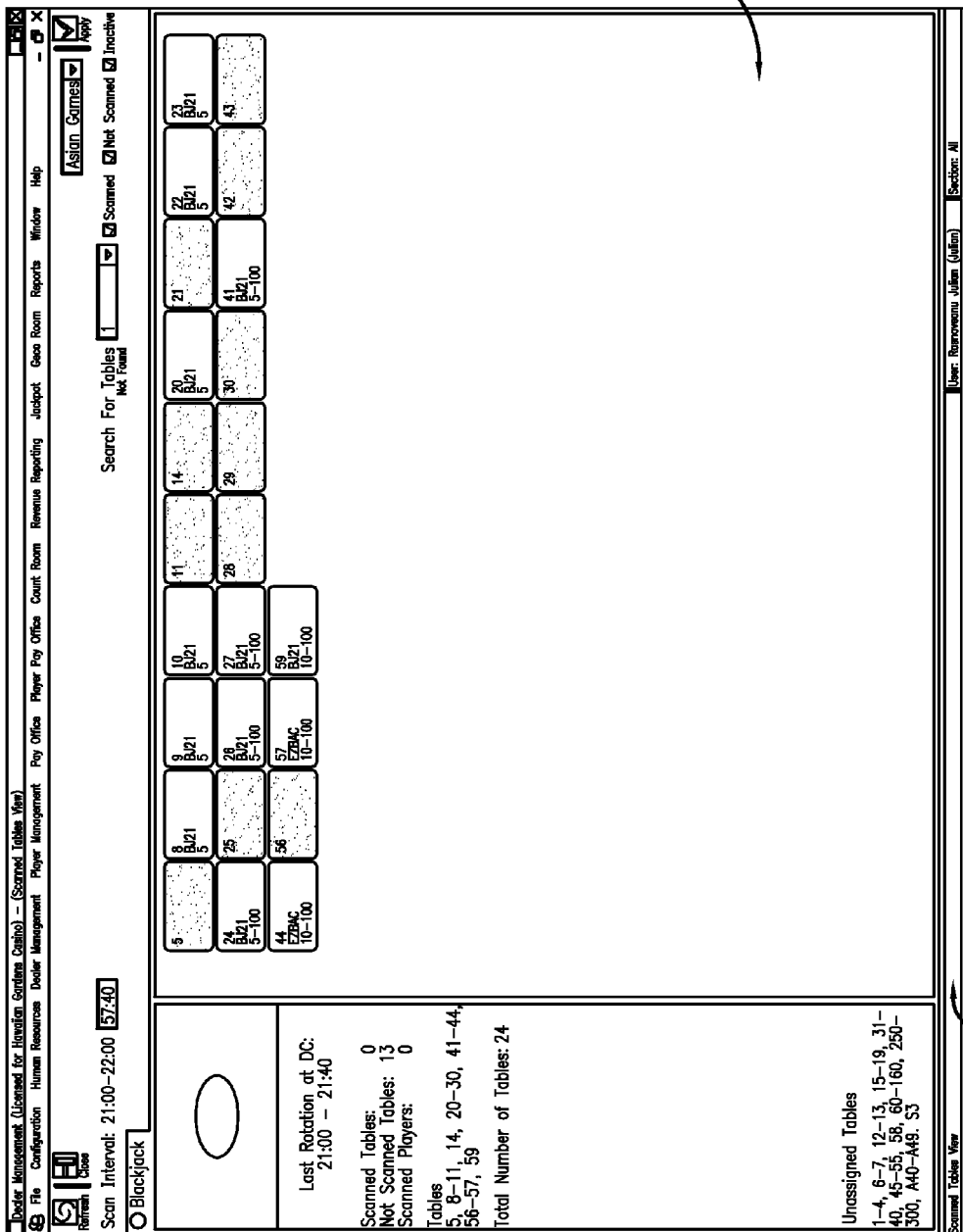
FIG. 36 is a sports module interface that can be used for jackpots and high hands.

The game, limit and the dealers may be managed by a dealer coordinator. Referring now to FIG. 36, illustrated is a user interface that can be used for jackpots and high hands. When a jackpot or high hand is hit, the floor person may verify the validity of the winning hand. The floor person may open a display (not shown), and double click on the table that hit the jackpot or high hand. A list of available tables is shown in section 3710 of screenshot 3700. If the player tracking module (described hereinabove) is in use, then the floor person may be able to see the players that were scanned at the table along with their identifying information, e.g., picture and driver license—assuming the casino personnel already scanned the player driver license into the system. Here, zero tables have been scanned as shown at section 3720.

In the case of a jackpot, if one player at a table hits the jackpot then all players at the table may be paid a percentage of the jackpot. A floor person may select the percentage each player gets paid from the jackpot. The casino operations management system may prompt the floor person to request the player's driver's license if the driver's license is not displayed when the player information is selected. The system may prompt the floor person to print required forms for the winnings, e.g., Form W-9, and have the form signed by the player if the player doesn't already have signed Form W-9 for the current year.

In the case of a high hand, the floor person may double-click the table where the qualifying hand was hit. Still referring to FIG. 37, the floor person may select the qualifying hand from the list of qualifying hands. Then, the floor person may select the player and see if the player has scanned identification (e.g., a driver's license) and required reporting forms (e.g., Form W9) signed.

If the amount paid to the player exceeds a certain level, various additional reporting may be required. For example, if the amount paid is bigger than $600 the system may print a W2-G Form with the information from the player's driver's license and social security number if that information is already in the system. Alternatively, the system may prompt the user to enter the information that is missing. If the amount paid to the player exceeds $10,000 additional reporting may be required.

The screenshot of FIG. 36 may also be viewed by surveillance department personnel. When a jackpot or high hand is hit, the system may post a message informing a viewer that the jackpot or high hand was hit. Surveillance may need to verify that the jackpot or high hand is valid and approve that jackpot or high hand.

Surveillance or other viewing personnel may be able to see certain information from the table, including but not limited to, a player's driver's license, a dealer name, game, limit, floor person that validated the jackpot or high hand and the qualified hand of the jackpot or high hand.

After surveillance or other authorized personnel verify the validity of the hand, they may approve the jackpot or high hand and the job may go in the queue to the cashier in the cage. The cashier may print the necessary forms including tax and other government reporting forms and have the players sign those forms.

After all the documents are completed and signed the cage may pay the jackpot or high hand. At the player's request, the cashier could withhold the taxes or if the player is out of state the application may request automatic withholding of the state taxes. Using voucher functionality, the cashier may view the status of all vouchers that have been paid to a particular player. After confirmation, the cashier may pay the jackpot or high hand.

On the player dashboard, the player is able to be notified of unpaid counter checks so the player can pay them (in whole or in part) in order to receive additional benefits from the casino. The cashier may enter the amount of the counter check and confirm the transaction.

Referring back to FIG. 35, the player dashboard includes a button on row 3515 that reads "Exchanges (chips and cash)." By selecting this button on row 3515, all exchange transactions that occur for a particular player at the cashier's desk may be tracked. For each such transaction, a document number, receipt date, cashier, transaction type and amount may be displayed.

The notes button on row 3515 may be used to add notes regarding a specific player. Using the safe deposit button on row 3515, a user may access functionality related to each player's safe deposit box. For each safe deposit box, a receipt date and time, cashier, safe deposit box number, status or type of box (open for safe deposit boxes which are active and closed for inactive boxes) and amount deposited may be displayed.

From an employees' transaction module, the cashier may register transactions for casino employees. The main browser may contain a list with all employees. Using the filtering area, the cashier can easily identify a particular individual. Once the employee has been identified, the cashier can access that employee's financial account. The employee's financial account may include such information as the balance in the employee's account, and the amount needed as a deposit from the employee. An employee may be required to make a deposit in the amount of the working bank. This amount could vary, ranging from e.g., $400 to $4000. If the employee has money deposited in the cage then their bank can be picked up from the employees window. If the employee does not have a deposit, then the employee may not be permitted to work. Some casinos may provide the working bank but, sometimes the dealers play with the casino money. Repercussions may occur when an employee in unable to produce the bank. The employee's bank may be tracked by the system. For each employee transaction, a document number, receipt date, cashier, type (deposit or withdrawal) and amount of transaction may be displayed.

The employee account accessible from the employee's transaction module may display identification information about the employee, as well as a history of transactions. Employee transactions may include deposits or withdrawals from the working bank. The cashier can perform deposits or withdraw money from the employee account. After each deposit or withdrawal operation, the system may ask the cashier to confirm the operation and print a report—in multiples if needed. For example, the system may report three copies (one for the cashier, one for the vault and one for the accounting department).

A multi-transaction log module may help the casino to keep track of transactions for both known and unknown player's. This module may also create daily reports which help the casino to identify the individuals that accumulate transactions that total more than $3000 or more than $10,000 which may need to be reported to various entities. The module may also be used to view transactions that were performed by the cashiers/runners through the casino for a given day. Depending on the particularities of each casino, the system may be configured to report transactions that exceed certain amounts.

For example, by default, an alert may be triggered for each player whose transaction total exceeds $10,000 for a single day. The alert may prompt the user (e.g., casino staff) to request further identifying information from the player in order to fulfill legal or other requirements for transactions that exceed certain amounts. Further identifying information may include a social security number and driver's license or passport from the player. Alternatively, if the player is already identified in the casino operations management system, the multi transaction log may fill in the player information automatically into any required forms for transactions that exceed a certain amount. Governmental agencies may require that such forms be completed.

After the required forms, e.g., an Internal Revenue Service (IRS) Form 103, are saved to the server, the file can be sent electronically to the entity that requires it, e.g., the IRS.

Each player whose sum of transactions for one day exceeds $3,000 may be displayed in this multi transaction log module. In addition, all players' non-cash (checks) transactions that exceed $3,000 may be logged into a daily non-cash transaction log. The multi transaction log module may allow the user to mark a transaction as suspicious and save them to a suspicious transactions log. If a player refuses to provide the required information for transactions for which reporting is required,. then the cashier may indicate so within the system.

The multi transaction log module may help the casino stay in compliance with various regulations. For all players that perform large amounts of transactions in one day, the casino may be obligated to report this activity. The multi transaction log module may help in this regard by identifying such transactions in the case of unknown players and keeping track of them.

Figure 37:
FIG. 37 is a screenshot for a multi transaction log in accordance with one embodiment of the present disclosure.

The main multi transaction log form may be grouped into six tabs. Referring now to FIG. 37, illustrated is a screenshot 3600 for a multi transaction log in accordance with one embodiment of the present disclosure. At box 3610 is a button that reads "Form 103". This may be a browser with all known players whose transactions must be reported to the IRS (i.e., Form 103 must be printed and filled electronically to IRS). Of course, this button could be used to designate other types of reports. The system may also include reminders for when a particular player has entered into additional transactions that should be included on an updated form. A view log button accessible from this module may display all former versions of the form. The user may filter the listing to see only players who need updated forms.

At button 3620 is a button that reads "MTL entries for known players." By selecting this button, a user may list all players who have performed transactions in that day and the total of aggregated transactions exceed $3,000. A view log function similar to that for the module accessible via button 3610, may show all forms that were printed while another button may open the multi transaction module of the player account where the cashier can view details and edit them.

Also shown in the figure is a button 3630 that reads "MTL entries for unknown players." By selecting this button 3630, a user may list all unknown players who have performed transactions in that day and the total of aggregated transactions exceed $3,000. Using this module, a user may see all cash-in and cash-out transactions. This module may also be capable of causing details to appear related to a particular transaction. In order to print forms for an unknown player, that individual must be first registered. From the multi transaction module, wizard interface may be opened, and with a few steps the data for a player may be entered.

For unknown players, a camera may be operably connected to the casino operations management system. In this manner, a cashier can take a picture of the unknown player. The unknown player may be searched for in the database of the casino operations management system. The search may be conducted based on driver's license number, social security number and/or player identification number. If the player is found in the database, the user may select him/her from the search results. Otherwise, the cashier may press "new" to add the unknown player. Then, details related to this player may be entered into the system. Once the identifying data is entered, all transactions and notes that were associated for the unknown player will be transferred to this player account. Where multiple records belong to a single player, a join function may be used to group all these transactions under a single player account.

As shown in FIG. 37, section 3670, four (4) transactions have been grouped together in the upper part of the screen for a single player. As also shown in section 3670, in the lower portion of that section, two transactions have been grouped together for a single player. The user may select all unknown players that must be joined and press a "join" icon. When multiple records belong to a single player, the join function may be selected in order group all these transactions under a single player account. The user/cashier may select all unknown players that must be joined and press a "join" button/icon.

When grouping records together, the system can filter the data based on matches in categories, such as appearance, particular or clothing. Matching can be set to be either high or low. When the matching tool is set on high, then the system may require that all attributes match when providing search results. If the tool is set to low, then the application may show records in search results that do not match. At button 3640, a user may access functionality designed for transactions over $3,000. By selecting this button 3640 that reads "Unknown players-cash IN transactions," the user may access a list of all players grouped by attributes where the group of CASHED IN transactions exceeds the $3,000 limit. Using this list, the user can identify whether two or more unknown players are actually the same player. By selecting button 3650 that reads "Unknown players-CASH OUT transactions," a user may access a list of all players where the group of CASH OUT transactions exceeds the $3,000 limit. By selecting button 3660 that reads "Known and unknown players-all transactions," a user may access a list of all transactions that occurred in a single day. Using this button, the user may show all the transactions in chronological order and group them, e.g., by the last name. The button may also show all transactions that were performed that day and the user has the option to filter transaction based on various user-supplied parameters.

A negotiable instrument(s)—transactions log may also be accessible from the cashier dashboard and may be used to register all the non-cash transactions performed by the players, including any checks or cashier checks that were cashed by the players. In addition, a suspicious—transactions log may be used for any transactions that are deemed suspicious by the casino personnel and the proper form may be presented to agencies to which reports must be made, e.g. the IRS. Casino personnel may include any individual authorized to act on behalf of the casino, including but not limited to employees and independent contractors.

For the unknown players, the cashier can also perform additional operations provided that the system administrator has enabled the respective permissions. The cashier can add a text note to the profile of an unknown player. The cashier can join unknown players, allowing the cashier to merge the records of two unknown players into a single profile. All transactions that were performed may be grouped under a single individual account.

Figure 38:
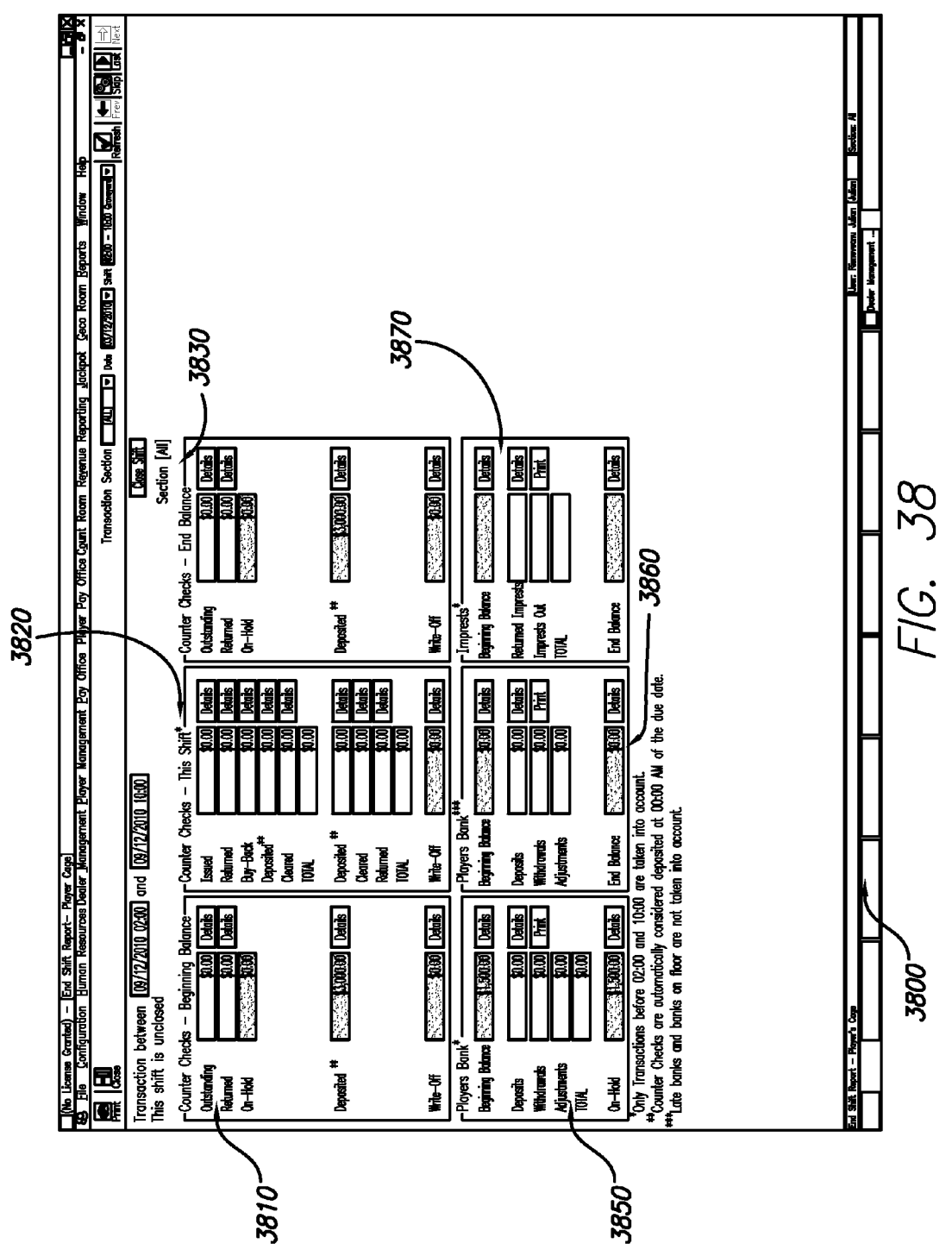

A cashier may reassign a transaction from one player profile to another. Transactions with unknown players may be carried out on the casino floor. Whomever is responsible for the cage, e.g., a shift manager, may need to balance the cage. In the process, the cashier may use an "end of shift" dashboard to get all the balances and details. Referring now to FIG. 38, illustrated is an end of shift dashboard screenshot 3800 in accordance with one embodiment of the present disclosure.

As shown, the dashboard includes the beginning of the shift balance at box 3810, the current shift activity at box 3820, and the end of the shift balance at box 3830 for player's counter checks, player's bank, dealer's bank and imprests.

As shown in box 3840, a player's counter checks may include outstanding counter checks balance and details, returned counter checks balance and details, on hold counter checks balance and details, deposited counter checks balance and details, and write-offs for counter checks balance and details.

The player's bank, as shown in box 3850, may include deposits balance and details, withdrawals balance and details as well as adjustments balance and details.

The dealer's bank category, as shown in box 3860, may include deposits balance and details as well as withdrawals balance and details.

Imprests, as shown in box 3870, may include imprests out balance and details as well as returned imprests balance and details.

While the specification describes particular embodiments of the present invention, those of ordinary skill can devise variations of the present invention without departing from the inventive concept.

We claim:

1. A casino operations management system, comprising:
an attendance controller module configured to receive, store and display attendance information for an entity, wherein the attendance information includes start times, end times, tardiness and absences;
a unique personnel identification card device configured to receive, store and transmit unique identification information for individual personnel associated with the entity;
at least one card scanner device corresponding to at least one entity location, the at least one card scanner device being configured to scan the unique personnel identification card device and thereby transmit unique identification information and location information for each of said individual personnel associated with the entity;
a table rotation module configured to receive, store and display table rotation information;
at least one touch screen device configured to receive and display information for a casino table;
a player cage module configured to manage financial transactions between the player and entity, including cash transactions for each player, the player cage module including a cashier interface that has information regarding all transactions performed by a cashier during a time period,
a section view module configured to receive, store and display and transmit the dealer schedule information, dealer status information, table rotation information, table status information, game limit information, and dealer game information for each casino table according to predefined casino sections and for each down period;
wherein the section view module is further configured to receive manual input of dealer schedule information;
a multi transaction log module configured to store multiple transactions for an individual player and to merge transactions for each said individual player, the multi transaction log being further configured to identify unknown players based on at least one image received of each unknown player,
wherein the multi transaction log is further configured to track total transactions for known and unknown players and determine when transactions for each said individual player exceed a reportable threshold total for a predetermined period;
wherein the multi transaction log module includes a tax reporting module, said tax reporting module being configured to generate a report, for transmission to a taxing authority, when said transactions for each said individual player exceed a reportable threshold total for a predetermined period.

2. The system of claim 1, further comprising:
an employee transaction module configured to display identification information about an employee and a history of employee financial transactions with the entity.

3. The system of claim 1, wherein the touch screen device includes an optical counter slot configured to count and compute the value of entity currency.

4. The system of claim 1, further comprising:
at least one radio frequency identification card device configured to receive, store and transmit unique player identification information;
at least one radio frequency identification antenna that corresponds to at least one casino seat, the at least one radio frequency identification antenna being configured to receive information from the at least one radio frequency identification card device; and
a player tracking module configured to reward players based on casino activity.

5. A computer program product comprising a non-transitory computer storage medium having computer readable program code embodied therein for casino operations management, the computer program product comprising:
attendance controller computer readable code configured to cause a computer to receive, store and display attendance information for one or more entities, wherein the attendance information includes start times, end times, tardiness and absences;
unique personnel identification computer readable code configured to cause the computer to receive, store and transmit unique identification information for individual personnel associated with the entity;
card scanner computer readable code configured to cause the computer to receive and store a scan from a unique personnel identification card device and to receive and store unique identification information and location information for each of said individual personnel associated with the entity;
table rotation computer readable code configured to the computer to receive, store and display table rotation information;
touch screen computer readable code configured to cause the computer to receive and display information for a casino table at a touch screen device;
player cage computer readable code configured to cause the computer to manage financial transactions between the player and the entity;
section view computer readable code configured to cause the computer to receive, store and display and transmit dealer schedule information, dealer status information, table rotation information, table status information, game limit information, and dealer game information for each casino table according to predefined casino sections and for each down period,
wherein the section view computer readable is further configured to receive manual input of dealer schedule information; and
multi transaction log computer readable code configured to cause the computer to store multiple transactions for an individual player, to merge transactions for each said individual player, and to identify unknown players based on at least one received image for each unknown player,
wherein the multi transaction log computer readable code is further configured to cause the computer to track total transactions for known and unknown players and determine when transactions for each said individual player exceed a reportable threshold total for a predetermined period;
wherein the multi transaction log computer readable code includes tax reporting computer readable code, said tax reporting computer readable code being configured to generate a report for transmission to a taxing authority when transactions for an individual player exceed a reportable threshold total for a predetermined period.

6. The computer program product of claim 5, further comprising:
employee transaction computer readable code configured to cause the computer to display identification information about an employee and a history of employee financial transactions with the entity.

7. A computer-based method for casino operations management, comprising the steps of:
receiving and storing attendance information for personnel in one or more entities, wherein the attendance information includes start times and end times;
receiving and storing scanned information from a unique personnel identification card device, wherein the card device includes unique identification information for each individual in a casino entity;
responsive to the step of receiving and storing scanned information, displaying additional attendance information for the individual in an entity, including tardiness; and
receiving, storing, transmitting and displaying table rotation information;
receiving, storing and displaying information for a casino table at a touch screen device;
managing financial transactions between the player and the entity;
receiving manual input of dealer schedule information;
receiving, storing, displaying and transmitting the dealer schedule information, dealer status information, table rotation information, table status information, game limit information, and dealer game information for each casino table according to predefined casino sections and for each down period;
storing and merging multiple transactions for an individual player;
based on at least one received image for each unknown player, identifying unknown players;
tracking total transactions for known and unknown players;
determining when transactions for each said individual player exceed a reportable threshold total for a predetermined period; and
generating a report for transmission to a taxing authority when said transactions for an individual player exceed a reportable threshold total for a predetermined period.

8. The method of claim 7, further comprising:
displaying identification information about an employee and a history of employee financial transactions with the entity.

9. The system of claim 1, wherein:
the multi transaction log has a reporting form module that is configured to determine an appropriate form for reporting the exceeded reportable threshold total for each said individual player for a predetermined period, and
the reporting form module is further configured to automatically populate the determined appropriate reporting form with transaction information for each known and unknown individual player whose transactions exceed the reportable threshold total for a predetermined period.

10. The system of claim 9, wherein:

the reporting form module is yet further configured to receive a request from an authorized user to transmit the reporting form electronically to the authority that requires the reporting form; and the reporting form module is still further configured to prevent modification of the reporting form after transmission of the reporting form to the authority that requires the reporting form.

11. The computer program product of claim 5, wherein:

the multi transaction log computer readable code includes reporting form computer readable code configured to cause the computer to determine an appropriate form for reporting the exceeded reportable threshold total for each said individual player for a predetermined period, and the reporting form computer readable code is further configured to cause the computer to automatically populate the determined appropriate reporting form with transaction information for each known and unknown individual player whose transactions exceed the reportable threshold total for a predetermined period.

12. The computer program product of claim 11, wherein:

the reporting form computer readable code is yet further configured to cause the computer to receive a request from an authorized user to transmit the reporting form electronically to the authority that requires the reporting form; and the reporting form computer readable code is still further configured to cause the computer to prevent modification of the reporting form after transmission of the reporting form to the authority that requires the reporting form.

13. The computer-based method of claim 7, further comprising:

determining an appropriate form for reporting the exceeded reportable threshold total for each said individual player for a predetermined period, and automatically populating the determined appropriate reporting form with transaction information for each known and unknown individual player whose transactions exceed the reportable threshold total for a predetermined period.

14. The computer based method of claim 13, further comprising:

receiving a request from an authorized user to transmit the reporting form electronically to the authority that requires the reporting form; and preventing modification of the reporting form after transmission of the reporting form to the authority that requires the reporting form.

15. The computer program product of claim 5, further comprising:

radio frequency identification card computer readable code configured to cause the computer to receive, store and transmit unique player identification information;

radio frequency identification antenna computer readable code configured to cause the computer to receive information from the at least one player card device; and player tracking computer readable code configured to cause the computer to track casino activity for an individual player.

16. The method of claim 7, further comprising:

receiving, storing and transmitting unique player identification information at least one radio frequency identification card device;

receiving player information from at least one player card device at least one radio frequency identification antenna that corresponds to a casino seat; and tracking casino activity for an individual player.

\* \* \* \* \*